US011341439B2

(12) United States Patent
Meharwade et al.

(10) Patent No.: US 11,341,439 B2
(45) Date of Patent: May 24, 2022

(54) ARTIFICIAL INTELLIGENCE AND MACHINE LEARNING BASED PRODUCT DEVELOPMENT

(71) Applicant: ACCENTURE GLOBAL SOLUTIONS LIMITED, Dublin (IE)

(72) Inventors: Raghavendra Meharwade, Bangalore (IN); Jeffson Felix Dsouza, Pune (IN); Pratap Venkata Naga Poorna Bontha, Hyderabad (IN); Anubhav Gupta, Meerut (IN); Aruna Sivakumar, Bangalore (IN); Muthalanghat Nisha, Bangalore (IN); Janagi Madhankumar, Chennai (IN); Roopalaxmi Manjunath, Bangalore (IN); Purnima Jagannathan, Chennai (IN); Nevis Ravi Kumar Rodriguez, Chennai (IN); Rajesh Nagarajan, Chennai (IN); Koushik M. Vijayaraghavan, Chennai (IN); Rajendra T. Prasad, Chennai (IN); Mohan Sekhar, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 539 days.

(21) Appl. No.: 16/103,374

(22) Filed: Aug. 14, 2018

(65) Prior Publication Data

US 2019/0050771 A1 Feb. 14, 2019

(30) Foreign Application Priority Data

Aug. 14, 2017 (IN) ............................. 201711028810

(51) Int. Cl.

| | |
|---|---|
| ***G06Q 10/06*** | (2012.01) |
| ***G06K 9/62*** | (2022.01) |
| ***G06N 20/00*** | (2019.01) |

(52) U.S. Cl.

CPC ..... *G06Q 10/06313* (2013.01); *G06K 9/6276* (2013.01); *G06N 20/00* (2019.01); *G06Q 10/067* (2013.01)

(58) Field of Classification Search

USPC ........................................................ 705/7.23

See application file for complete search history.

(56) References Cited

U.S. PATENT DOCUMENTS 6,088,679 A 7/2000 Barkley
8,184,036 B2 * 5/2012 Charland ........... H04B 17/3913 342/5
8,701,078 B1 4/2014 Holler et al.
8,739,047 B1 5/2014 Holler et al.
(Continued)

*Primary Examiner* — Folashade Anderson

(74) *Attorney, Agent, or Firm* — Mannava & Kang, P.C.

(57) ABSTRACT

In some examples, artificial intelligence and machine learning based product development may include ascertaining an inquiry, by a user, related to a product that is to be developed or that is under development, and ascertaining an attribute associated with the user. The inquiry may be analyzed to determine at least one virtual assistant from a set of virtual assistants to respond to the inquiry. The determined at least one virtual assistant may be invoked based on an authorization by the user. Further, development of the product may be controlled based on the invocation of the determined at least one virtual assistant.

17 Claims, 81 Drawing Sheets

(56) References Cited

U.S. PATENT DOCUMENTS

| | | | | |
|---|---|---|---|---|
| 9,501,751 | B1 | 11/2016 | Holler et al. | |
| 9,740,457 | B1 * | 8/2017 | Liu | G06Q 10/06 |
| 10,127,017 | B2 * | 11/2018 | Nandagopal | G06F 3/0482 |
| 10,372,421 | B2 * | 8/2019 | Mack | G06F 8/10 |
| 10,719,301 | B1 * | 7/2020 | Dasgupta | G06K 9/6267 |
| 2007/0168918 | A1 * | 7/2007 | Metherall | G06Q 10/06 717/101 |
| 2012/0254333 | A1 * | 10/2012 | Chandramouli | G06F 40/40 709/206 |
| 2016/0124742 | A1 | 5/2016 | Rangasamy et al. | |
| 2017/0083290 | A1 * | 3/2017 | Bharthulwar | G06F 11/3688 |

* cited by examiner

| Assistant# | Short Description | Agile Stage | Input | Output | Output Consumed By | Benefits |
|---|---|---|---|---|---|---|
| Demo Assistant | Automated assistant to define Definition of Done | Iteration 0 | Project Configuration | Definition of Done | Iteration Planning, Daily Meeting | • Helps team to define effective checklist to fulfill all requirements of coding, testing, compliance etc.<br>• Track DoD/checklist. |
| Readiness Assistant | Automated assistant to define Definition of Ready | Iteration 0 | Project Configuration, Agile Maturity Assessment | Definition of Ready | Backlog Assistant | • Helps to define criteria for a user story to be called as ready for next iteration.<br>• Track DoR/criteria. |
| Defect Management Assistant | Automated assistant to prioritize defects | Iteration 1-N | Defect Log | Prioritized Defects | Iteration Planning, Daily Meeting | • Helps to prioritize defects as per their severity, impact etc.<br>• Saves efforts by automating repetitive tasks related to defect management. |
| Impediment Management Assistant | Automated assistant to prioritize impediments | Iteration 1-N | Impediment Log | Prioritized Impediments | Daily Meeting | • Helps to prioritize impediments as per their impact on progress.<br>• Saves efforts by automating repetitive tasks related to impediment management. |
| Iteration Review Assistant | Automated Assistant to conduct Iteration review meeting | Iteration 1-N | Working software | Deferred defects, stories | Retrospective, Iteration Planning | • Check story completeness through DoD/checklist.<br>• Provides options to auto schedule the demo.<br>• Send notifications for pending stories. |
| Report Performance Assistant | Automated assistant to prepare and communicate different reports | All Phases | ALM data, MC Metrics | Reports | Stakeholders | • Helps scrum master prepare customized reports.<br>• Provides options to auto schedule the report send.<br>• Provides various options to customized reports extensively. |

FIG. 2B

| Assistant# | Short Description | Agile Stage | Input | Output | Output Consumed By | Benefits |
|---|---|---|---|---|---|---|
| Daily Meeting Assistant | Automated Assistant to conduct daily meeting | Iteration 1-N | Iteration Backlog, Impediments, Action Log, Defects | Iteration Performance | Retrospective Asst., Report Asst. | • Provides insight into analytical aspects of ongoing iteration<br>• Helps to achieve Iteration goal<br>• Helps to effectively conduct daily meeting |
| Retrospective Assistant | Automated Assistant to conduct retrospective meeting | Iteration 1-N | DoD, DoR, Iteration Performance, Demo | Action Log | Agile Maturity Asst., Daily Meeting Asst. | • Provides insight into analytical aspects of completed iteration<br>• Improves agile processes, practices, effectiveness, morale, value<br>• Empower and energize team |
| Iteration Planning Assistant | Automated Assistant to conduct iteration planning meeting | Iteration 1-N | DoD, DoR, Prioritized Backlog | Iteration Backlog | Daily Meeting Asst., Retrospective Asst. | • Predicts story points, task and task efforts<br>• Improves productivity, effectiveness, accuracy of estimates<br>• Helps to align roadmap with actuals |
| Release Planning Assistant | Automated Assistant to conduct release planning meeting | Iteration 0 | DoR, Prioritized Backlog | DoD, Release Backlog | Iteration Planning | • Help design the roadmap for release.<br>• Provide high level Iteration backlog<br>• Predicts best case release date and worst case release date. |
| Backlog Assistant | Automated assistant to create, maintain and monitor backlog | Initiation & All phases | Epic Backlog | Prioritized Backlog | Release Planning, Iteration Planning | • Automated story creation.<br>• Helps in backlog dependency mapping<br>• Provides prioritized backlog for Release Planning/Grooming |

FIG. 2C

User Story:

Task:

| | | |
|---|---|---|
| I | -Dependency found on another story<Story No> with status <Open/closed> | - If dependency is not valid please remove the dependency.<br>- If dependency is valid then either prioritize other story as well or deprioritize this story. |
| I | -Dependency mentioned in Description | - If dependency is not valid please remove the dependency from Description.<br>- If dependency is valid then either prioritize other story as well or deprioritize this story |
| I | -Dependency mentioned in Acceptance Criteria | - If dependency is not valid please remove the dependency from Acceptance Criteria.<br>- If dependency is valid then either prioritize other story as well or deprioritize this story |
| I-ML | -Probable dependency found on another story<Story No> with status <Open/closed> | - If dependency is not valid please ignore the dependency<br>- If dependency is valid then either prioritize other story as well or deprioritize this story. |
| N | -Story Point Value is not provided or Story Point Value is not a natural number. | - Please provide story points or Please provide a natural number. |
| N | -Business Value is not provided or Story Business Value is not a natural number. | - Please provide Business Value or Please provide a natural number. |
| N | -No other story in the backlog has similar size hence this story can't be replaced with other story if required. | -Please decompose it into multiple stories. |
| V | -Business Value is missing in Story or Story Business Value is not a natural number | - Please provide business value. Or Please provide a natural number.<br>- Intelligent suggestion text -> Probable business value could be <>. |
| V | -User Story Title does not follow 'As a user... I want to ... so that...' Or text is missing text after 'So that'. | -Please provide user story title in recommended format 'As a user... I want to...so that...'. |
| E | -Story Title is not provided or too short | - Please provide story title in detail (minimum length configured is <32> characters) and in recommended format "As a user ... I want to ...so that...." |
| E | -Story Description is not provided or too short | - Please provide story description in detail (minimum length configured is <32> characters). |
| E | -Story Acceptance Criteria is not provided or too short | - Please provide acceptance criteria in detail (minimum length configured is <32> characters). |
| E-NLP | Story title, Story description and Story acceptance criteria does not comply with spelling and grammar checks | Please review story title, story description and story acceptance criteria for spelling and grammar. |
| S | -Story Point Value is not provided. Or Story size is Big. | - Story points assigned to the story are <20>, which is more than configured max story size <13>.<br>OR<br>- Story points assigned to the story are <20>, which is <15%> more than max delivered story size <13> in the past. |
| S-NLP | Story title and Story description does not comply with spelling and grammar checks | Please review story title and story description for spelling and grammar. |
| T | -Acceptance Criteria is not provided | - Please provide acceptance criteria in detail (minimum length configured is <32> characters). |
| T | -Acceptance Criteria is not is clearly written. | - Please revisit acceptance criteria of the user story and make it more detailed and clear by using recommended way like Given, When, Then or by using bullet points. |
| T | -User Story Title does not follow 'As a user...I want...So that...'. | - Please provide story title in recommended format "As a user ... I want to ...so that...." |

FIG. 8O

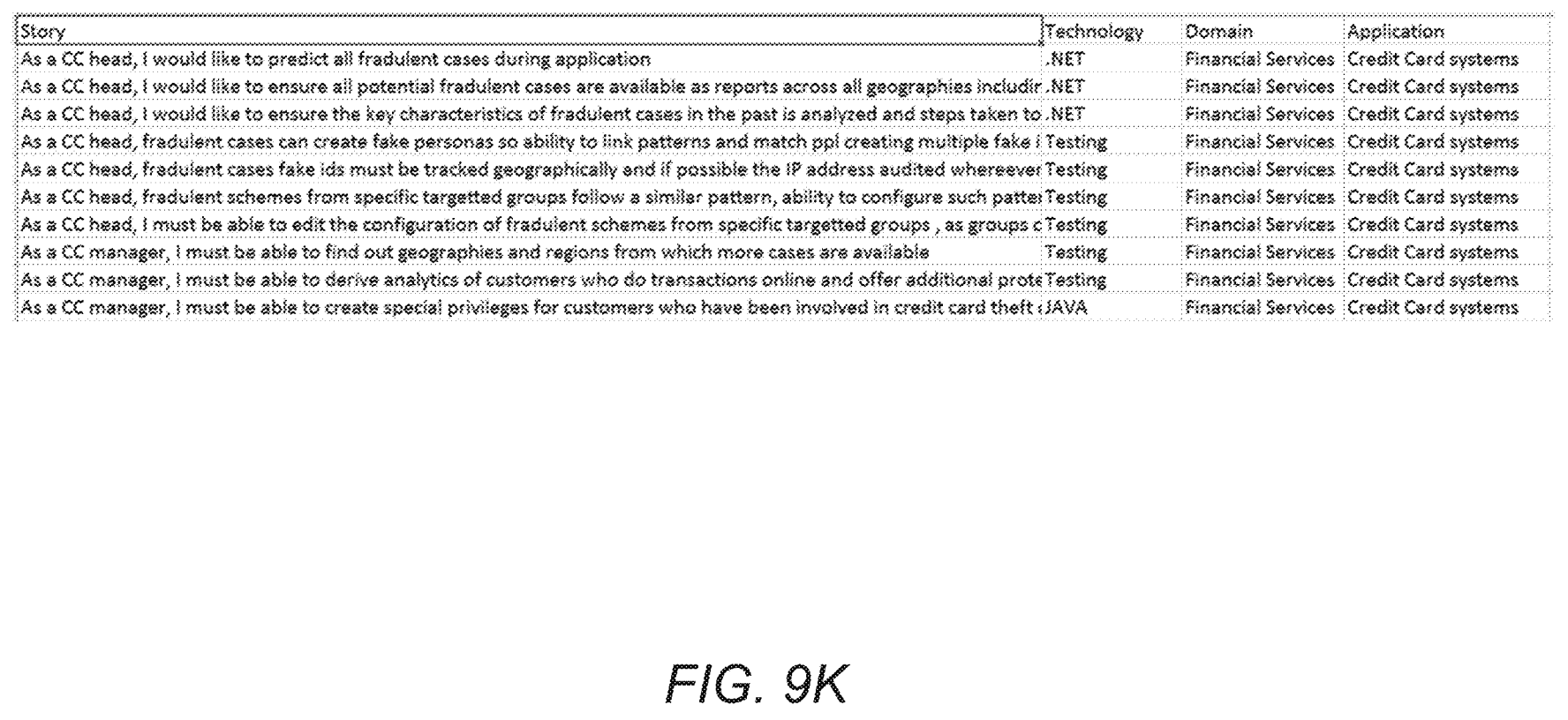

| Story | Technology | Domain | Application |
|---|---|---|---|
| As a CC head, I would like to predict all fradulent cases during application | .NET | Financial Services | Credit Card systems |
| As a CC head, I would like to ensure all potential fradulent cases are available as reports across all geographies includir | .NET | Financial Services | Credit Card systems |
| As a CC head, I would like to ensure the key characteristics of fradulent cases in the past is analyzed and steps taken to | .NET | Financial Services | Credit Card systems |
| As a CC head, fradulent cases can create fake personas so ability to link patterns and match ppl creating multiple fake i | Testing | Financial Services | Credit Card systems |
| As a CC head, fradulent cases fake ids must be tracked geographically and if possible the IP address audited whereever | Testing | Financial Services | Credit Card systems |
| As a CC head, fradulent schemes from specific targetted groups follow a similar pattern, ability to configure such patte | Testing | Financial Services | Credit Card systems |
| As a CC head, I must be able to edit the configuration of fradulent schemes from specific targetted groups , as groups c | Testing | Financial Services | Credit Card systems |
| As a CC manager, I must be able to find out geographies and regions from which more cases are available | Testing | Financial Services | Credit Card systems |
| As a CC manager, I must be able to derive analytics of customers who do transactions online and offer additional proté | Testing | Financial Services | Credit Card systems |
| As a CC manager, I must be able to create special privileges for customers who have been involved in credit card theft ( | JAVA | Financial Services | Credit Card systems |

FIG. 9K

| Project | StoryId | StoryDescription | Story Poin | Story Type | Sprint Dura | Planned S | Estimated | Actual ho | Schedule ( | Feature | Business R | Requirem | Owner | Priority | Notes | Dependen | Iteration |
|---|---|---|---|---|---|---|---|---|---|---|---|---|---|---|---|---|---|
| Bank of M | 86257 | As a CC head, I w | 13 | Functiona | 1 | ######## | 22 | 28 | Y | Internet B | Credit Car | Credit Car | banumath | Critical | Test Note | 86472 | Yes |
| Bank of M | 86257 | As a CC head, I w | 13 | Functiona | 1 | ######## | 23 | 28 | Y | Internet B | Credit Car | Credit Car | banumath | Critical | Test Note | | |
| Bank of M | 86257 | As a CC head, I w | 13 | Functiona | 1 | ######## | 22 | 28 | Y | Internet B | Credit Car | Credit Car | banumath | Critical | Test Note | | |
| Bank of M | 86257 | As a CC head, I w | 13 | Functiona | 1 | ######## | 22 | 28 | Y | Internet B | Credit Car | Credit Car | banumath | Critical | Test Note | 95622 | Yes |
| Bank of M | 86257 | As a CC head, I w | 13 | Functiona | 1 | ######## | 22 | 28 | Y | Internet B | Credit Car | Credit Car | banumath | Critical | Test Note | | |
| Bank of M | 86257 | As a CC head, I w | 13 | Functiona | 1 | ######## | 22 | 28 | Y | Internet B | Credit Car | Credit Car | banumath | Critical | Test Note | | |
| Bank of M | 86260 | As a CC head, I w | 21 | Functiona | 1 | ######## | 28 | 26 | Y | Internet B | Credit Car | Credit Car | banumath | Critical | Test Note | | |
| Bank of M | 86505 | As a CC head, I w | 2 | Functiona | 1 | ######## | 28 | 27 | Y | Internet B | Credit Car | Credit Car | banumath | High | Test Note | 86472 | |
| Bank of M | 86510 | As a CC head, fra | 0 | Functiona | 1 | ######## | 29 | 26 | Y | Internet B | Credit Car | Credit Car | n.devi.cha | High | Test Note | | |
| Bank of M | 86474 | As a CC head, fra | 2 | Functiona | 1 | ######## | 27 | 24 | Y | Internet B | Credit Car | Credit Car | john.mark | Medium | Test Note | | Yes |
| Bank of M | 86480 | As a CC head, fra | 5 | Functiona | 1 | ######## | 28 | 26 | N | Internet B | Credit Car | Credit Car | n.devi.cha | Medium | Test Note | | |

FIG. 9L

ARTIFICIAL INTELLIGENCE AND MACHINE LEARNING BASED PRODUCT DEVELOPMENT

PRIORITY

This application is a Non-Provisional Application of commonly assigned Indian Provisional Application Serial Number 201711028810, filed Aug. 14, 2017, the disclosure of which is hereby incorporated by reference in its entirety.

BACKGROUND

A variety of techniques may be used for project management, for example, in the area of product development. With respect to project management generally, a team may brainstorm to generate a project plan, identify personnel and equipment that are needed to implement the project plan, set a project timeline, and conduct ongoing meetings to determine a status of implementation of the project plan. The ongoing meetings may result in modifications to the project plan and/or modifications to the personnel, equipment, timeline, etc., related to the project plan.

BRIEF DESCRIPTION OF DRAWINGS

Features of the present disclosure are illustrated by way of example and not limited in the following figure(s), in which like numerals indicate like elements, in which:

FIG. 2B illustrates further details of the components listed in the logical layout of FIG. 2A in accordance with an example of the present disclosure;

FIG. 2C illustrates further details of the components listed in the logical layout of FIG. 2A in accordance with an example of the present disclosure;

FIG. 8O illustrates checks, observations, and recommendations for INVEST checking by the readiness assistant, in accordance with an example of the present disclosure;

FIG. 9K illustrates a sample mappingfile.csv file for the story viability predictor, in accordance with an example of the present disclosure;

FIG. 9L illustrates a sample trainingfile.csv file for the story viability predictor, in accordance with an example of the present disclosure;

DETAILED DESCRIPTION

Figure 1:
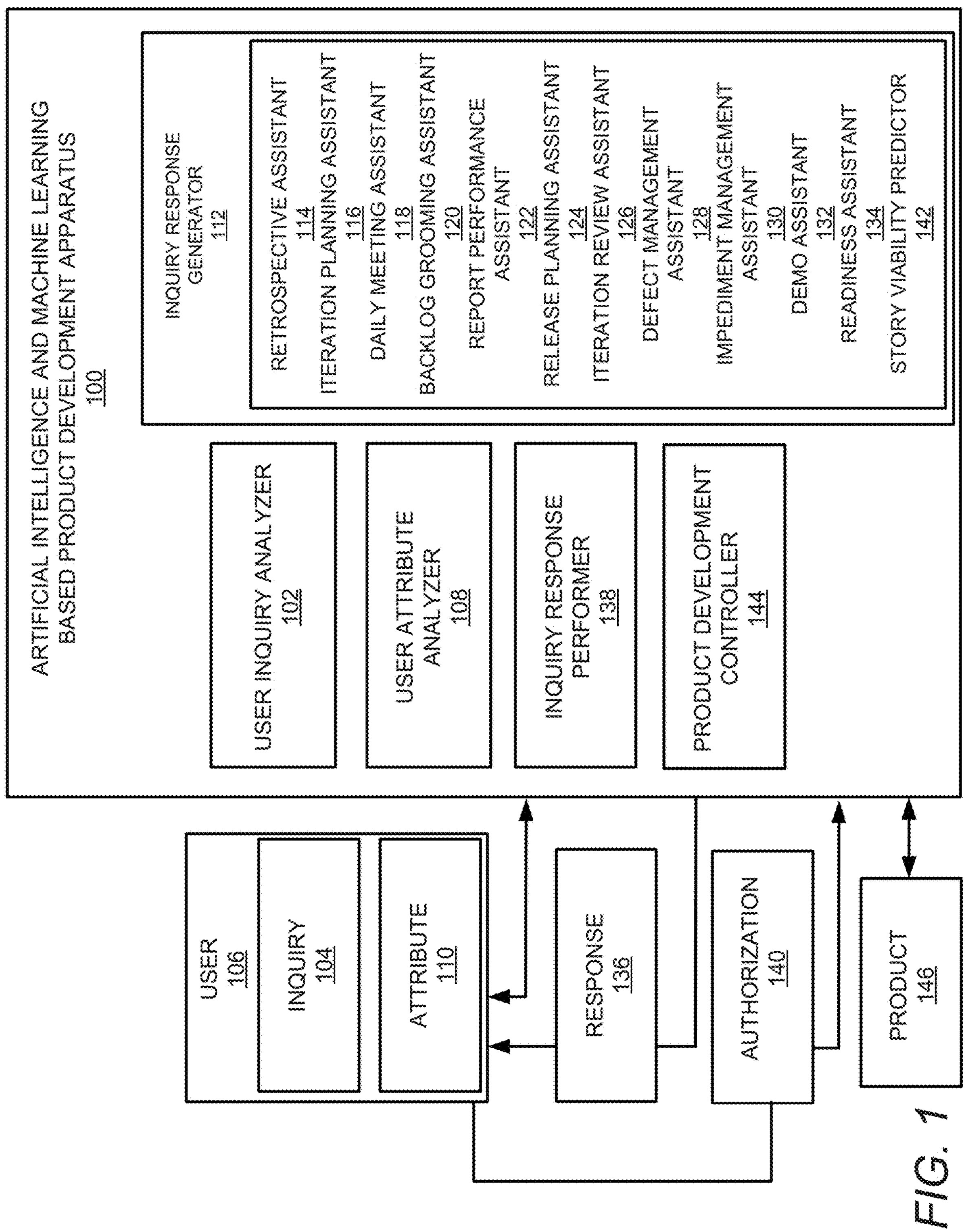
FIG. 1 illustrates a layout of an artificial intelligence and machine learning based product development apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Artificial intelligence and machine learning based product development apparatuses, methods for artificial intelligence and machine learning based product development, and non-transitory computer readable media having stored thereon machine readable instructions to provide artificial intelligence and machine learning based product development are disclosed herein. The apparatuses, methods, and non-transitory computer readable media disclosed herein provide for artificial intelligence and machine learning based product development by ascertaining an inquiry, by a user, related to a product that is to be developed or that is under development. The product may include a software or a hardware product. Artificial intelligence and machine learning based product development may further include ascertaining an attribute associated with the user, and analyzing, based on the ascertained attribute, the inquiry related to the product that is to be developed or that is under development. Artificial intelligence and machine learning based product development may further include determining, based on the analyzed inquiry, one or more virtual assistants that may include a retrospective assistant, an iteration planning assistant, a daily meeting assistant, a backlog grooming assistant, a report performance assistant, a release planning assistant, an iteration review assistant, a defect management assistant, an impediment management assistant, a demo assistant, a readiness assistant, and/or a story viability predictor, to respond to the inquiry. Artificial intelligence and machine learning based product development may further include generating, to the user, a response that includes the determination of the virtual assistant(s). Artificial intelligence and machine learning based product development may further include receiving, based on the generated response, authorization from the user to invoke the determined virtual assistant(s). Artificial intelligence and machine learning based product development may further include invoking, based on the authorization, the determined virtual assistant(s). Further, artificial intelligence and machine learning based product development may include controlling development of the product based on the invocation of the determined virtual assistant(s).

With respect to project management, in the area of software development, one technique includes agile project management. With respect to agile, distributed teams may practice agile within their organization. In distributed agile, a team may be predominately distributed (e.g., offshore, near-shore, and onshore). Agile adoption success factors may include understanding of core values and principles as outlined by an agile manifesto, extension of agile to suite an organization's need, transformation to new roles, and collaboration across support systems. Agile may emphasize discipline towards work on a daily basis, and empowerment of everyone involved to plan their activities. Agile may focus individual conversations to maintain a continuous flow of information within a team, and through implementation of ceremonies such as daily stand up, sprint planning, sprint review, backlog grooming and sprint retrospective sessions.

Teams practicing agile may encounter a variety of technical challenges, as well as challenges with respect to people and processes, governance, communication, etc. For example, teams practicing agile may encounter limited experience with agile due to the lack of time for "unlearning", and balancing collocation benefits versus distributed agile (e.g., scaling). Teams practicing agile may encounter incomplete stories leading to high onsite dependency, and work slow-down due to non-availability and/or limited access, for example, to a product owner and/or a Scrum Master where a team is distributed and scaled. Further, teams practicing agile may face technical challenges with respect to maintaining momentum with continuous progress of agile events through active participation, and maintaining quality of artefacts (e.g., backlog, burndown, impediment list, retrospective action log, etc.). Additional technical challenges may be related to organizations that perform projects for both local and international clients across multiple time zones with some team members working part time overseas. In this regard, the technical challenges may be amplified when a project demands for a team to practice distributed agile at scale since various members of a team may be located at different locations, and are otherwise unable to meet in a regular manner.

In order to address at least the aforementioned technical challenges, the apparatuses, methods, and non-transitory computer readable media disclosed herein provide for artificial intelligence and machine learning based product development in the context of an "artificial intelligence and machine learning based virtual assistant" that may provide guidance and instructions for development of a product. The artificial intelligence and machine learning based virtual assistant may be designated, for example, as a Scrum Assistant. The artificial intelligence and machine learning based virtual assistant may represent a virtual bot that may provide for the implementation of agile "on the fly", and for the gaining of expertise, for example, with respect to development of a product that may include any type of hardware (e.g., machine, etc.) and/or software product.

For example, with respect to product development, a Scrum Assistant as disclosed herein may be utilized for a team that is engaged in development of a product (software or hardware) using agile methodology. In this regard, the agile methodology framework may encourage a team to develop a product in an incremental and iterative manner, and in time boxed manner that may be designated as an iteration. The agile methodology framework may include a set of ceremonies to be performed, description of roles, and responsibilities, and artefacts to be developed within an iteration. By following the framework, a team may be expected to build a potentially shippable increment (PSI) of a product at the end of every iteration. As these time-boxes may be relatively short in nature (e.g., from 1 week to 5 weeks, etc.), a team may find it technically challenging to follow all of the processes within an iteration described by the agile methodology, and thus face a risk of failing to deliver a potentially shippable increment for a product.

In order to address at least the aforementioned further technical challenges, the apparatuses, methods, and non-transitory computer readable media disclosed herein may provide for the generation of end to end automations of product development that may include implementation of a build automation path for faster delivery of user stories (e.g., this may be implemented by the combination of a readiness assistant, a release planning assistant, and a story viability predictor as disclosed herein). In this regard, the various assistants and predictors as disclosed herein may provide for a user to selectively link a plurality of assistants dynamically, and deployment of the linked assistants towards the development of a product.

According to another example of application of the apparatuses, methods, and non-transitory computer readable media disclosed herein, the apparatuses, methods, and non-transitory computer readable media disclosed herein may provide for building of a list of requirements which requires urgent attention (where functionalities of a readiness assistant and a backlog grooming assistant, as disclosed herein, may be combined).

According to another example of application of the apparatuses, methods, and non-transitory computer readable media disclosed herein, the apparatuses, methods, and non-transitory computer readable media disclosed herein may provide for influencing of priority of a requirement during a sprint planning meeting (where functionalities of a readiness assistant, a story viability predictor, and an iteration planning assistant, as disclosed herein, may be combined).

According to another example of application of the apparatuses, methods, and non-transitory computer readable media disclosed herein, the apparatuses, methods, and non-transitory computer readable media disclosed herein may provide for line-up of requirements for demonstration to a user (where functionalities of a daily meeting assistant, an iteration review assistant, and a demo assistant, as disclosed herein, may be combined).

According to another example of application of the apparatuses, methods, and non-transitory computer readable media disclosed herein, the apparatuses, methods, and non-transitory computer readable media disclosed herein may provide for generation of reports for an organization by pulling details from all of the assistants as disclosed herein, and feeding the details to a report performance assistant as disclosed herein.

Thus, the apparatuses, methods, and non-transitory computer readable media disclosed herein may provide for a one stop solution to visualize ways which facilitate the development of a product, for example, by providing users with the option of building solutions on the go by dynamically linking various assistants to derive automated paths. In this regard, a user may have option of subscribing to all or a subset of assistants as disclosed herein.

The artificial intelligence and machine learning based virtual assistant may provide for the handover of certain agile tasks to the virtual bot, to thus provide time for productive work.

The artificial intelligence and machine learning based virtual assistant may provide an online guide that may be used to perform an agile ceremony as per best practices, or delivery of quality agile deliverables that meet Definition of Ready (DoR) and Definition of Done (DoD) requirements.

The artificial intelligence and machine learning based virtual assistant may provide for insights provided by the virtual bot to effectively drive agile ceremonies, and facilitate creation of quality deliverables.

The artificial intelligence and machine learning based virtual assistant may provide historical information that may be used to predict the future, and correction of expectations when needed.

The artificial intelligence and machine learning based virtual assistant may provide for analysis of patterns, relations, and/or co-relations of historical and transactional data of a project to diagnose the root cause.

The artificial intelligence and machine learning based virtual assistant may provide for standardization of agile practices while scaling in a distributed manner.

The artificial intelligence and machine learning based virtual assistant may provide virtual bot analysis to be used as a medium to enable conversation starters.

The artificial intelligence and machine learning based virtual assistant may provide for use of the virtual bot as a medium of agile artefact repository.

The artificial intelligence and machine learning based virtual assistant may combine the capabilities of artificial intelligence, analytics, machine learning, and agile processes.

The artificial intelligence and machine learning based virtual assistant may implement the execution of repetitive agile activities and processes.

The artificial intelligence and machine learning based virtual assistant may be customizable to support uniqueness of different teams and products.

The artificial intelligence and machine learning based virtual assistant may provide benefits such as scaling of Scrum Masters in an organization by rapidly increasing the learning curve of first time Scrum Masters.

The artificial intelligence and machine learning based virtual assistant may provide productivity increase by performing various time taking processes and activities.

The artificial intelligence and machine learning based virtual assistant may provide for augmentation of human decision making by providing insights, predictions, and recommendations utilizing historical data.

The artificial intelligence and machine learning based virtual assistant may provide uniformity and standardization based on a uniform platform for teams, independent of different application lifecycle management (ALM) tools used for data management.

The artificial intelligence and machine learning based virtual assistant may provide for standardization of agile processes across different teams.

The artificial intelligence and machine learning based virtual assistant may provide continuous improvement by highlighting outliers that are to be analyzed, and facilitating focusing on productive work for continuous improvement.

The artificial intelligence and machine learning based virtual assistant may provide customization capabilities to support diversity and uniqueness of different teams.

The artificial intelligence and machine learning based virtual assistant may provide for the following of agile processes and practices in a correct manner to make such processes and practices more effective.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example artificial intelligence and machine learning based product development apparatus (hereinafter also referred to as "apparatus 100").

Referring to FIG. 1, the apparatus 100 may include a user inquiry analyzer 102 that is executed by at least one hardware processor (e.g., the hardware processor 1302 of FIG. 13, and/or the hardware processor 1504 of FIG. 15) to ascertain an inquiry 104 by a user 106. The inquiry 104 may be in the form of a statement to perform a specified task, a question on how a specified task may be performed, and generally, any communication by the user 106 with the apparatus 100 to utilize a functionality of the apparatus 100. For example, the inquiry may be related to a product 146 that is to be developed or that is under development.

A user attribute analyzer 108 that is executed by at least one hardware processor (e.g., the hardware processor 1302 of FIG. 13, and/or the hardware processor 1504 of FIG. 15) may ascertain an attribute 110 associated with the user 106. For example, the attribute 110 may represent a position of the user 106 as a Scrum master, a product owner, a delivery lead, and any other attribute of the user 106 that may be used to select a specified functionality of the apparatus 100.

An inquiry response generator 112 that is executed by at least one hardware processor (e.g., the hardware processor 1302 of FIG. 13, and/or the hardware processor 1504 of FIG. 15) may analyze, based on the ascertained attribute 110, the inquiry 104 by the user 106. That is, the inquiry response generator 112 may analyze the inquiry related to the product 146 that is to be developed or that is under development. Further, the inquiry response generator 112 may determine, based on the analyzed inquiry 104, a retrospective assistant 114, an iteration planning assistant 116, a daily meeting assistant 118, a backlog grooming assistant 120, a report performance assistant 122, a release planning assistant 124, an iteration review assistant 126, a defect management assistant 128, an impediment management assistant 130, a demo assistant 132, a readiness assistant 134, and/or a story viability predictor 142, to respond to the inquiry 104. Further, the inquiry response generator 112 may generate, to the user, a response 136 that includes the determination of the retrospective assistant 114, the iteration planning assistant 116, the daily meeting assistant 118, the backlog grooming assistant 120, the report performance assistant 122, the release planning assistant 124, the iteration review assistant 126, the defect management assistant 128, the impediment management assistant 130, the demo assistant 132, the readiness assistant 134, and/or the story viability predictor 142.

An inquiry response performer 138 that is executed by at least one hardware processor (e.g., the hardware processor 1302 of FIG. 13, and/or the hardware processor 1504 of FIG. 15) may receive, based on the generated response 136 to the inquiry 104 by the user 106, authorization 140 from the user 106 to invoke the determined retrospective assistant 114, the iteration planning assistant 116, the daily meeting assistant 118, the backlog grooming assistant 120, the report performance assistant 122, the release planning assistant 124, the iteration review assistant 126, the defect management assistant 128, the impediment management assistant 130, the demo assistant 132, the readiness assistant 134, and/or a story viability predictor 142. Further, the inquiry response performer 138 may invoke, based on the authorization 140, the determined retrospective assistant 114, the iteration planning assistant 116, the daily meeting assistant 118, the backlog grooming assistant 120, the report performance assistant 122, the release planning assistant 124, the iteration review assistant 126, the defect management assistant 128, the impediment management assistant 130, the demo assistant 132, the readiness assistant 134, and/or a story viability predictor 142.

A product development controller 144 that is executed by at least one hardware processor (e.g., the hardware processor 1302 of FIG. 13, and/or the hardware processor 1504 of FIG. 15) may control development of the product 146 based on the invocation of the determined retrospective assistant 114, the iteration planning assistant 116, the daily meeting assistant 118, the backlog grooming assistant 120, the report performance assistant 122, the release planning assistant 124, the iteration review assistant 126, the defect management assistant 128, the impediment management assistant 130, the demo assistant 132, the readiness assistant 134, and/or the story viability predictor 142.

Figure 2A:
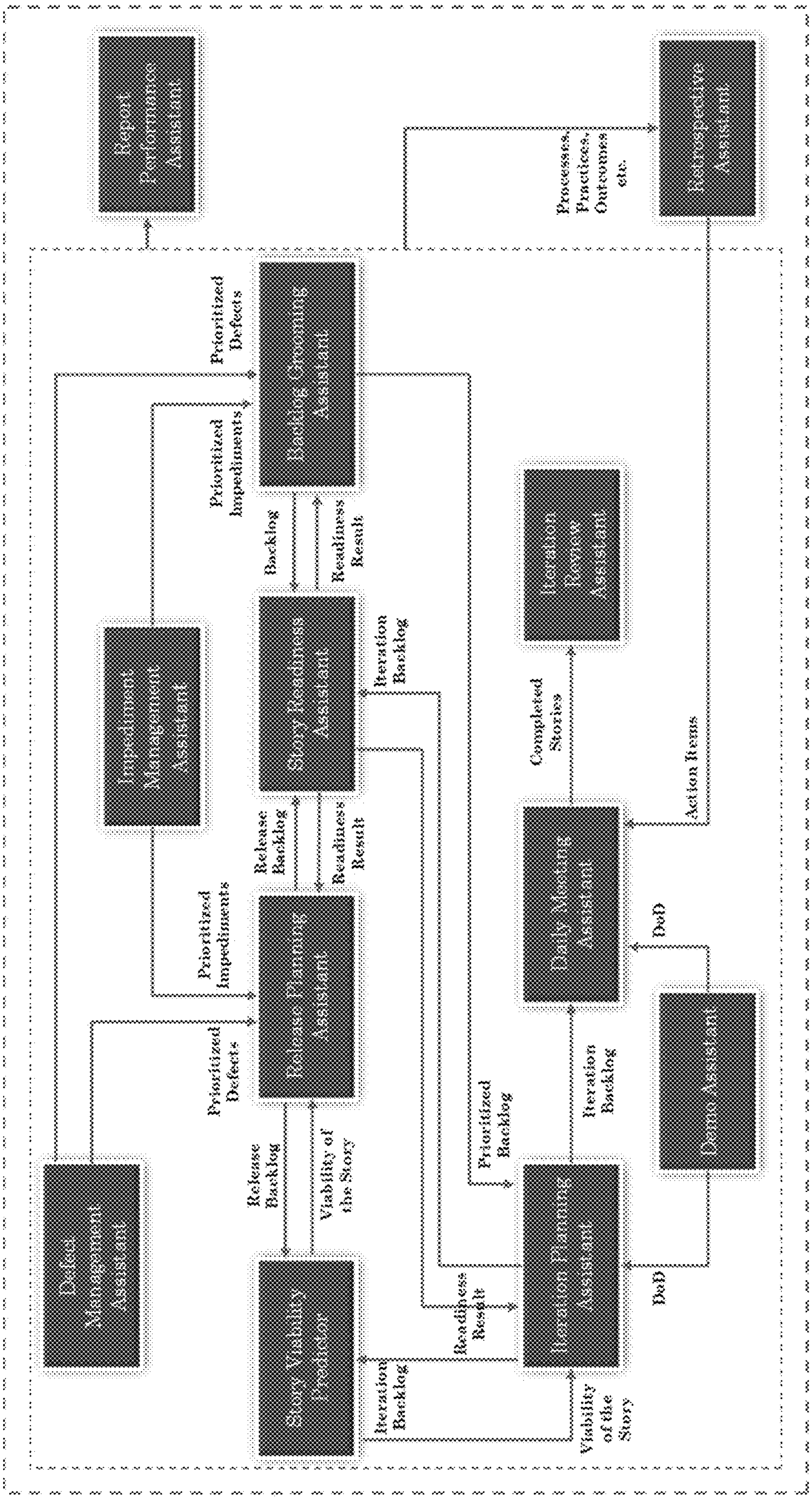
FIG. 2A illustrates a logical layout of the artificial intelligence and machine learning based product development apparatus of FIG. 1 in accordance with an example of the present disclosure.

FIG. 2A illustrates a logical layout of the apparatus 100 in accordance with an example of the present disclosure. FIG. 2B illustrates further details of the components listed in the logical layout of FIG. 2A in accordance with an example of the present disclosure. FIG. 2C illustrates further details of the components listed in the logical layout of FIG. 2A in accordance with an example of the present disclosure.

Referring to FIGS. 1-2C, the retrospective assistant 114 that is executed by at least one hardware processor (e.g., the hardware processor 1302 of FIG. 13, and/or the hardware processor 1504 of FIG. 15) is to retrospect an iteration, and seek to foster continuous improvement. Further, the retrospective assistant 114 may provide for improvement of a team function, so as to improve team performance. An Iteration may be described as a time-box of a specified time duration (e.g., one month or less). Iterations may include consistent durations. A new Iteration may start immediately after the conclusion of a previous Iteration. With respect to agile, Scrum teams may plan user stories (e.g., plans of what needs to be done) for this fixed duration. Retrospection of an iteration may be described as a discussion of "what went well" and "what didn't go well" during that Iteration.

Figure 3A:
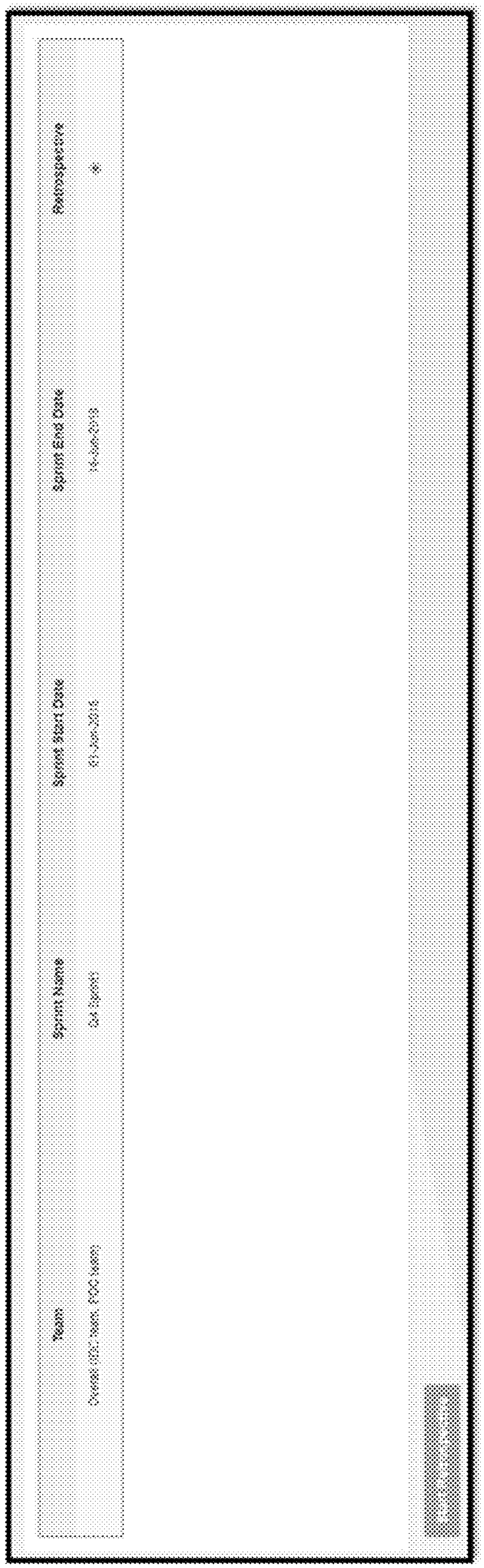
FIGS. 3A-3E illustrate examples of retrospection in accordance with an example of the present disclosure.
Figure 3B:
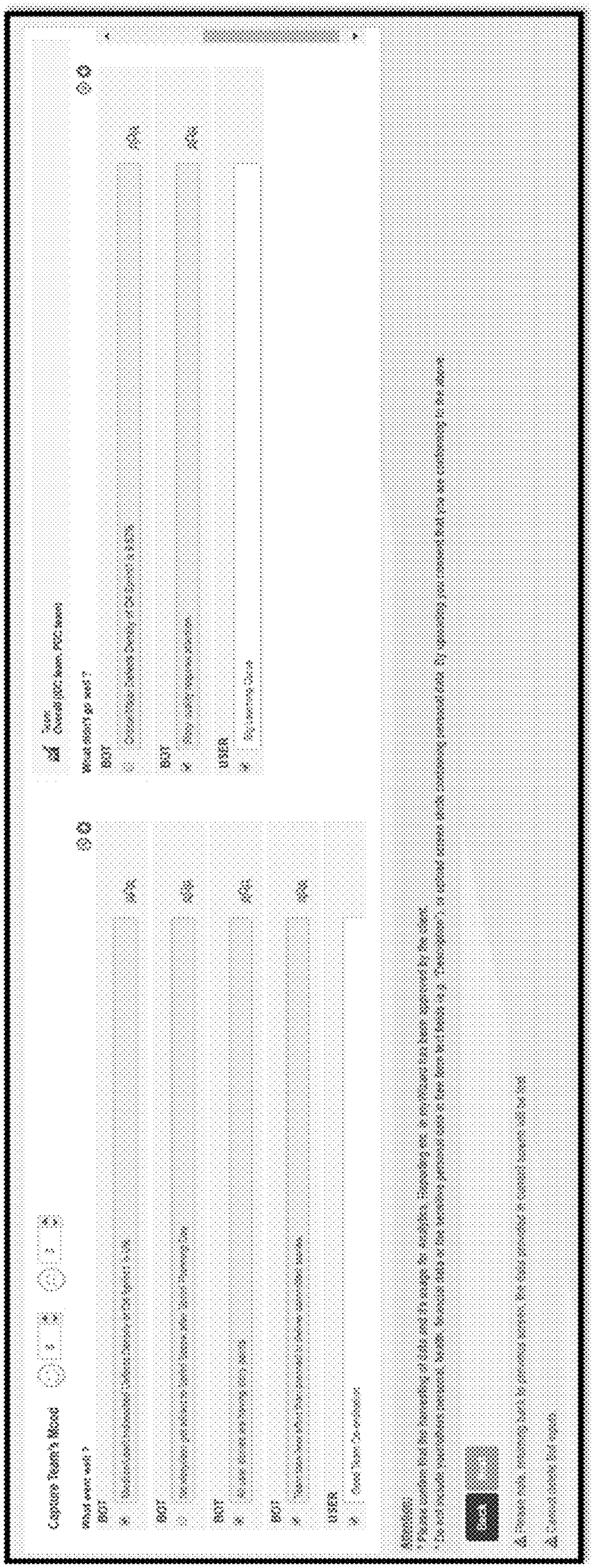
Figure 3C:
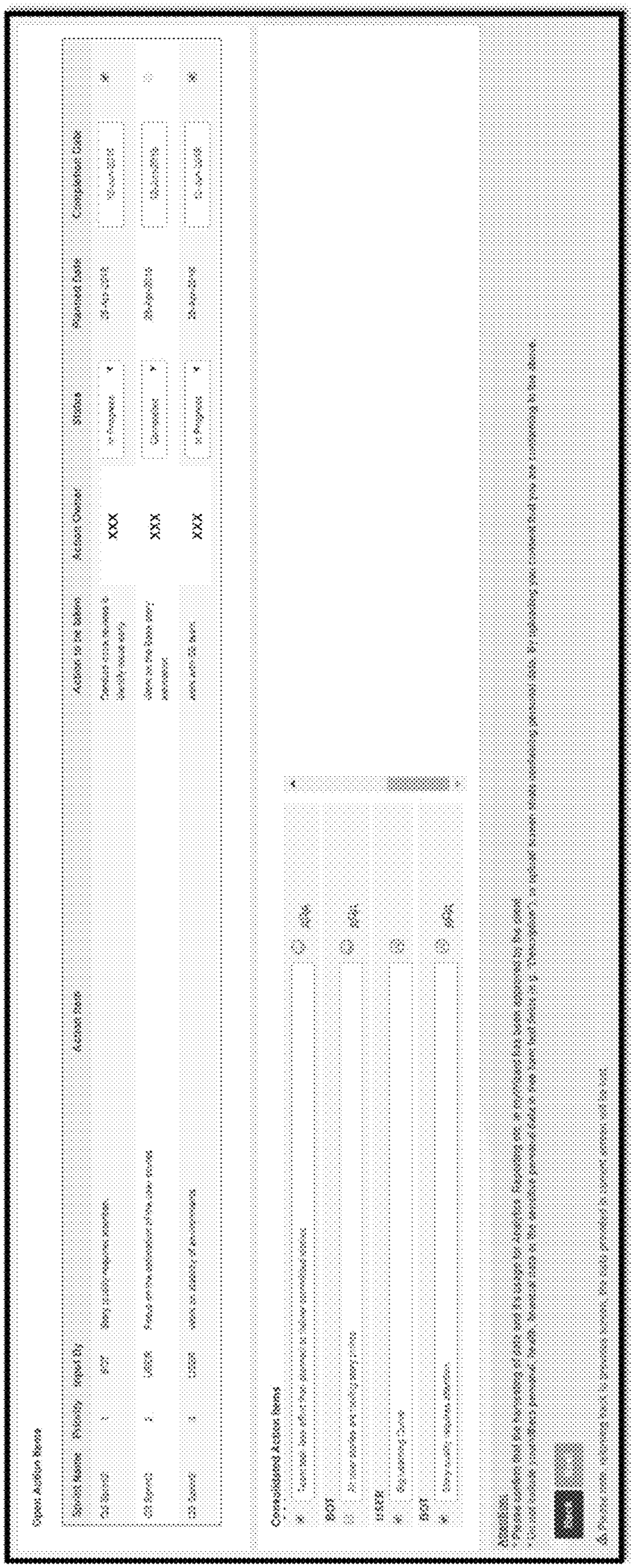
Figure 3D:
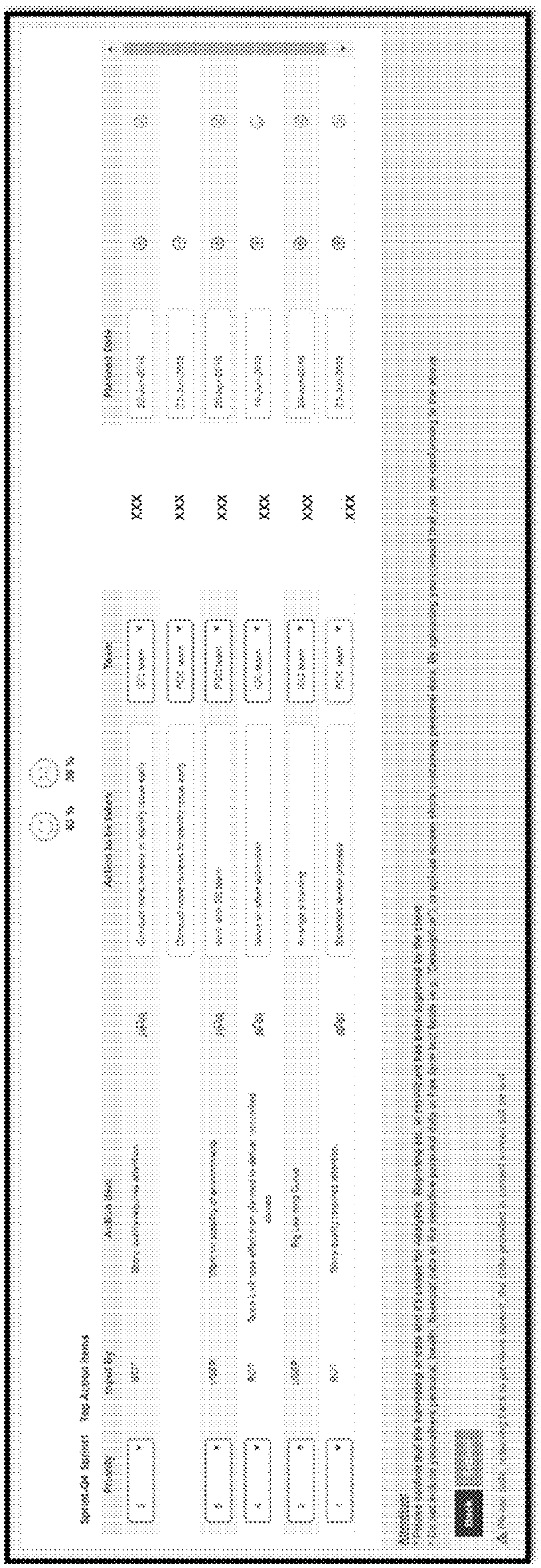
Figure 3E:
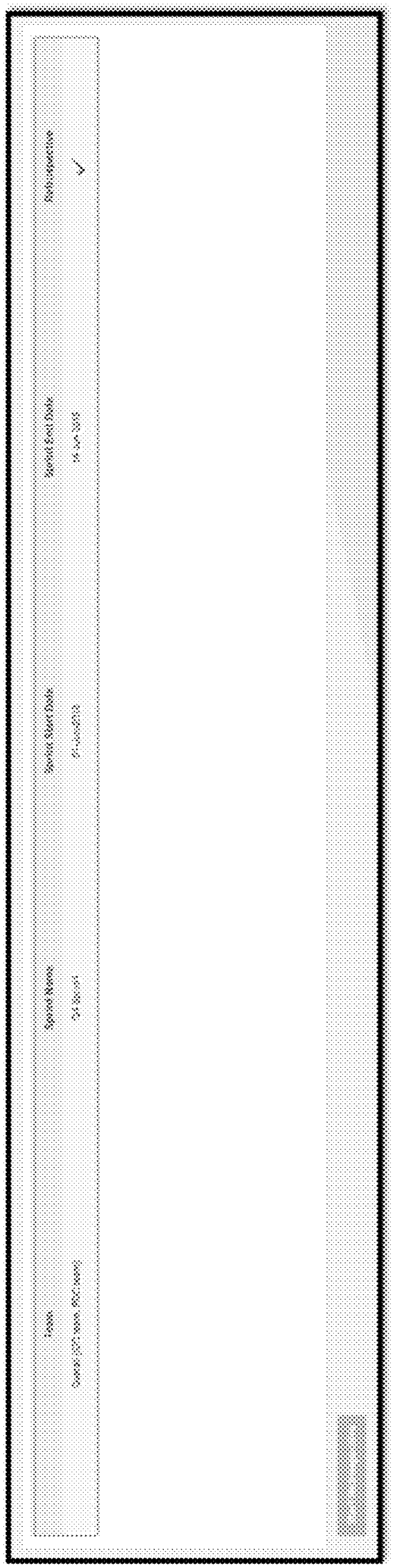

The retrospective assistant 114 may analyze iteration data and provide for intelligent suggestions on possible improvements. Iteration data may include, for example, user stories, defects, and tasks planned for that particular iteration. The retrospective assistant 114 may analyze iteration data by performing rules and formula-based calculations, which may be configured by the user 106. In this regard, FIGS. 3A-3E illustrate examples of retrospection in accordance with an example of the present disclosure. FIG. 3A describes allowing a user to select an iteration to conduct iteration planning. FIG. 3B describes segregation of suggestions provided by a BOT into two different categories ('What went well' and 'What didn't go well'). Further, FIG. 3B describes allowing a user to capture how many team members are satisfied or not satisfied with an iteration. FIG. 3C describes display of all open action items for this team and selected action items from the previous FIG. 3B. FIG. 3D describes all action items selected from previous FIG. 3C, and allows a user to save these action items. FIG. 3E describes that retrospective for this iteration is completed.

The retrospective assistant 114 may provide for conducting of a retrospective meeting, analysis of iteration performance on quantitative basis, capturing of a Scrum team's mood or morale, highlighting of open action items of previous retrospectives, and capturing of outcomes of a retrospective session. The retrospective assistant 114 may analyze iteration data by performing rules and formula-based calculations that may be configured, for example, by the user 106. With reference to FIG. 3B, a user interface may help the user 106 to capture a team's mood or morale. The retrospective assistant 114 may determine, for example, by using a database, which action items are open for that team and display those items on the user interface. The user interface may facilitate the capturing of outcomes (action items) of a retrospective, and saving of the captured outcomes to a database. Thus, the retrospective assistant 114 may improve efficiency, reduce efforts, foster continuous improvement, and provide for a guided approach to Scrum processes.

Figure 3F:
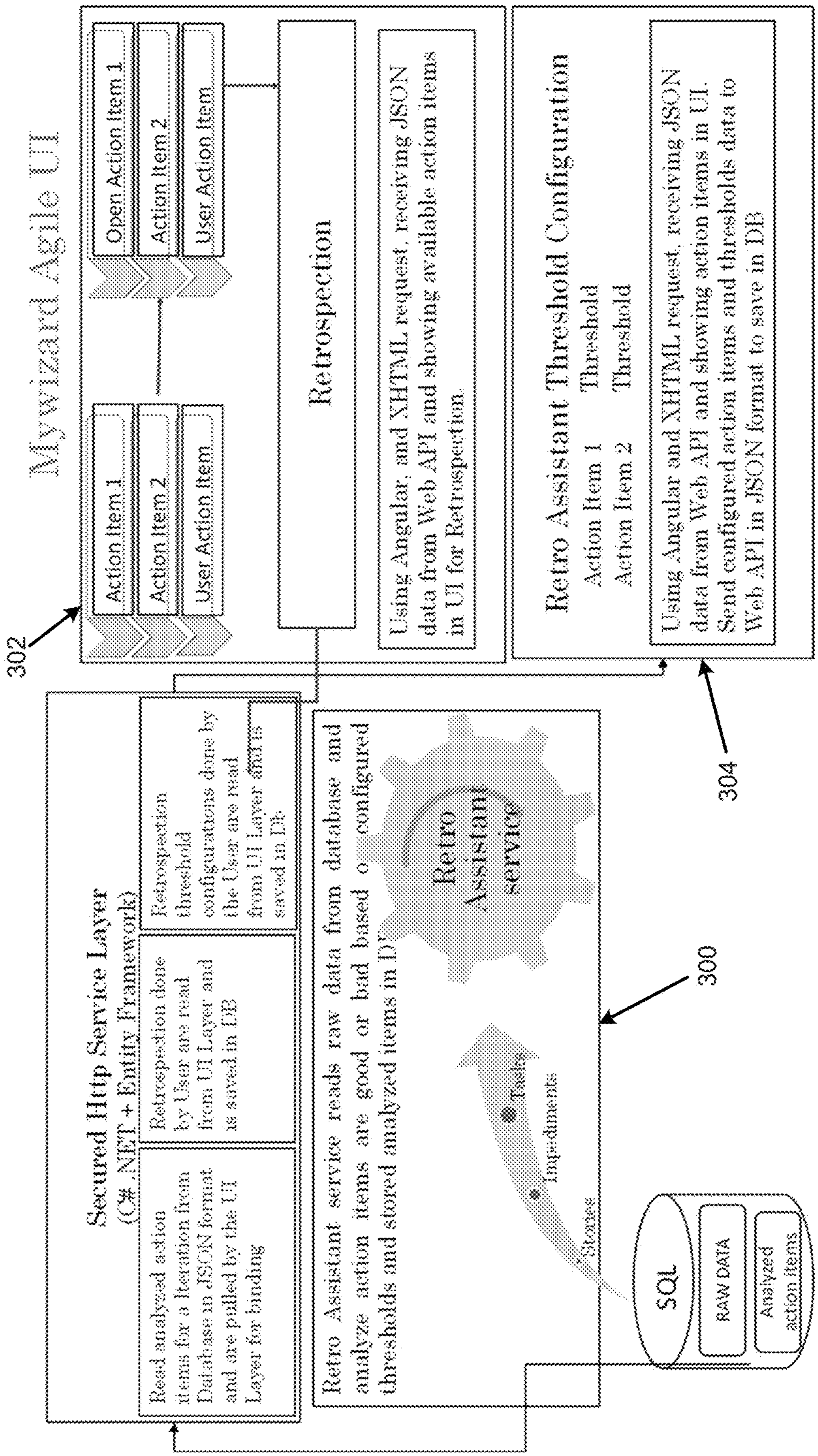
FIG. 3F illustrates a technical architecture of a retrospective assistant in accordance with an example of the present disclosure.

FIG. 3F illustrates a technical architecture of the retrospective assistant 114 in accordance with an example of the present disclosure.

Referring to FIG. 3F, for the retrospective assistant 114, the inquiry response performer 138 may ascertain iteration data associated with a product development plan associated with the product 146, identify, based on an analysis of the iteration data, action items associated with the product development plan, and compare each of the action items to a threshold. Further, the inquiry response performer 138 may determine, based on the comparison of each of the action items to the threshold, whether each of the action items meets or does not meet a predetermined criterion. In this regard, the product development controller 144 may modify, for an action item of the action items that does not meet the predetermined criterion, the product development plan. Further, the product development controller 144 may control, based on the modified product development plan, development of the product based on a further invocation of the retrospective assistant 114, the iteration planning assistant 116, the daily meeting assistant 118, the backlog grooming assistant 120, the report performance assistant 122, the release planning assistant 124, the iteration review assistant 126, the defect management assistant 128, the impediment management assistant 130, the demo assistant 132, the readiness assistant 134, and/or the story viability predictor 142.

At 300 of FIG. 3F, the retrospective assistant 114 may read data from a database, such as a SQL database, determine whether suggestions determined by assistants are good or bad based on a configured threshold, and store the analyzed items in the SQL database. The retrospective assistant 114 may analyze iteration data by performing rules and formula-based calculations that may be configured by the user 106, and compare the calculated value with a threshold value set, for example, by the user 106 to determine a good or bad suggestion.

With respect to the aforementioned analysis of the iteration data performed by the retrospective assistant 114, the retrospective assistant 114 may perform the following analysis.

Specifically, with respect to commitment accuracy percentage, the retrospective assistant 114 may perform the following analysis.

Commitment Accuracy Percentage:

1)=(Total story points delivered for Sprint-N/Total story points committed for Sprint-N)*100
   - a) If >=90% then will be part of "what went well"
     - i. Message: "Overall Commitment Accuracy of Sprint-N is <% value>."
   - b) If <90% then will be part of "what didn't go well"
     - i. Message: "Overall Commitment Accuracy of Sprint-N is <% value>."

2)=(Total must have story points delivered for Sprint-N/Total must have story points committed for Sprint-N)*100
   - a) If >=100% then will be part of "what went well"
     - i. Message: "Must Have Commitment Accuracy of Sprint-N is <% value>."
   - b) If <100% then will be part of "what didn't go well"
     - i. Message: "Must Have Commitment Accuracy of Sprint-N is <% value>."

With respect to effort estimation accuracy percentage, the retrospective assistant 114 may perform the following analysis.

Effort Estimation Accuracy Percentage:

1)=(Total "PlannedHours" for Sprint-N/Total "ActualHours" for Sprint-N)*100
   - c) If >=90% then will be part of "what went well"
     - i. Message: "Overall Effort Estimation Accuracy of Sprint-N is <% value>."
   - d) If <90% then will be part of "what didn't go well"
     - i. Message: "Overall Effort Estimation Accuracy of Sprint-N is <% value>."

2)=(Total "PlannedHours" for must have stories Sprint-N/Total "ActualHours" for must have stories Sprint-N)*100
   - e) If >=100% then will be part of "what went well"
     - i. Message: "Must Have Effort Estimation Accuracy of Sprint-N is <% value>."
   - f) If <100% then will be part of "what didn't go well"
     - i. Message: "Must Have Effort Estimation Accuracy of Sprint-N is <% value>."

With respect to defects density, the retrospective assistant 114 may perform the following analysis.

Defects Density:

1)=(Total critical/major severity defects raised against stories of Sprint-N/Total story points for Sprint-N)
   - g) If <=1 then will be part of "what went well"
     - i. Message: "Critical/Major Severity Defects Density of Sprint-N is <value>."
   - h) If >1 then will be part of "what didn't go well"
     - i. Message: "Critical/Major Severity Defects Density of Sprint-N is <value>."

2)=(Total medium/low/unclassified severity defects raised against stories of Sprint-N/Total story points for Sprint-N)
   - i) If <=10 then will be part of "what went well"
     - i. Message: "Medium/Low/Unclassified Severity Defects Density of Sprint-N is <value>."
   - j) If >10 then will be part of "what didn't go well"
     - i. Message: "Medium/Low/Unclassified Severity Defects Density of Sprint-N is <value>."

With respect to planned hours, the retrospective assistant 114 may perform the following analysis.

Planned Hours:

1)=Total number of tasks without planned hours for Sprint-N a) If =0 then will be part of "what went well"

i. Message: "All tasks are having planned hours."

b) If >0 then will be part of "what didn't go well"

i. Message: "<Number> tasks are not having planned hours."

With respect to actual hours, the retrospective assistant 114 may perform the following analysis.

Actual Hours:

1)=Total number of tasks without actual hours for Sprint-N c) If =0 then will be part of "what went well"

i. Message: "All tasks are having actual hours."

d) If >0 then will be part of "what didn't go well"

i. Message: "<Number> tasks are not having actual hours."

With respect to scope change, the retrospective assistant 114 may perform the following analysis.

Scope Change:

1)=Number of stories added after Sprint Planning Day.

a) If =0 then will be part of "what went well"

i. Message: "No story got added to Sprint Scope after Sprint Planning Day."

b) If >0 then will be part of "what didn't go well"

i. Message: "<Number> story/ies got added to Sprint Scope after Sprint Planning Day."

With respect to first time right story percentage trend, the retrospective assistant 114 may perform the following analysis.

First Time Right Story Percentage Trend: (Last 3 Sprints)

1)=(Total number of user stories completed for last 3 sprints with no defect associated to it/Total number of user stories completed for last 3 sprints)*100 c) If increasing trend then will be part of "what went well"

i. Message: "Increasing trend of First Time Right Story Percentage."

d) If decreasing trend then will be part of "what didn't go well"

i. Message: "Decreasing trend of First Time Right Story Percentage."

With respect to story priority, the retrospective assistant 114 may perform the following analysis.

Story Priority:

1)=Total number of user stories without story priority for Sprint-N a) If =0 then will be part of "what went well"

i. Message: "All user stories are having story priority."

b) If >0 then will be part of "what didn't go well"

i. Message: "<Number> stories are not having story priority."

With respect to story points, the retrospective assistant 114 may perform the following analysis.

Story Points:

1)=Total number of user stories without story points for Sprint-N a) If =0 then will be part of "what went well"

i. Message: "All user stories are having story points."

b) If >0 then will be part of "what didn't go well"

i. Message: "<Number> stories are not having story points."

At 302, the retrospective assistant 114 may display available action items in a user interface for retrospection. An action item may be described as a task or activity identified during retrospective for further improvement of velocity/quality/processes/practices, which may need to be accomplished within a defined timeline.

At 304, the retrospective assistant 114 may forward configured action items and thresholds data for saving in a database, such as a SQL database.

Referring to FIGS. 1-2C, the iteration planning assistant 116 that is executed by at least one hardware processor (e.g., the hardware processor 1302 of FIG. 13, and/or the hardware processor 1504 of FIG. 15) may provide for performance of iteration planning aligned with a release and product roadmap. The iteration planning assistant 116 may reduce the time needed for work estimation, and provide for additional time to be spent on understanding an iteration goal, priorities and requirements. The iteration planning assistant 116 may receive as input DoD and prioritized backlog, and generate as output a sprint backlog. The output of the iteration planning assistant 116 may be received by the daily meeting assistant 118.

The iteration planning assistant 116 may leverage machine learning capabilities to perform iteration planning and to predict tasks and associated efforts. Iteration planning may be described as one agile ceremony. Iteration planning may represent a collaborative effort of a product owner, a Scrum team, and a Scrum master. The Scrum master may facilitate a meeting. The product owner may share the planned iteration backlog and clarify the queries of the Scrum team. The Scrum team may understand the iteration backlog, identify user stories that can be delivered in that iteration, and facilitate identification of tasks against each user story and efforts required to complete those tasks. With respect to the iteration planning assistant 116, machine learning may be used to predict task types and associated efforts. In this regard, the iteration planning assistant 116 may ascertain data of user stories and tasks for a project which has completed at least two iterations. The iteration planning assistant 116 may pre-process task title and description, user story title and description (e.g., by stop words removal, stemming, tokenizing, normalizing case, removal of special characters). The iteration planning assistant 116 may label the task title and task description for task type, by using a keyword with K-Nearest neighbors, where the keywords list may be provided by a domain expert. The iteration planning assistant 116 may utilize an exponential smoothing model (time series) to predict estimated hours for tasks.

Figure 4A:
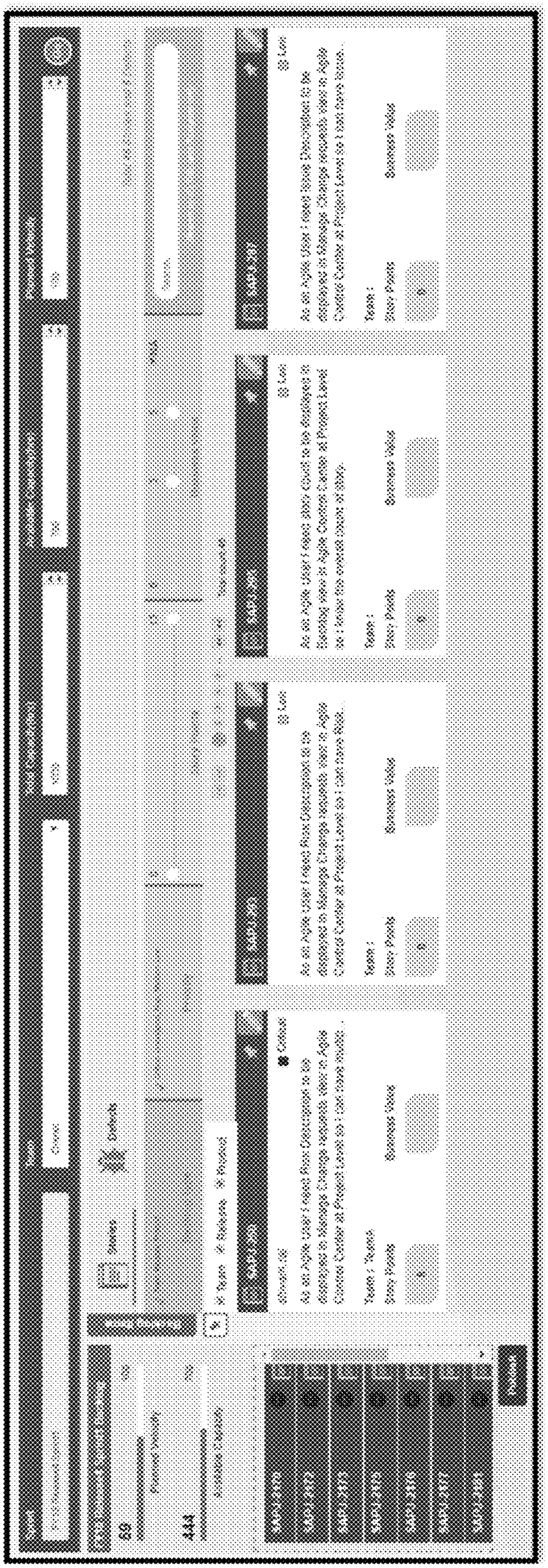
FIGS. 4A-4F illustrate examples of iteration planning in accordance with an example of the present disclosure.
Figure 4B:
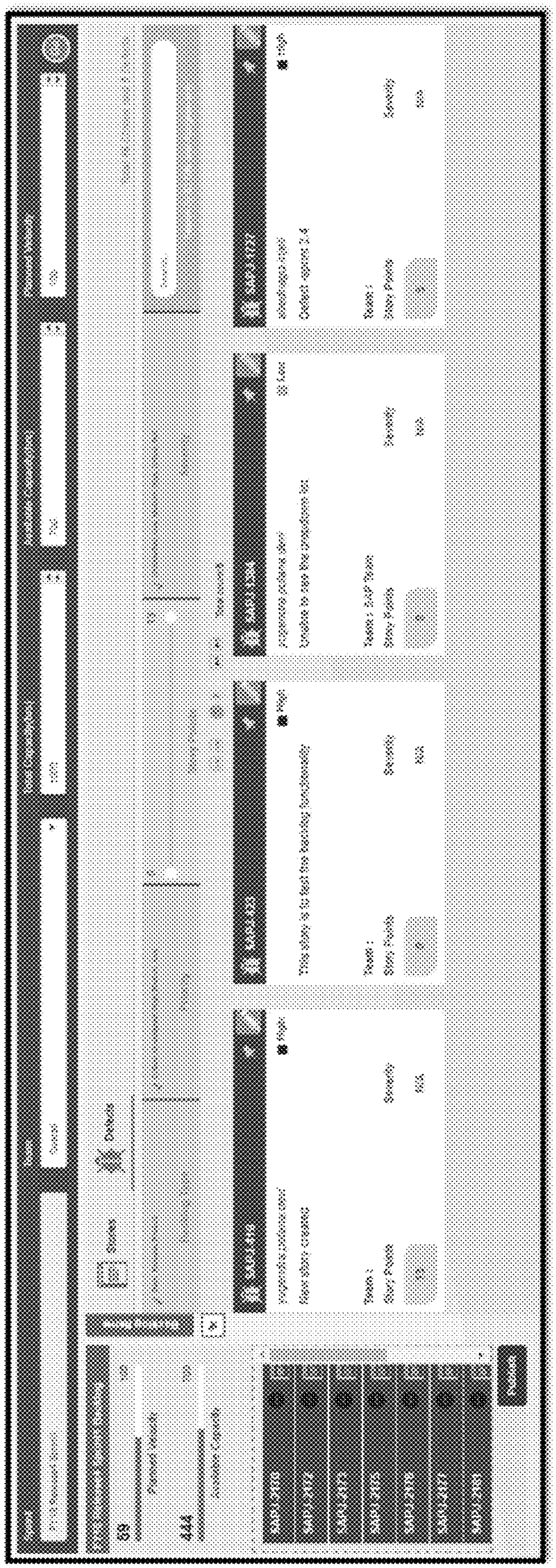
Figure 4C:
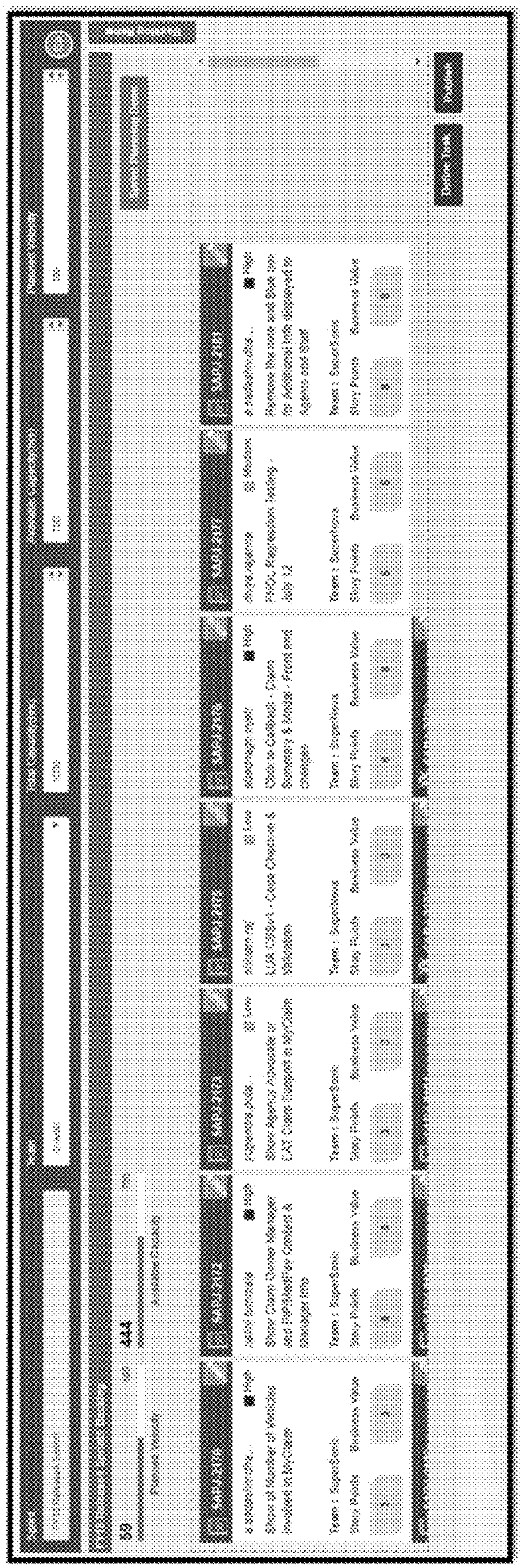
Figure 4D:
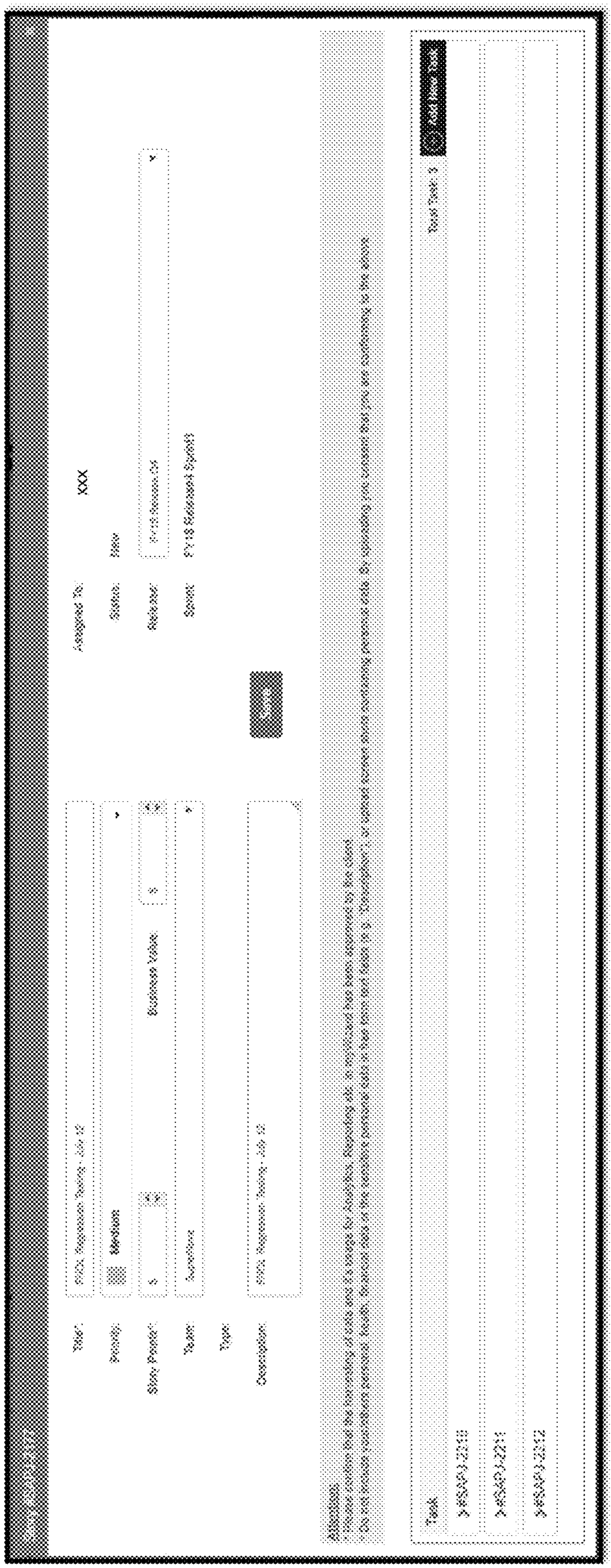
Figure 4E:
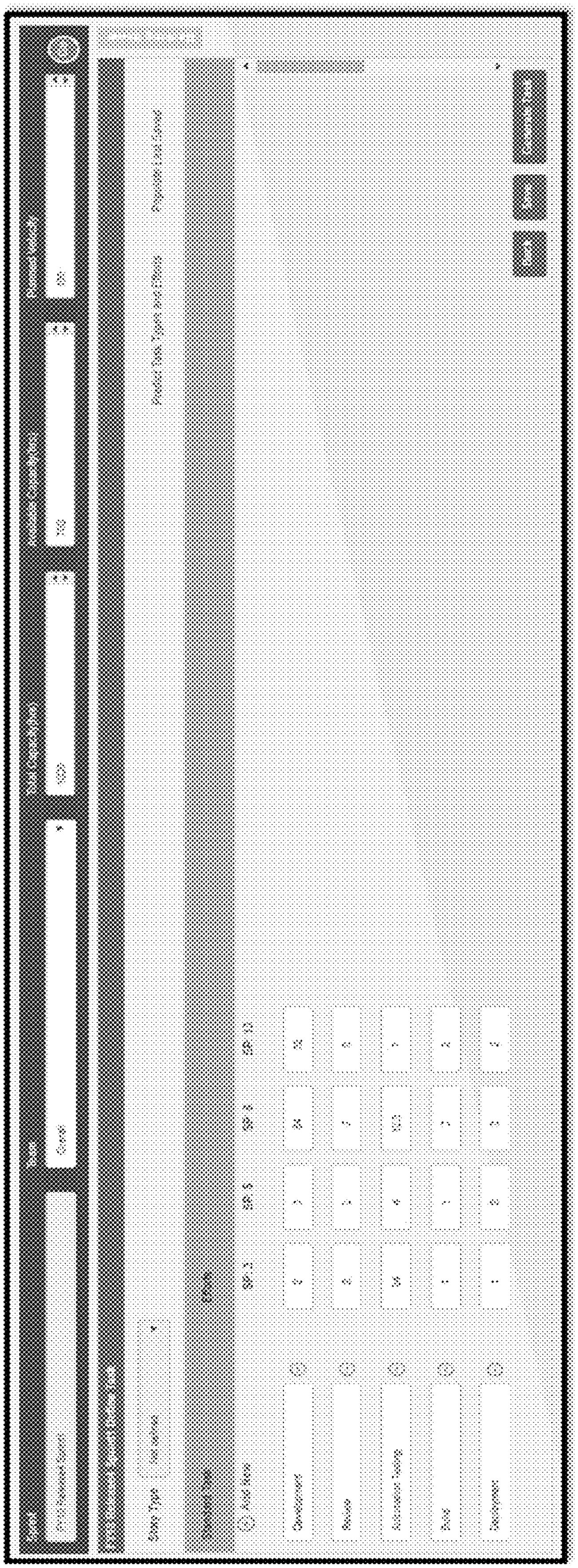
Figure 4F:
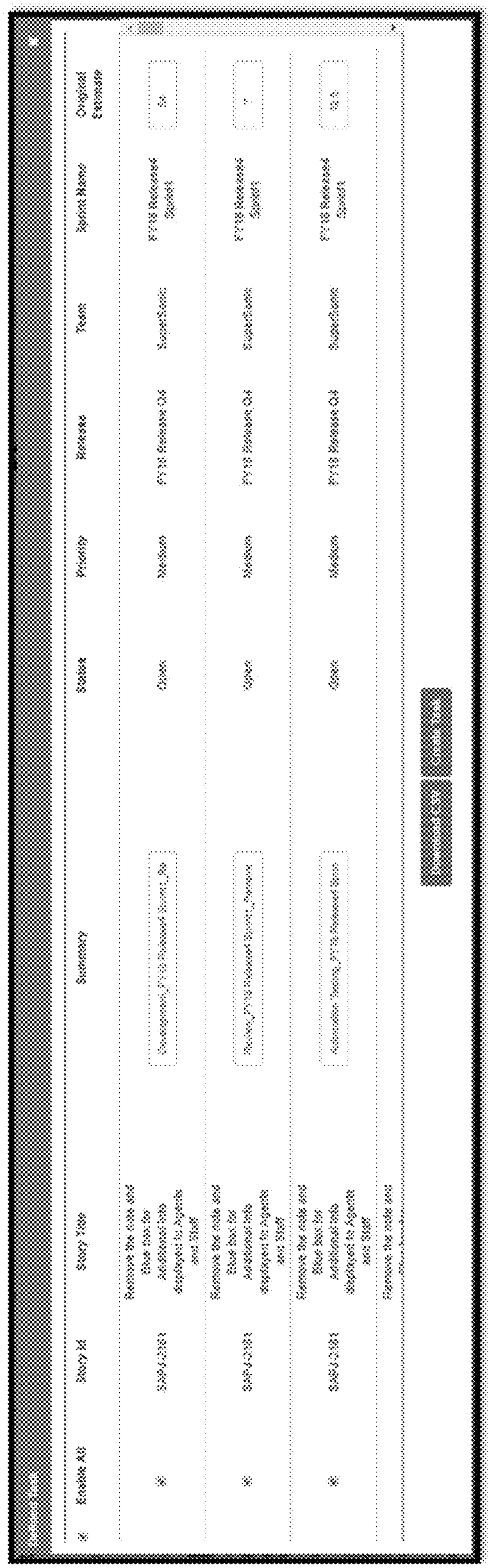

With respect to iteration planning, FIGS. 4A-4F illustrate examples of iteration planning in accordance with an example of the present disclosure. FIG. 4A describes stories in the backlog of the product. FIG. 4B describes defects in the backlog of the product. FIG. 4C describes stories and defects in the backlog of the iteration. FIG. 4D describes editing of a story in the backlog of the iteration. FIG. 4E describes prediction of task types and efforts in hours categorized by story points. FIG. 4F describes tasks to be created under user stories.

The iteration planning assistant 116 may facilitate performance of iteration planning, allowing for selection and shortlisting of user stories to have focused discussions, prediction of task types under stories, prediction of efforts against tasks, and facilitation of bulk task creation in application lifecycle management (ALM) tools. User interface features such as sorting, drag and drop, search and filters may facilitate a focused discussion. A user may create tasks in an application lifecycle management tool through iteration planning. The iteration planning assistant 116 may use application programming interfaces (APIs) provided by an application lifecycle management tool to create tasks.

The iteration planning assistant 116 may include outputs that include improved efficiency, reduction in efforts, reduction of delivery risk, and improvement of collaboration. These aspects may represent possible benefits of using the iteration planning assistant 116. For example, estimation of efforts may provide for a team to improve their efficiency of estimating tasks. Estimation of tasks types, estimation of efforts, and bulk task creation may reduce efforts. More accurate estimations may facilitate the delivery of risk. The iteration planning assistant 116 may improve collaboration between distributed teams by consolidating all information at one place.

Figure 4G:
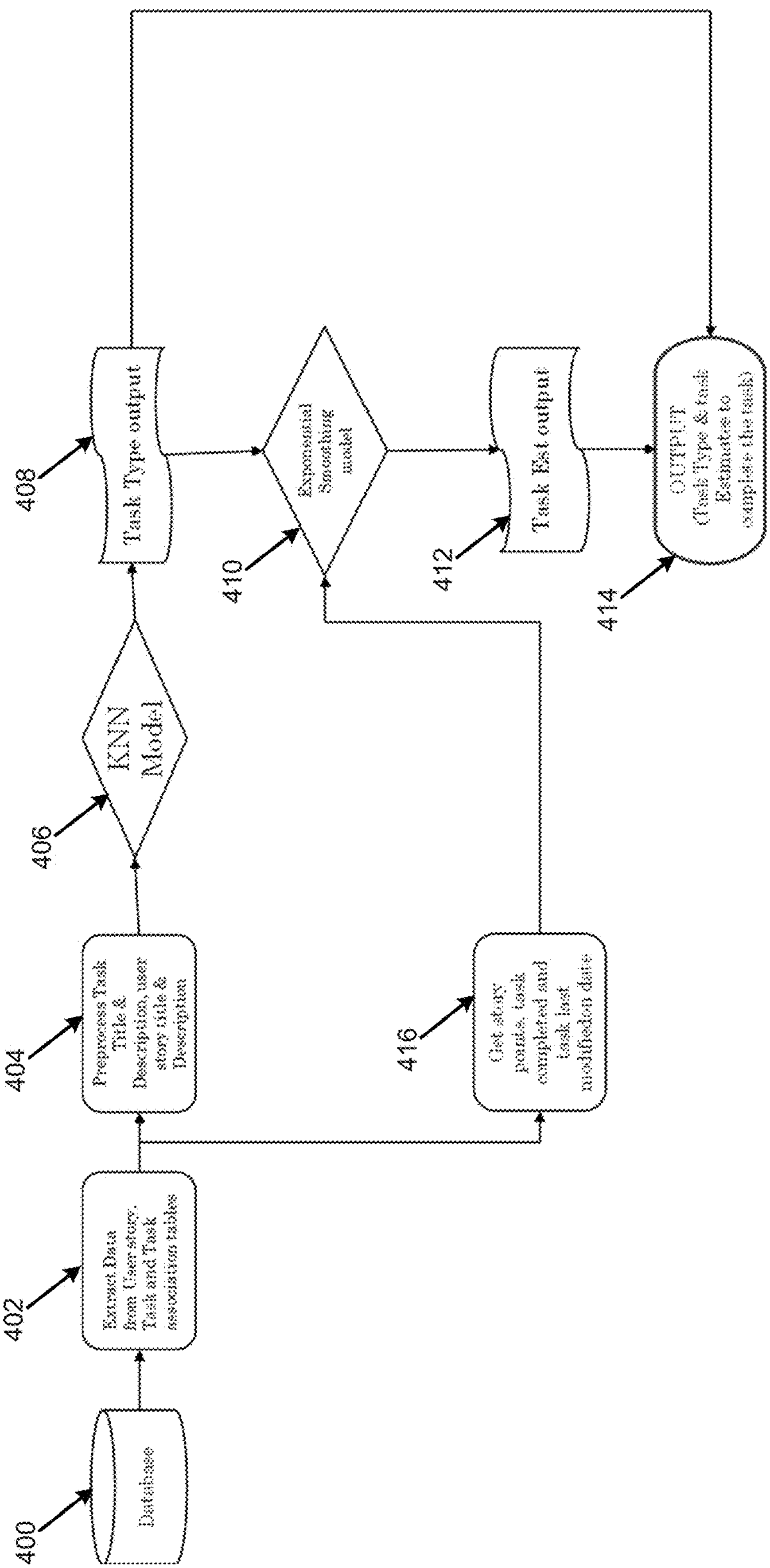
FIG. 4G illustrates a logical flow chart associated with an iteration planning assistant in accordance with an example of the present disclosure.

FIG. 4G illustrates a logical flow chart associated with the iteration planning assistant 116 in accordance with an example of the present disclosure.

Referring to FIG. 4G, for the iteration planning assistant 116, the inquiry response performer 138 may pre-process task data extracted from a user story associated with the product development plan, generate, for the pre-processed task data, a K-nearest neighbors model, and determine, based on the generated K-nearest neighbors model, task types and task estimates to complete each of a plurality of tasks of the user story associated with the product development plan. In this regard, the product development controller 144 may control, based on the determined task types and task estimates, development of the product based on the invocation of the determined retrospective assistant 114, the iteration planning assistant 116, the daily meeting assistant 118, the backlog grooming assistant 120, the report performance assistant 122, the release planning assistant 124, the iteration review assistant 126, the defect management assistant 128, the impediment management assistant 130, the demo assistant 132, the readiness assistant 134, and/or the story viability predictor 142.

At block 402 of FIG. 4G, the iteration planning assistant 116 may extract data from a user story from a database at 400, where the data may include task, and task association tables. Examples of tasks may include creating Hypertext Markup Language (HTML) for a user story, performing functional testing of a user story, etc. A task association table may include data about the association of the task with the story and the iteration. The iteration planning assistant 116 may ascertain data from user story, task and task associated tables for a project for which at least two iterations have been completed. A user story may represent the smallest unit of work in an Agile framework. A task associated table may include data association for iteration and release.

At block 404, the iteration planning assistant 116 may preprocess task title and description, and user story title and description, for example, by performing stop words removal, stemming, organizing, case normalizing, removal of special characters, etc.

At block 406, the iteration planning assistant 116 may generate a K-nearest neighbors model, where the task title and task description may be labeled for task type, for example, by using the K-nearest neighbors model. The K-nearest neighbors model may store all available task types, and classify new tasks based on a similarity measure (e.g., distance functions). The K-nearest neighbors model may be used for pattern recognition already in historical data (e.g., for a minimum of two sprints). When new tasks are specified, the K-nearest neighbors model may determine a distance between the new task and old tasks to assign the new task.

At block 408, the iteration planning assistant 116 may generate a task type output. In this regard, if the correlation between an influencing variable (e.g., story points) and target variable (e.g., completed task) is not established, a time series may be implemented.

If the variable does not have sufficient data points, an exponential smoothing model may be utilized at block 410.

At block 412, the iteration planning assistant 116 may generate a task estimate output. The task estimate output may be determined, for example, as efforts in hours. In this regard, efforts against tasks may be determined using an exponential smoothing model (time series).

At block 414, the iteration planning assistant 116 may generate an output that includes task type, and task estimates to complete a task. Machine learning models as described above may be used to predict task type and tasks estimates, and the results may be displayed to the user 106 in a user interface of the iteration planning assistant 116 (e.g., see FIG. 4E).

At block 416, the iteration planning assistant 116 may ascertain story points, task completed, and task last modified-on date, to prepare the data to forecast the task estimate hours against story points. These attributes of story points, task completed, and task last modified-on date may be used to categorize historical tasks into different categories, which the machine learning model may utilize to determine similarity with new tasks against which the machine learning model may determine efforts in hours.

Referring to FIGS. 1-2C, the daily meeting assistant 118 that is executed by at least one hardware processor (e.g., the hardware processor 1302 of FIG. 13, and/or the hardware processor 1504 of FIG. 15) may provide for tracking of action items identified during retrospective. The daily meeting assistant 118 may facilitate identification and resolution of impediments to deliver the committed iteration backlog. The daily meeting assistant 118 may receive as input DoD, sprint backlog, and action items, and generate as output a prioritized list of activities that a team should consider on a given day to improve iteration performance. The output of the daily meeting assistant 118 may be received by the iteration review assistant 126.

Figure 5A:
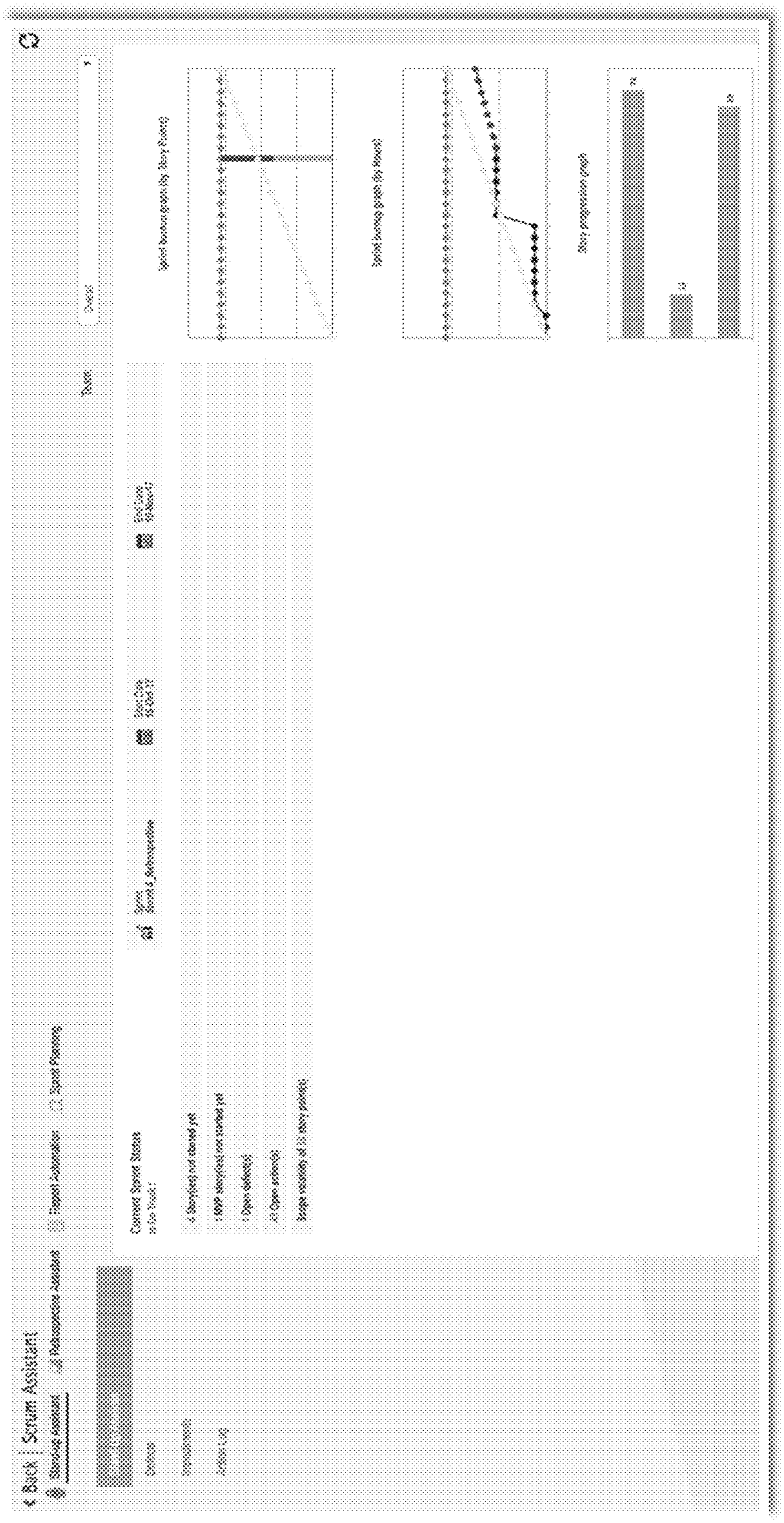
FIG. 5A illustrates details of information to conduct a daily meeting in accordance with an example of the present disclosure.
Figure 5B:
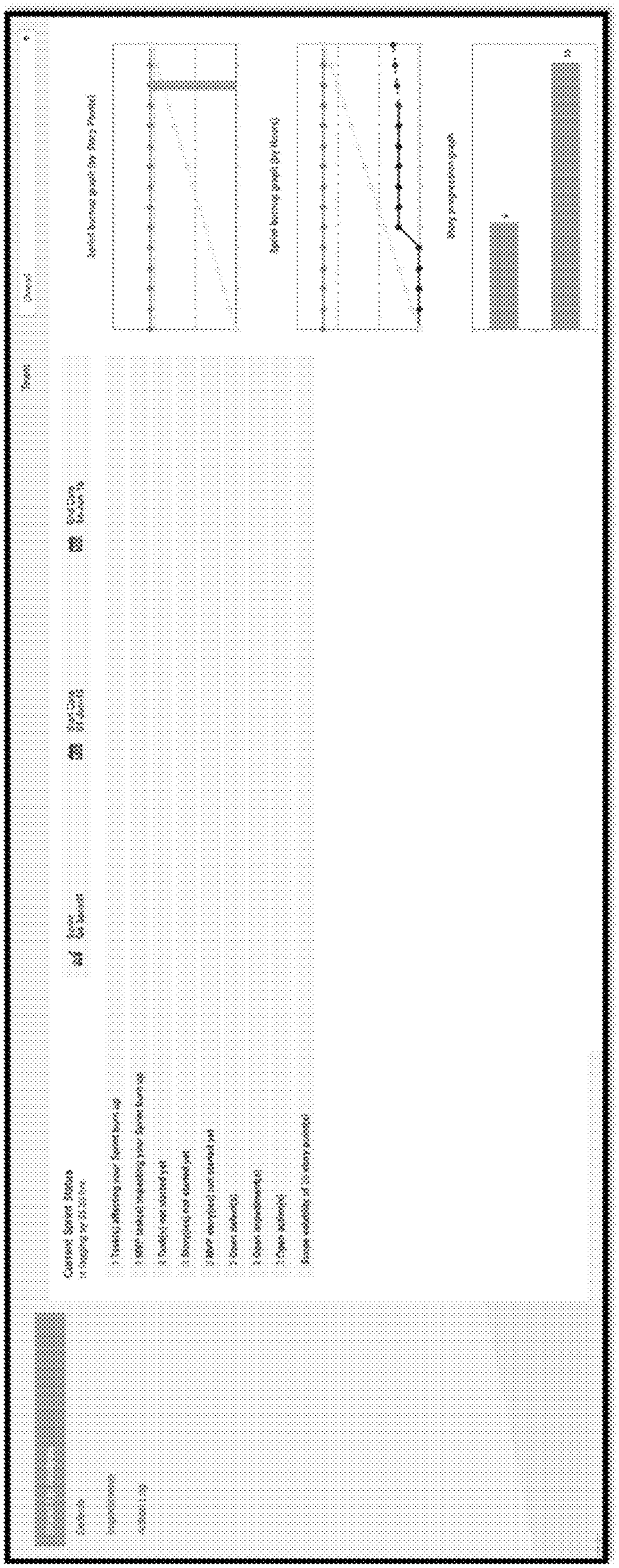
FIGS. 5B-5E illustrate examples of daily meeting assistance in accordance with an example of the present disclosure.
Figure 5C:
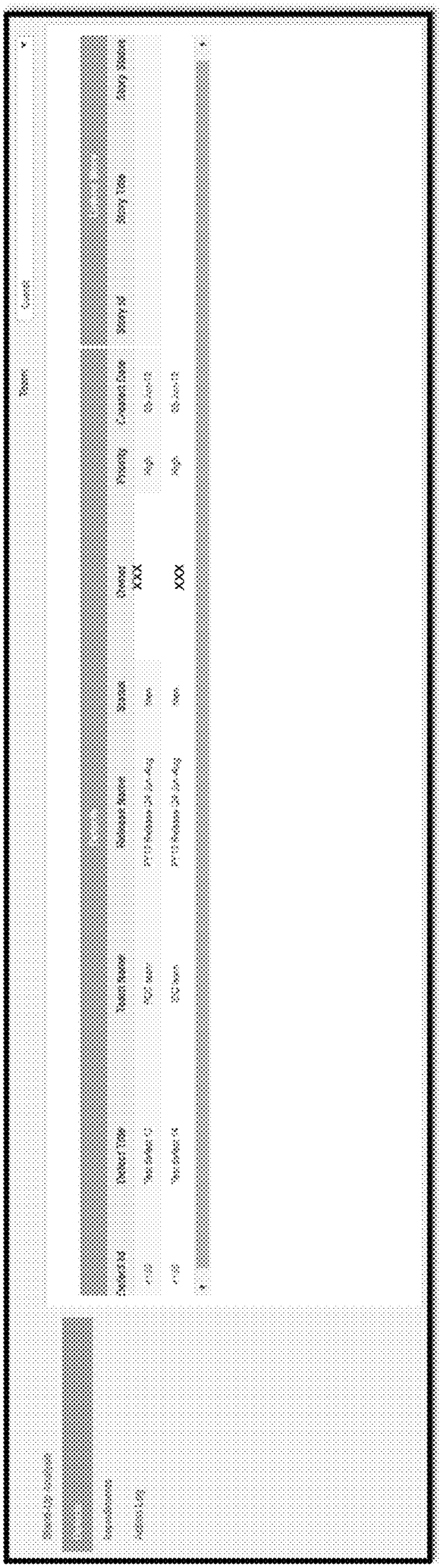
Figure 5D:
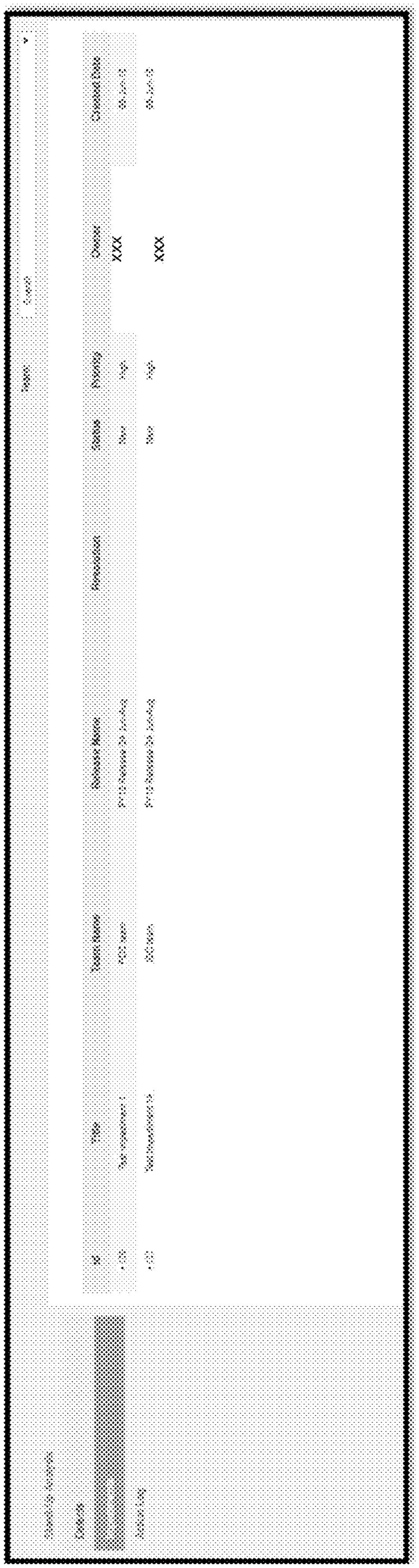
Figure 5E:
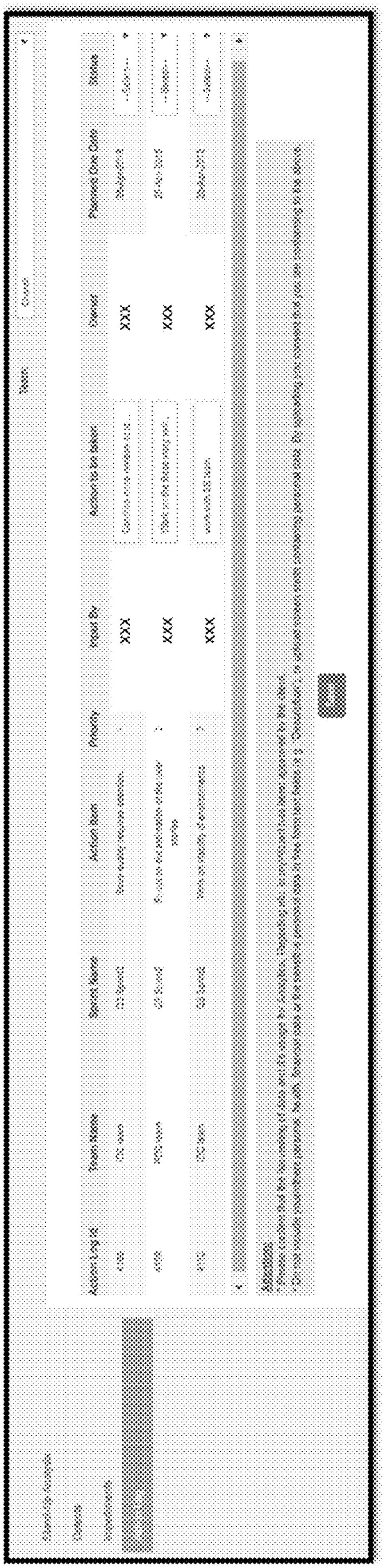

The daily meeting assistant 118 may analyze an iteration and provide the required information to conduct a daily meeting effectively. In this regard, FIG. 5A illustrates details of information to conduct a daily meeting in accordance with an example of the present disclosure. Further, FIGS. 5B-5E illustrate examples of daily meeting assistance in accordance with an example of the present disclosure. Specifically, FIG. 5A describes an analytical report that is determined by analyzing story and task attributes (e.g., status, effort, size, priority), where the sprint is on track. FIG. 5B is similar to FIG. 5A, where the scenario represents a sprint that is behind the schedule. FIG. 5C represents a display of a defects report for a current active sprint for each team. FIG. 5D represents a display of an impediments report for a current active sprint for each team. FIG. 5E represents a display of an action log report for the current active sprint for each team. FIGS. 5A-5E may collectively represent real-time data available for a particular team for their active sprint without any customization.

The daily meeting assistant 118 may consolidate information related to various work in progress items, highlight open defects, action items, and impediments, analyze efforts and track iteration status (lagging behind or on track), generate a burn-up graph by story points and efforts, and generate a story progression graph. The daily meeting assistant 118 may retrieve entity raw data from delivery tools using, for example, tool gateway architecture. The entity raw data may be transformed to a canonical data model (CDM) using, for example, the enterprise service bus. The transformed data may be saved, for example, through an Azure Web API to a SQL database in the canonical data model modeled SQL tables. The daily meeting assistant 118 may connect to any type of agile delivery tools, and ensures that data is transformed to a canonical data model.

With respect to the daily meeting assistant 118, a daily stand-up assistant may represent a micro-service hosted in the Windows Server 10, and uses the .NET Framework 4.6.1. The daily stand-up assistant may access the entity information stored in the canonical data model entity diagram within the SQL database.

With respect to the daily meeting assistant 118, open defects may be determined by referring to defect and defect association tables. The outcome may be retrieved by querying defects which have defect status in an "Open" state.

With respect to the daily meeting assistant 118, a list of action items may be created through retrospective assistant 114 may be displayed. The actions items may be retrieved by querying an action log table by passing the filtering conditions such as IterationId. In this regard, IterationId may represent the identification of the Iteration which the user is trying to view the daily stand-up.

With respect to the daily meeting assistant 118, for impediments, the required information in the daily stand-up assistant may be retrieved by querying the impediment SQL table by passing the filtering condition such as IterationId. In this regard, IterationId may represent the identification of the iteration which the user is trying to view the daily stand-up.

With respect to the daily meeting assistant 118, with respect to analyzing efforts and tracking iteration status (e.g., lagging behind or on track), the required information in the daily stand-up assistant may be retrieved by querying relevant data from iteration, user story, task, and defect SQL table by passing the filtering condition such as Iteration Id, where IterationId may represent the identification of the Iteration which the user is trying to view the daily stand-up. The status of an iteration may be determined as follows:

Sprint Status=Total Planned Hours−Projection Hours

Projection Hours=Total Actual Hours+(Last Day Effort Velocity*Total Remaining Days)

Last Day Effort Velocity=Total Actual Hours/Actual Days

With respect to the daily meeting assistant 118, with respect to generating a burn-up graph by story points and efforts, the required information in the daily stand-up assistant may be retrieved by querying relevant data from iteration, user story, task, and defect SQL table by passing the filtering condition such as IterationId, wither IterationId may represent the identification of the Iteration which the user is trying to view the daily stand-up. The burn-up details for story and efforts may be determined as follows:

Story Burn-Up:

Total Hours/Total Story Points: Total Planned Hours/Planned Story points until the date for the sprint plotted on every day of the sprint Ideal Hours: Straight line drawn where the first plot point is zero and last plot point is (last day of the sprint, Total hours/total story points)

Actual Hours: Total Completed hrs/Completed story points for the sprint plotted on every day of the sprint capturing the completed hours/story points for each day of the sprint separately Current Projection: Total number actual hours completed from the first day of the sprint until yesterday (e.g., current day−1), divided by the total number days from first day of the sprint until yesterday day (e.g., current day−1). The values for current projection may be plotted.

Plotting the Current Day:

Actuals: then actual hours updated until date

Projected Hours: equal to actual hours

Efforts Burn-up:

Total Actual Hours: Completed hours for task till today+Completed Hours for defect till today Actual days: Number of days from sprint start date till today Total Days: Number of days from Sprint start date till sprint end date Last Day Effort Velocity: Total Actual Hours/Actual days Total days: Total Days−Actual days With respect to the daily meeting assistant 118, with respect to a story progression graph, the required information in the daily stand-up assistant may be retrieved by querying relevant data as a ResultSet from a user story SQL table by passing the filtering condition such as IterationId. The story progression maybe determine by adding all of the story points of the UserStory across the user story status (e.g., New, Completed and In-Progress respectively from the ResultSet). In this regard, IterationId may represent the identification of the Iteration which the user is trying to view the daily stand-up.

The daily meeting assistant 118 may include outputs that include automated 'daily meeting analysis' to assess health of the iteration, provide a holistic view on iteration performance, and provide analytical insights.

Figure 5F:
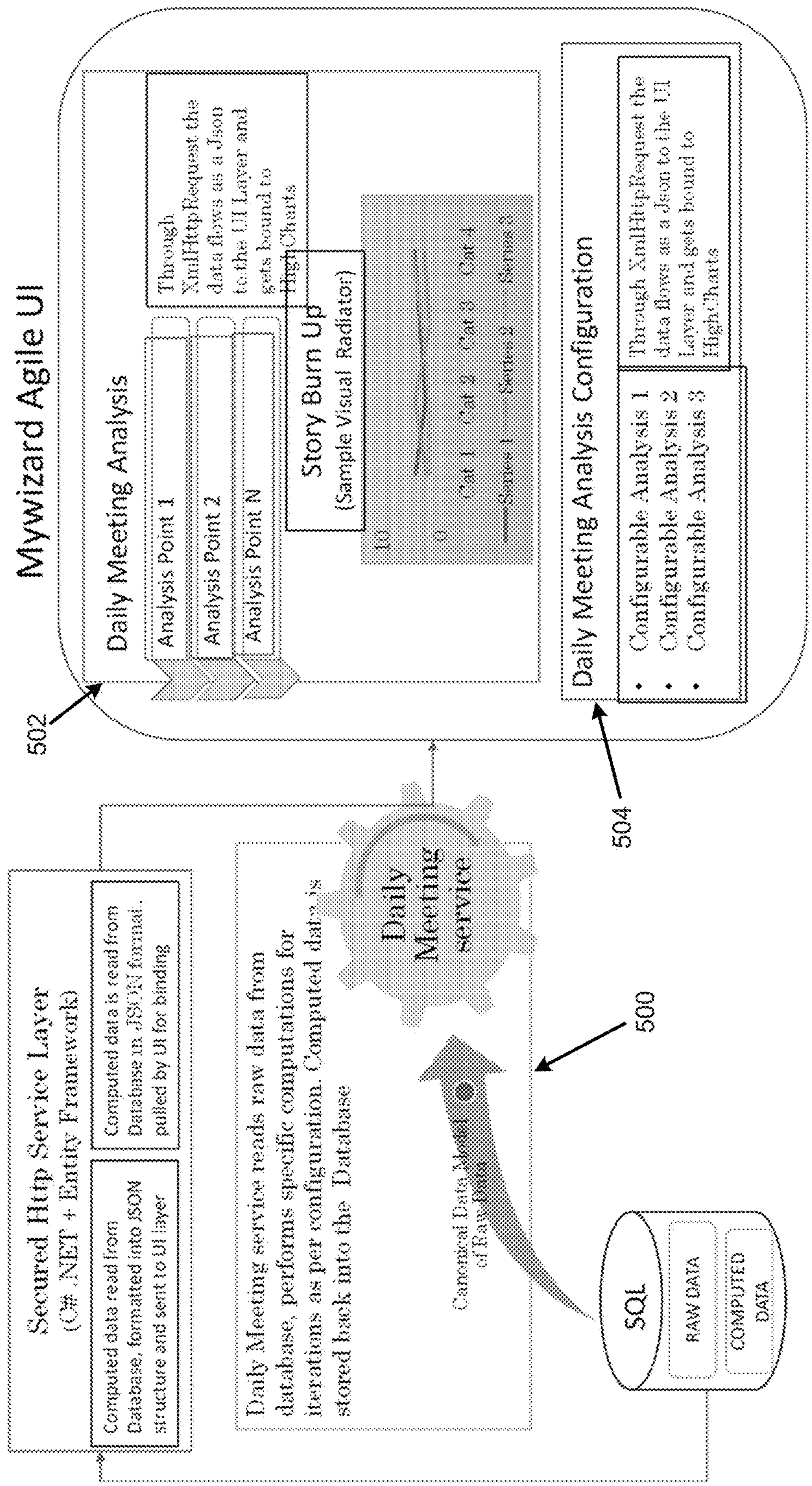
FIG. 5F illustrates a technical architecture of a daily meeting assistant in accordance with an example of the present disclosure.

FIG. 5F illustrates a technical architecture of the daily meeting assistant 118 in accordance with an example of the present disclosure.

Referring to FIG. 5F, at 500, the daily meeting assistant 118 may read data from a database such as a SQL database, and perform specific computations for iterations as per a specified configuration. For example, for the daily meeting assistant 118, the inquiry response performer 138 may ascertain a sprint associated with the product development plan, determine, for the ascertained sprint, a status of the sprint as a function of a projection time duration on a specified day subtracted from a total planned time duration for the sprint, and based on a determination that the status of the sprint is a positive number, designate the sprint as lagging. In this regard, the product development controller 144 may control, based on the determined status of the sprint, development of the product based on the invocation of the determined retrospective assistant 114, the iteration planning assistant 116, the daily meeting assistant 118, the backlog grooming assistant 120, the report performance assistant 122, the release planning assistant 124, the iteration review assistant 126, the defect management assistant 128, the impediment management assistant 130, the demo assistant 132, the readiness assistant 134, and/or the story viability predictor 142.

Referring to FIG. 5F, the daily meeting assistant 118 may determine sprint status as follows:

Sprint Status:

i. Sprint Status=(Total planned hours of the sprint−projection hours on the last day)

i. if >0, then sprint is lagging behind. Analysis report header should display <Lagging Behind xxx hours>> ii. if =0, then sprint is on track. Analysis report header should display <<On Track!>> iii. if <0, then sprint is ahead of schedule. Analysis report header should display <<Ahead of Schedule!>>

The daily meeting assistant 118 may determine scope volatility of story points as a function of story points added to the specific sprint post sprint start date.

At 502, the daily meeting assistant 118 may perform daily meeting analysis on analysis points such as analysis point 1, analysis point 2, analysis point n, etc.

At 504, the daily meeting assistant 118 may specify different configuration analyses such as configurable analysis 1, configurable analysis 2, configurable analysis 3, etc. In this regard, a user may configure which of the analysis points the Scrum assistant would like to display. For example, by default, all of the ten analysis findings may be displayed.

Referring again to FIGS. 1-2C, the backlog grooming assistant 120 that is executed by at least one hardware processor (e.g., the hardware processor 1302 of FIG. 13, and/or the hardware processor 1504 of FIG. 15) may provide for refinement of the backlog to save time during iteration planning. Backlog refinement may provide a backlog of stories with traceability. Backlog refinement may map dependencies, generate rankings, and provide a prioritized backlog for iteration planning.

The backlog grooming assistant 120 may facilitate the refinement of user stories to meet acceptance criteria. The backlog grooming assistant 120 may receive as input DoR, prioritized impediments, and prioritized defects, and generate as output prioritized backlog. The DoR may represent story readiness of a story that is being analyzed by the readiness assistant 134. In this regard, impediment may represent an aspect that impacts progress. Defect may represent a wrong or unexpected behavior. Further, a backlog may include both user stories and defects. The output of the backlog grooming assistant 120 may be received by the iteration planning assistant 116.

The report performance assistant 122 that is executed by at least one hardware processor (e.g., the hardware processor 1302 of FIG. 13, and/or the hardware processor 1504 of FIG. 15) may provide for reduction in efforts by performing all reporting needs of a project. The report performance assistant 122 may provide for a Scrum Master to focus on productive and team building activities.

Figure 6A:
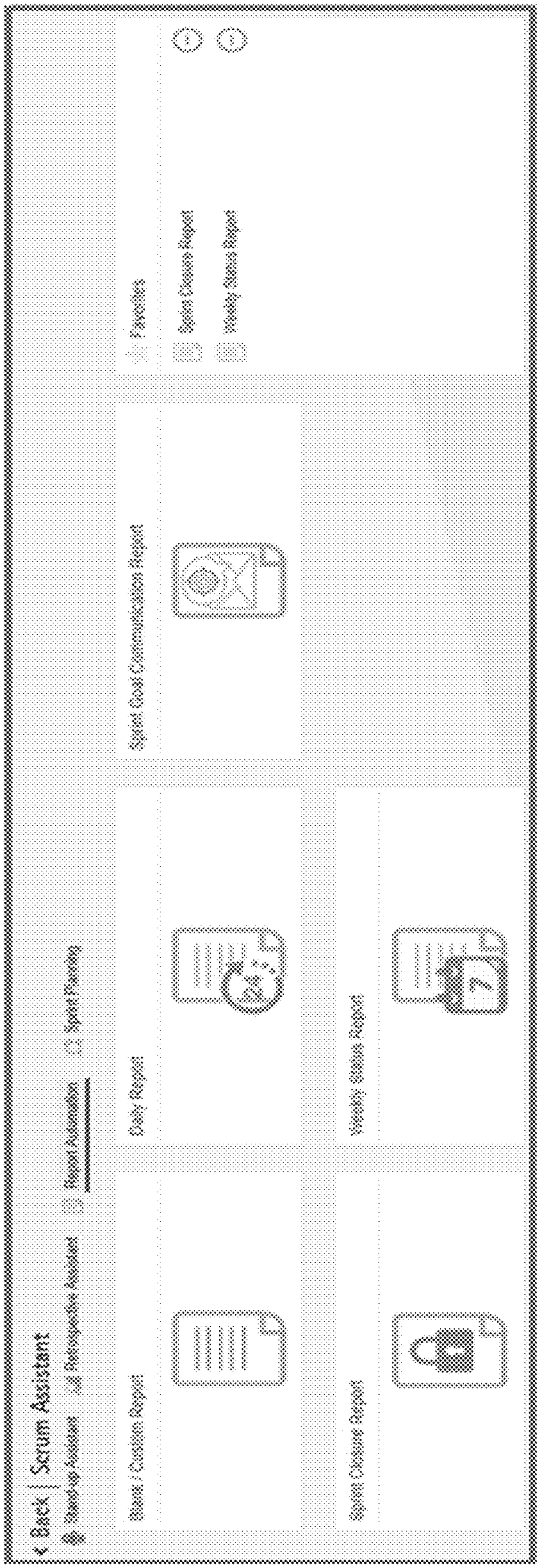
FIGS. 6A-6C illustrate details of report generation in accordance with an example of the present disclosure.
Figure 6B:
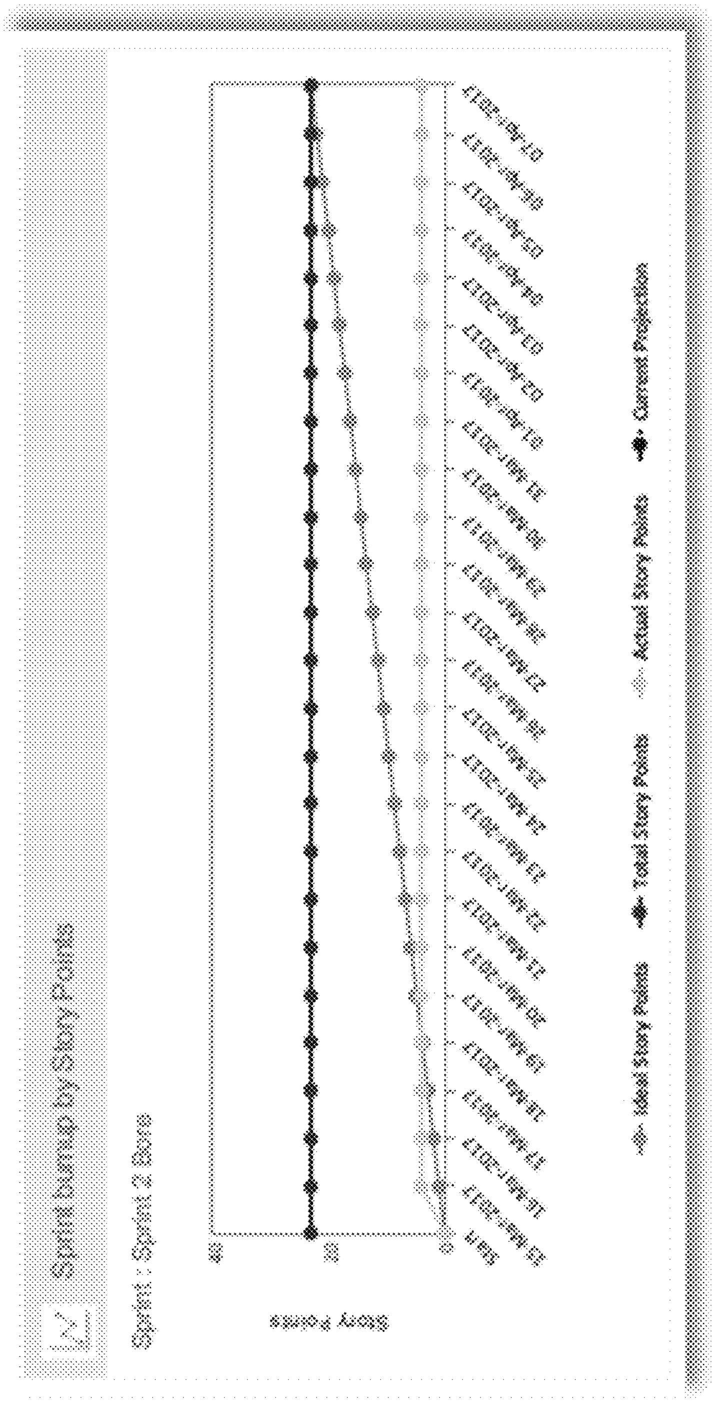
Figure 6C:
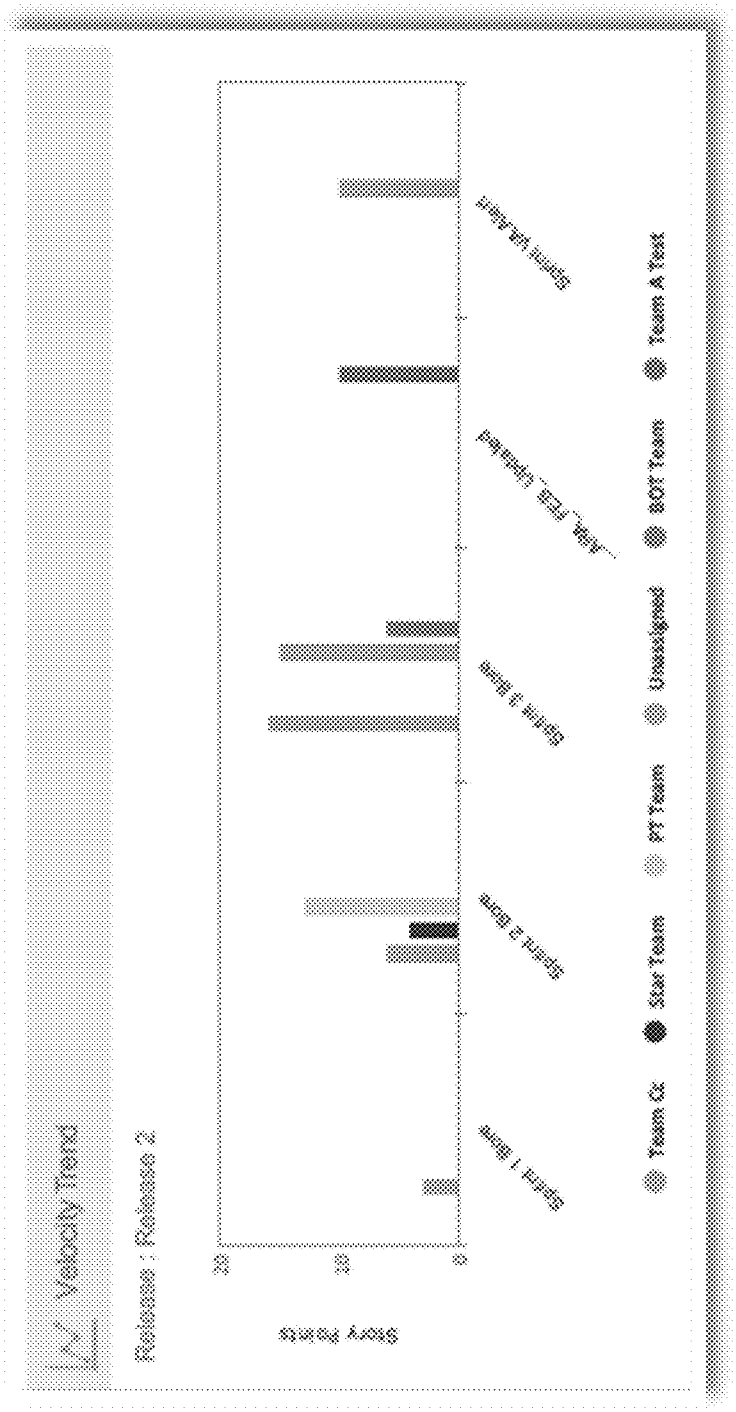
Figure 6D:
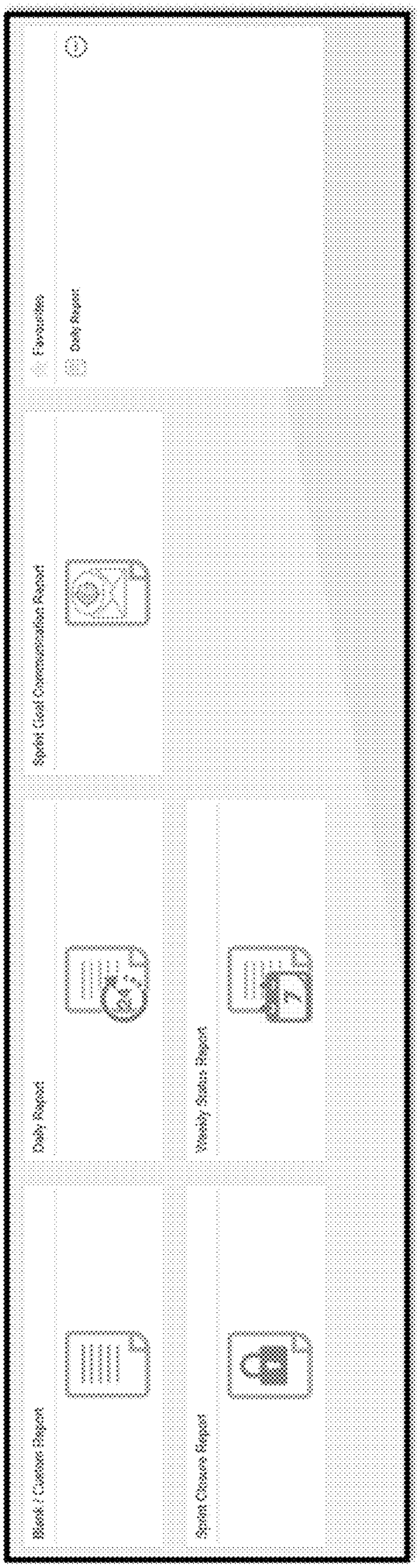
FIGS. 6D-6G illustrate examples of report generation in accordance with an example of the present disclosure.
Figure 6E:
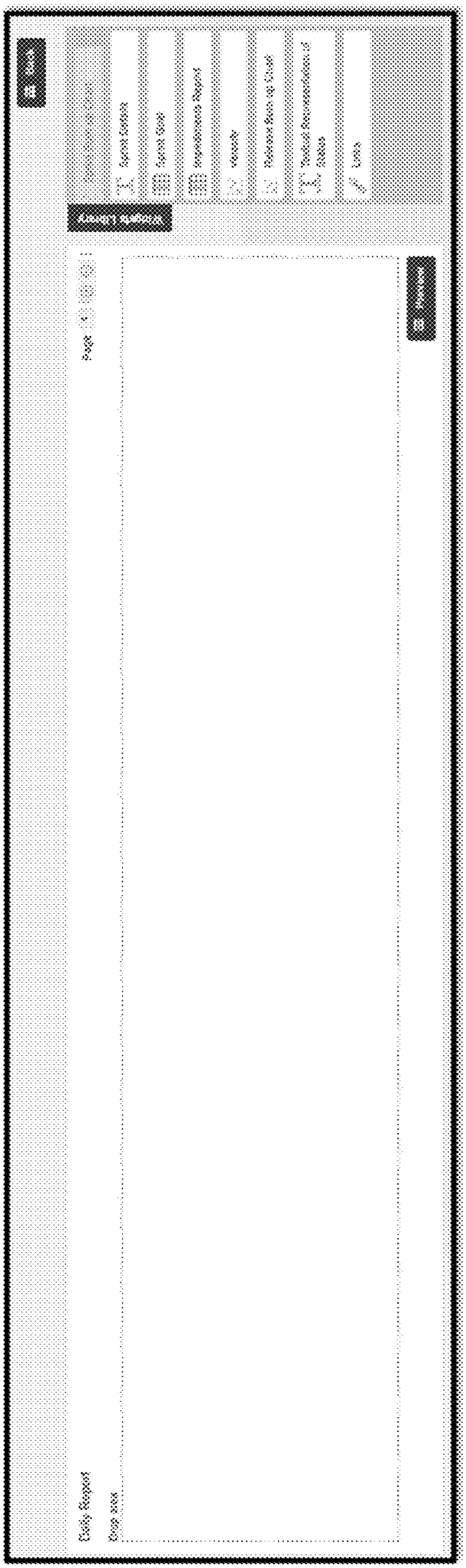
Figure 6F:
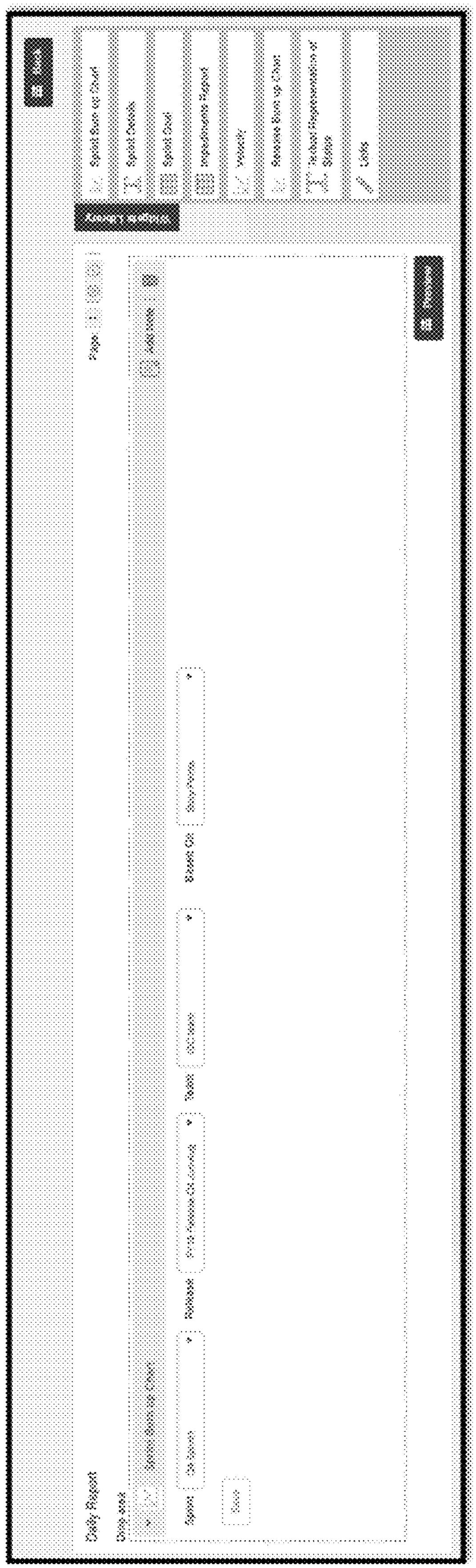
Figure 6G:
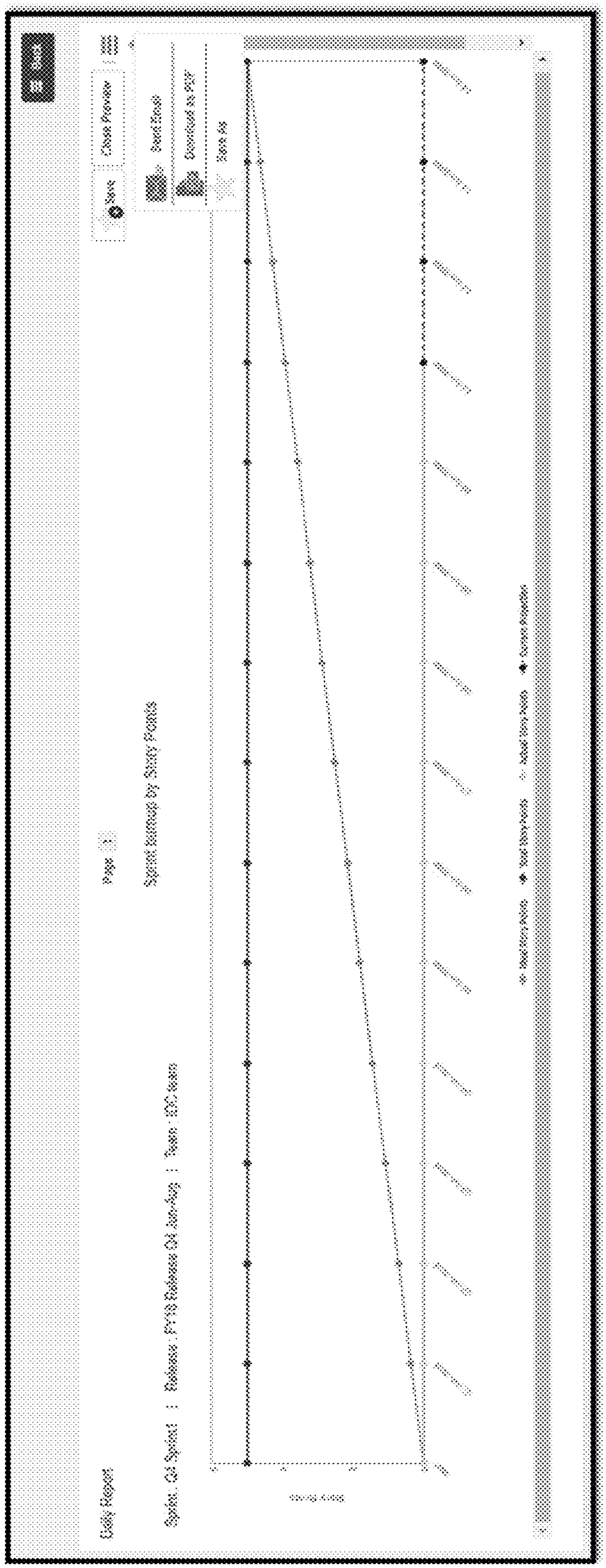

The report performance assistant 122 may generate reports needed for a project with features such as ready to use templates, custom reports, widgets, and scheduling of the reports. In this regard, FIGS. 6A-6C illustrate details of report generation in accordance with an example of the present disclosure. Further, FIGS. 6D-6G illustrate examples of report generation in accordance with an example of the present disclosure. With respect to FIGS. 6A-6G, report generation may provide a unique way to customize, generate, and schedule any report. The report performance assistant 122 may use predefined report templates to facilitate the generation of a report in a relatively short time duration. A scheduler of the report performance assistant 122 may facilitate scheduling of the generated report for any frequency and time.

The report performance assistant 122 may provide for customized report generation, scheduling of e-mail to send reports, saving of custom reports as favorites for future use, and ready to use report templates. In this regard, the report performance assistant 122 may provide flexibility of designing reports for the user 106. Additionally, the user 106 may schedule reports based on a specified configuration in a user interface.

With respect to custom report generation, the report performance assistant 122 may utilize a blank template, where users may have the option for configuration drag and drop of widgets from a widgets library. Each widget may be configured by providing relevant inputs in the user interface (dropdown, input, option, etc.). Dropdowns may include selection of iteration, release, sprint, team which may be retrieved through querying a SQL database, for example, through and Azure WebApi. The user interface (i.e., widgets) may be built, for example, in AngularJs & Integration with Azure Web API's which act as a backend interface. A user may save the customized report as favorites for future reference. All of the information captured in the user interface may be saved to the SQL database by posting the data through the Azure web API.

With respect to ready to use report templates, a predefined report template may be available in the right navigation of the report performance assistant 122 user interface. These pre-defined templates may represent in-built widgets with pre-configured values. These pre-configured widgets maybe dragged and dropped in the user interface. Example the reports may include daily report, weekly status report, sprint closure report, sprint goal communication report, etc. Each widget may be developed in AngularJs as a separate component within the solution, and may be further scaled depending upon functional requirements.

For the report performance assistant 122, the inquiry response performer 138 may generate a report related to a product development plan associated with the product, ascertain, for the report, a schedule for forwarding the report to a further user at a specified time, and forward, at the specified time and based on the schedule, the report to the further user.

Thus, with respect to scheduling of an e-mail to send reports, the report performance assistant 122 may assist a user to schedule sending of a report at a specified time. The report performance assistant 122 user interface may include the input control for providing a start date, end date, time and frequency (Daily/Weekly/Monthly/Yearly). All captured information may be stored in a schedule SQL table through Azure web API.

The report performance assistant 122 may poll for the schedule (e.g., from a schedule table) and report information (e.g., from a report table). The report performance assistant 122 may then retrieve the data, and transform the widget to tables/chart, and generate the report in PDF format.

The report performance assistant 122 may send the PDF generate a report to the user 106 as an attachment. The report performance assistant 122 may be configured with Simple Mail Transfer Protocol (SMTP) server details, which may allow the mail to be sent to the configured email-address(s).

Figure 6H:
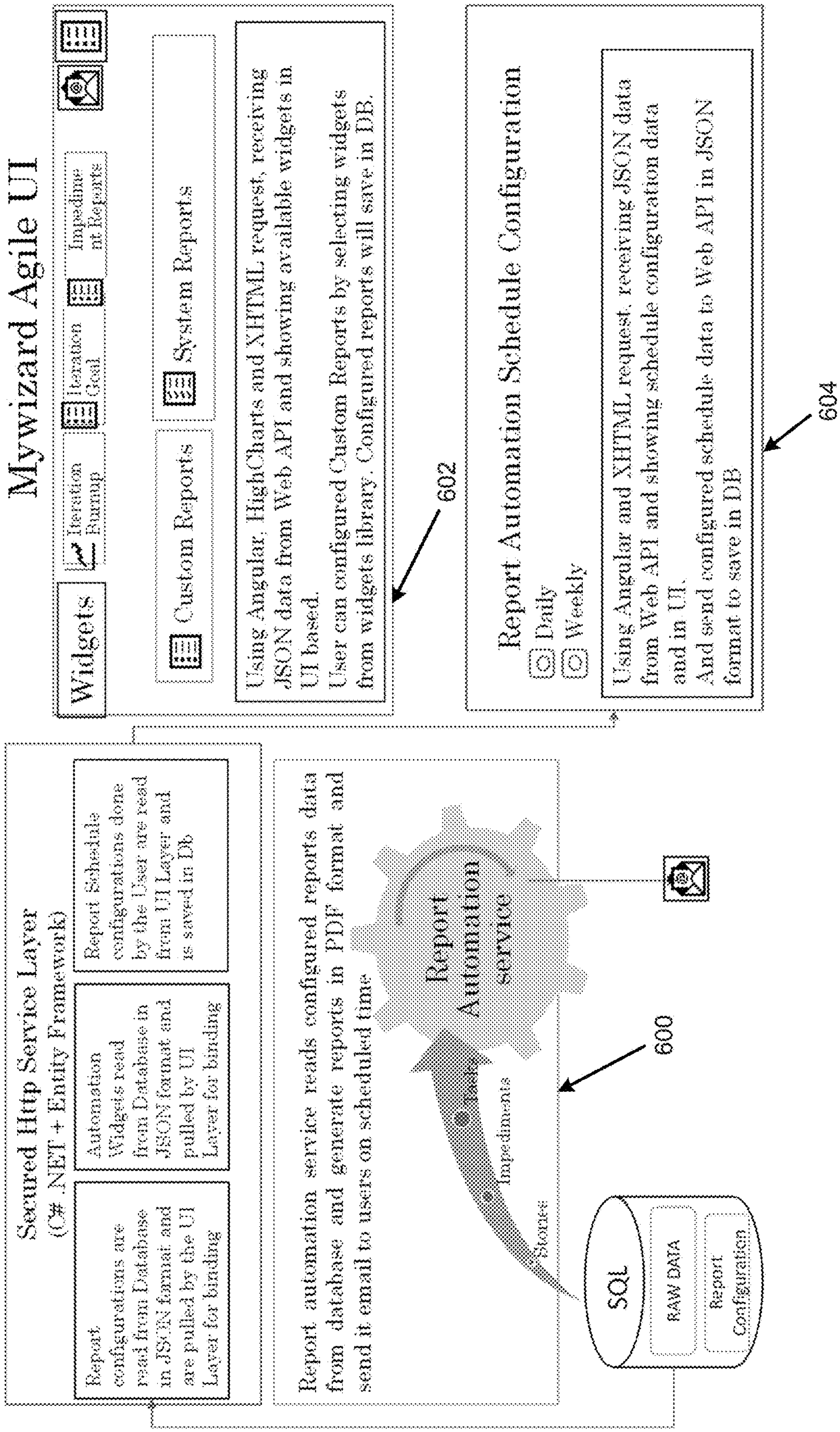
FIG. 6H illustrates a technical architecture of a report performance assistant in accordance with an example of the present disclosure.

FIG. 6H illustrates a technical architecture of the report performance assistant 122 in accordance with an example of the present disclosure.

Referring to FIG. 6H, at 600, the report performance assistant 122 may read configured reports data from the database, such as a SQL database, and generate reports in a specified format (e.g., PDF). Further, the report performance assistant 122 may notify users (e.g., the user 106) of the generated reports at scheduled times.

At 602, the report performance assistant 122 may provide for configuration of custom reports by providing a user with options for selection of widgets from a widgets library. A widget may represent an in-build template which represents the data in the form of charts and textual representations about sprints, release, etc. Each widget may provide control in the template, which may facilitate the configuration of relevant information for the report to be generated, and which may be designed using AngularJs as a component.

A sprint burn-up chart widget may provide day wise information about the sprint progress for the project. This widget may be designed with in-built controls (e.g., drop-down) for configuration of information about the sprint, release, team and type of burn-up. All information may be captured and stored in a report widgets SQL table by posting data, for example, through an Azure Web API.

A sprint detail widget may provide information about the sprint such as name, start date, end date which may be configured in the template. The configured sprint information (e.g., sprint identification) may be captured and stored in a report widgets SQL table by posting data through an Azure Web API.

A sprint goal widget may provide stories and defects details for a sprint which is configured in the template, and which has provision options to enable or disable columns/field required in a report HTML Table. The configured information may be captured and stored in a report widgets SQL table by posting data through the Azure Web API.

A textual representation of status widget may provide sprint progress details of the configured sprint in a widget template, which may read data from story, task, and a defect SQL table by applying a filter such as a configured sprint.

At 604, the report performance assistant 122 may implement report schedule configuration, for example, for a daily or weekly schedule.

Figure 6I:
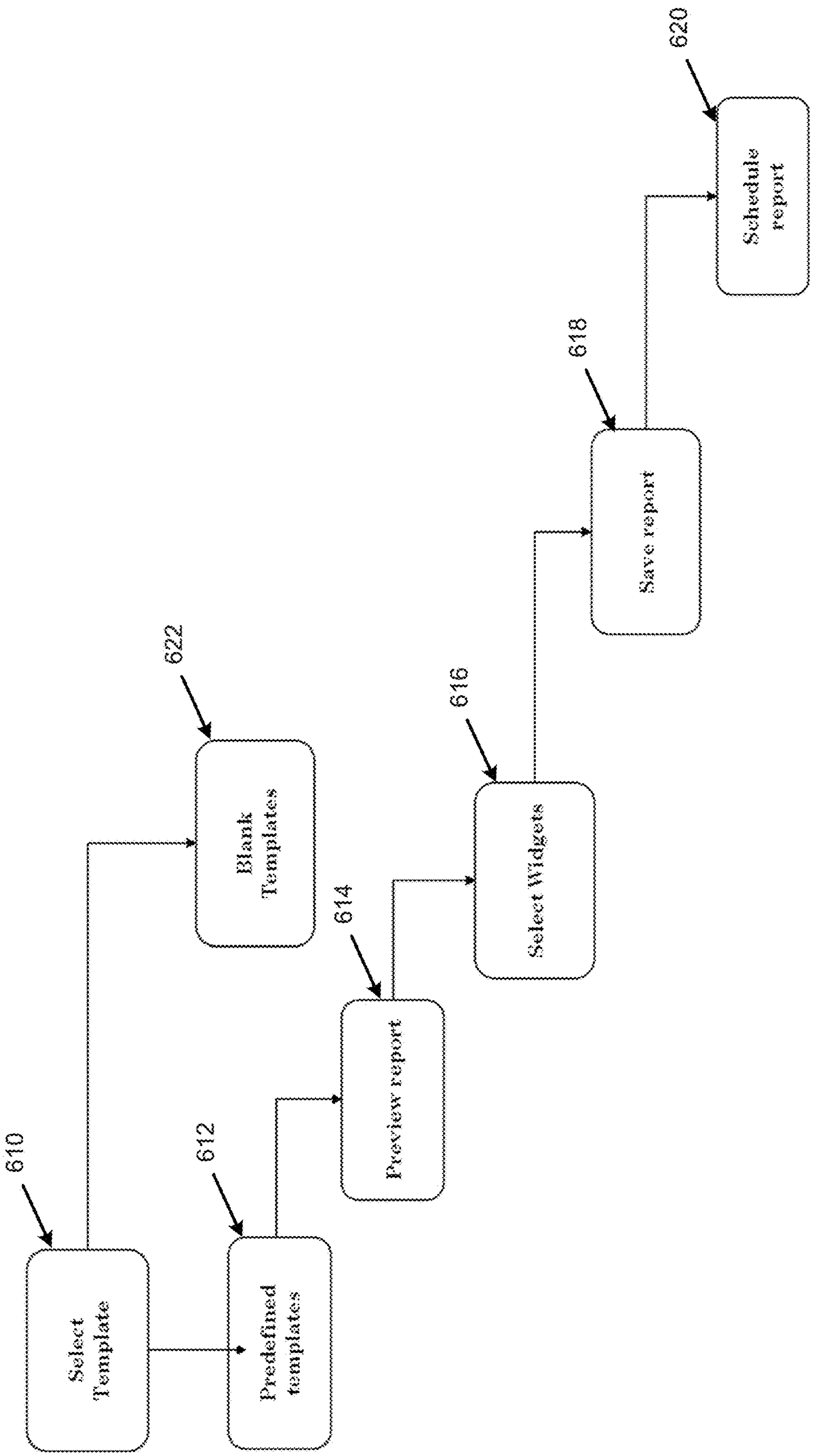
FIG. 6I illustrates a logical flowchart associated with the report performance assistant in accordance with an example of the present disclosure.

FIG. 6I illustrates a logical flowchart associated with the report performance assistant 122 in accordance with an example of the present disclosure.

Referring to FIG. 6I, at block 610, the report performance assistant 122 may select a template for a report. In this regard, at block 612, the selected template may include a predefined template. With respect to the predefined template, the report performance assistant 122 may select a list of all available release and iterations for user selection. At block 614, the report performance assistant 122 may provide for preview of the report. In this regard, the report performance assistant 122 may fetch a list of all available release and iterations for user selection, and available configuration values for selected widgets. At block 616, the report performance assistant 122 may select widgets. In this regard, for the selected release and iteration, the report performance assistant 122 may fetch transition data and display a report according to a selected configuration. At block 618, the report performance assistant 122 may save the report. In this regard, the report that is prepared may be saved into a database, for example, under a user's favorite list, and may be saved, for example, in a PDF format. At block 620, the report performance assistant 122 may schedule for reports to be sent on fixed intervals to predefined recipients, where the schedule details may be saved for future action. At block 622, the selected template may include a blank template, where the report performance assistant 122 may open a blank canvas for the report, and fetch a list of all available widgets from a database.

Referring to FIGS. 1-2C, the release planning assistant 124 that is executed by at least one hardware processor (e.g., the hardware processor 1302 of FIG. 13, and/or the hardware processor 1504 of FIG. 15) may provide for performance of release planning aligned with a product roadmap. The release planning assistant 124 may provide for efficient utilization of the time to plan a release goal, priorities, and requirements. The release planning assistant 124 may receive as input prioritized requirements, defects and impediments. A release plan may include a release identification, a start date, an end date, a sprint duration, a sprint type, and an associated team.

The release planning assistant 124 may create a release plan by analyzing story attributes such as story rank, priority, size, dependency on other stories, and define the scope as per release timelines and team velocity. With respect to the release planning assistant 124, release planning may represent an agile ceremony to create the release plan for a release. A Scrum master may facilitate the meeting. A product owner may provide the backlog. A team and product owner may collaboratively discuss, and thus determine the release plan.

The release planning assistant 124 may determine and implement the activities performed for release planning, which may increase productivity of the team and quality of the release plan. The release plan may provide the sprint timelines of the release, backlog for each sprint, and unassigned stories in the release backlog. Release timelines, sprint types and planned velocity may be evaluated, and the release planning assistant 124 may determine the deployment date.

With respect to the release planning assistant 124, the inquiry response performer 138 may generate, for a product development plan associated with the product, a release plan by implementing a weighted shortest job first process to rank each user story of the product development plan as a function of a cost of a delay versus a size of the user story. In this regard, the product development controller 144 may control, based on the generated release plan, development of the product based on the invocation of the determined retrospective assistant 114, the iteration planning assistant 116, the daily meeting assistant 118, the backlog grooming assistant 120, the report performance assistant 122, the release planning assistant 124, the iteration review assistant 126, the defect management assistant 128, the impediment management assistant 130, the demo assistant 132, the readiness assistant 134, and/or the story viability predictor 142.

Thus, story attributes may be mapped, and the release planning assistant 124 may determine the story ranking using the weighted shortest job first technique to align with specified priorities. The release planning assistant 124 may determine the weighted shortest job first as follows:

Weighted shortest job first=Cost of delay/Job size=(Specified Value+Time Criticality+Risk Reduction/Opportunity Enablement)/Job Size=Story Value+Story Priority+Story Risk Reduction/Opportunity Enablement/Story Points With respect to the release planning assistant 124, story dependencies may be evaluated by using a dependency structure matrix (DSM) logic, where the stories may be reordered to align with code complexities. With respect to the dependency structure matrix, the dependency structure matrix may represent a compact technique to represent and navigate across dependencies between user stories. For example, the backlog may be reordered based on the dependency structure matrix derived for the backlog. For example, if story 'A' is dependent on story 'B' then story 'B' may be placed in higher order than story 'A'. The dependency between stories may take precedence over story's cranky and Weighted shortest job first (WSJF) values as disclosed herein. The stack rank may represent the rank of the user story, such as 1, 2, 3 etc. Weighted shortest job first (WSJF) may represent a prioritization model used to sequence user stories. A story having the highest WSJF value may be ranked first.

The release planning assistant 124 may evaluate ordered stories and planned velocity to create a sprint backlog. The release planning assistant 124 may analyze story attributes to determine the story viability in a sprint. Further, the release planning assistant 124 consolidate the output and publish the release plan.

Figure 7A:
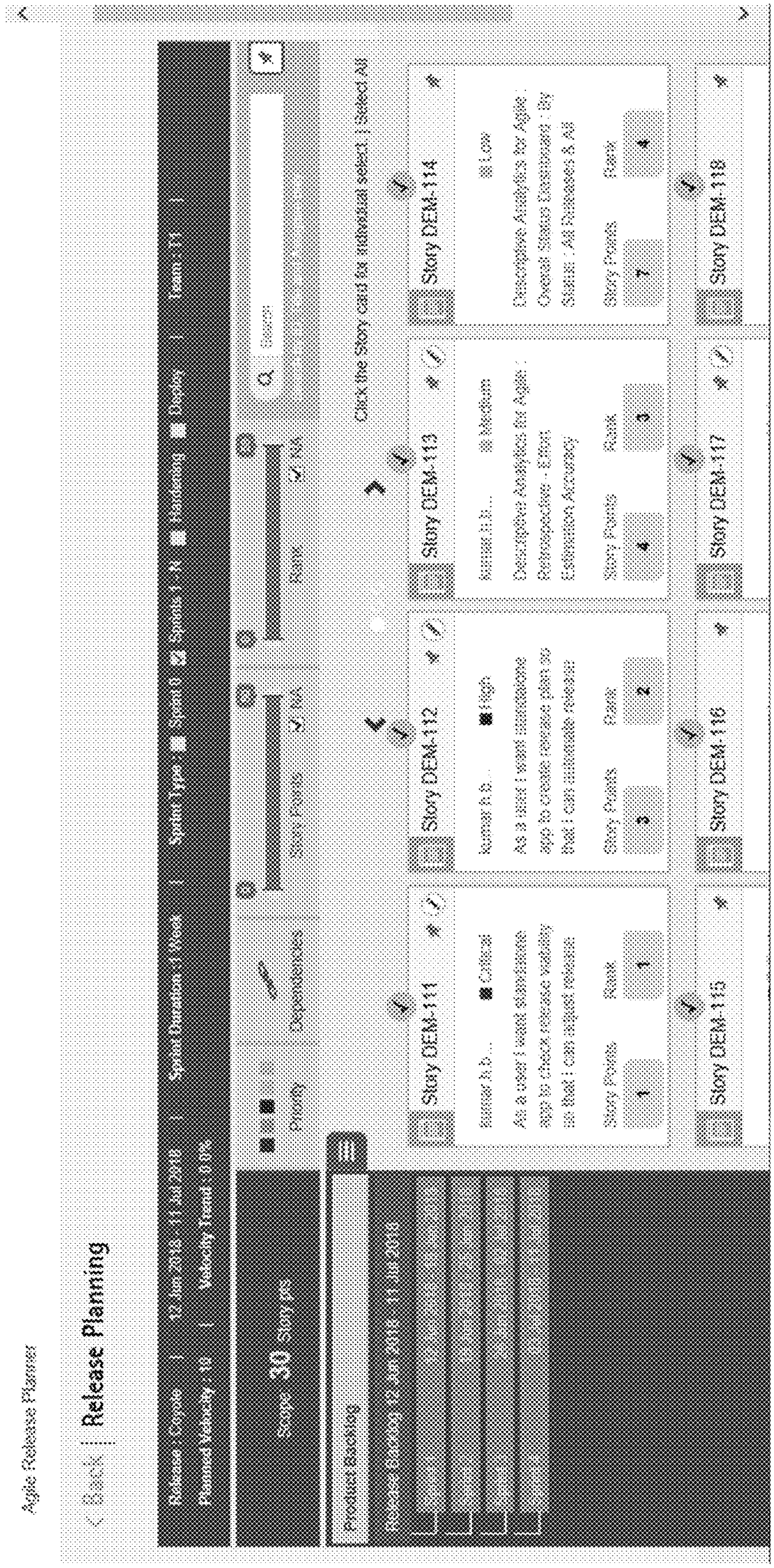
FIGS. 7A-7F illustrate release plans in accordance with an example of the present disclosure.
Figure 7B:
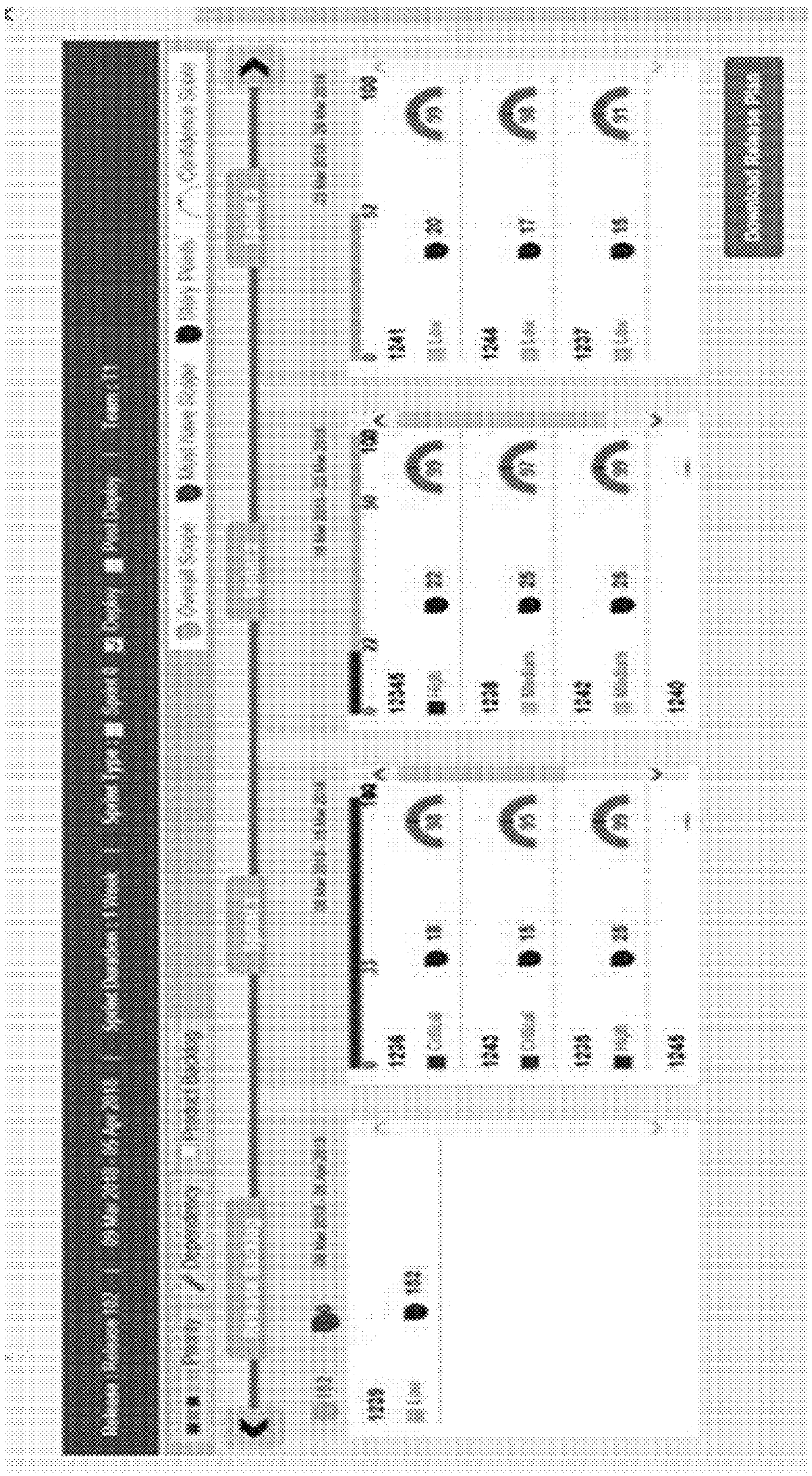
Figure 7C:
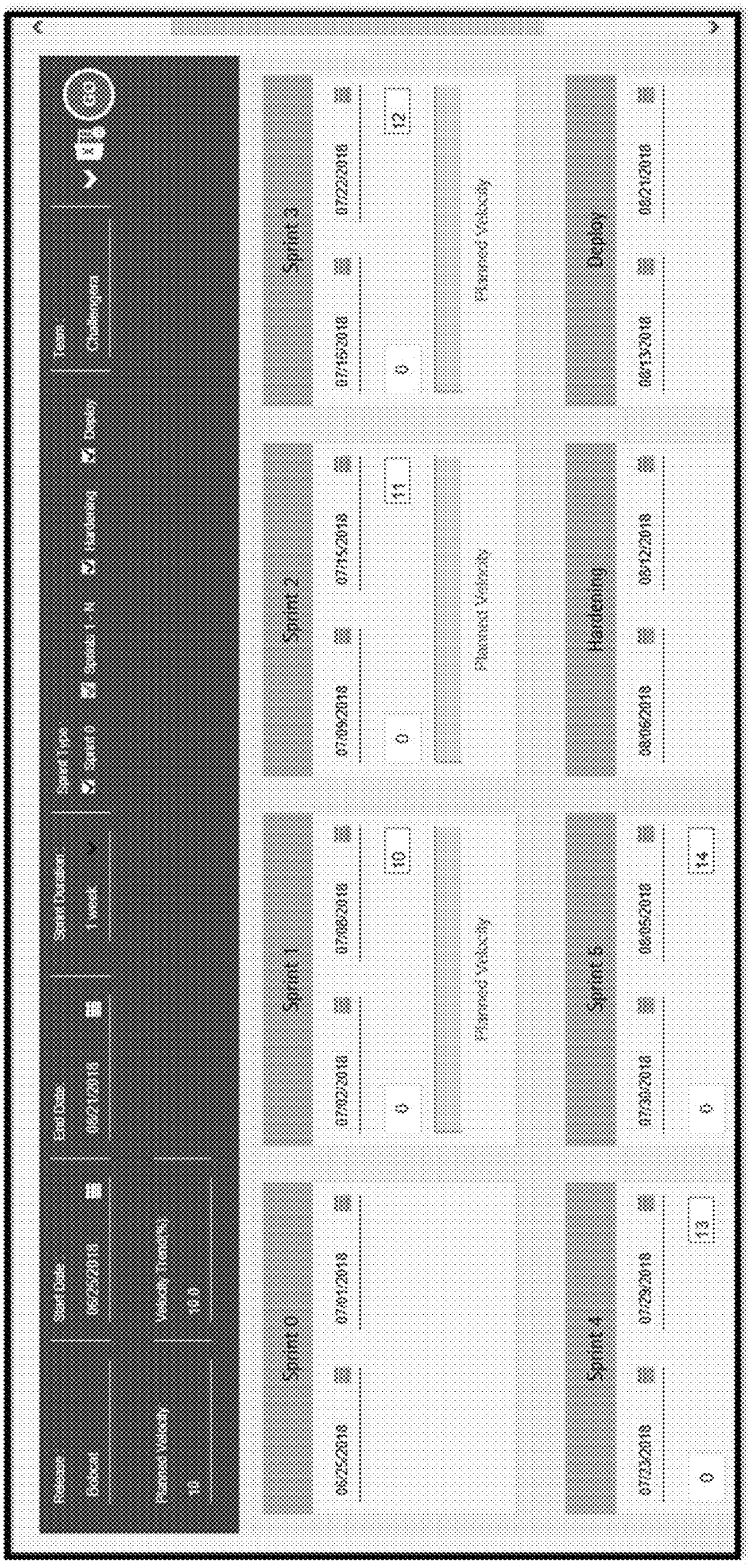
Figure 7D:
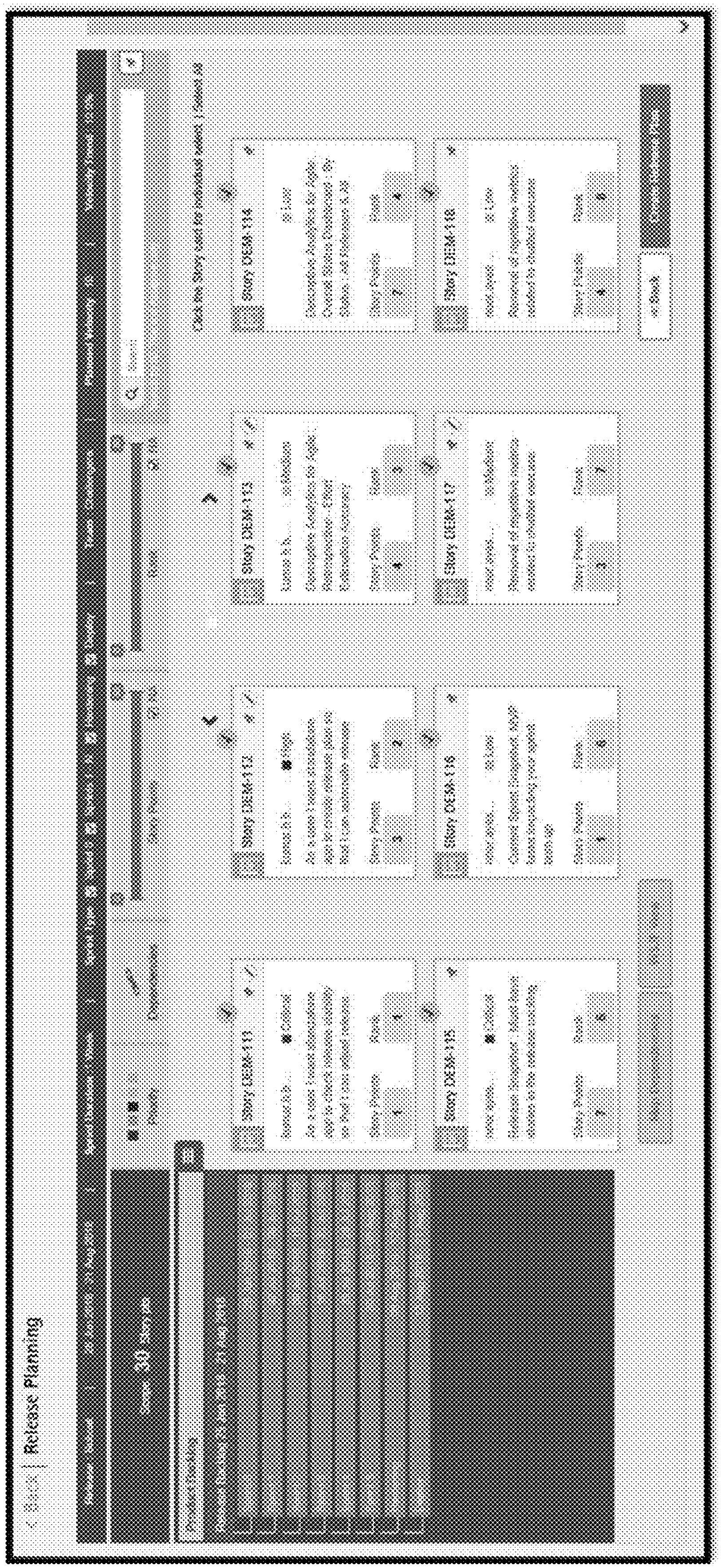
Figure 7E:
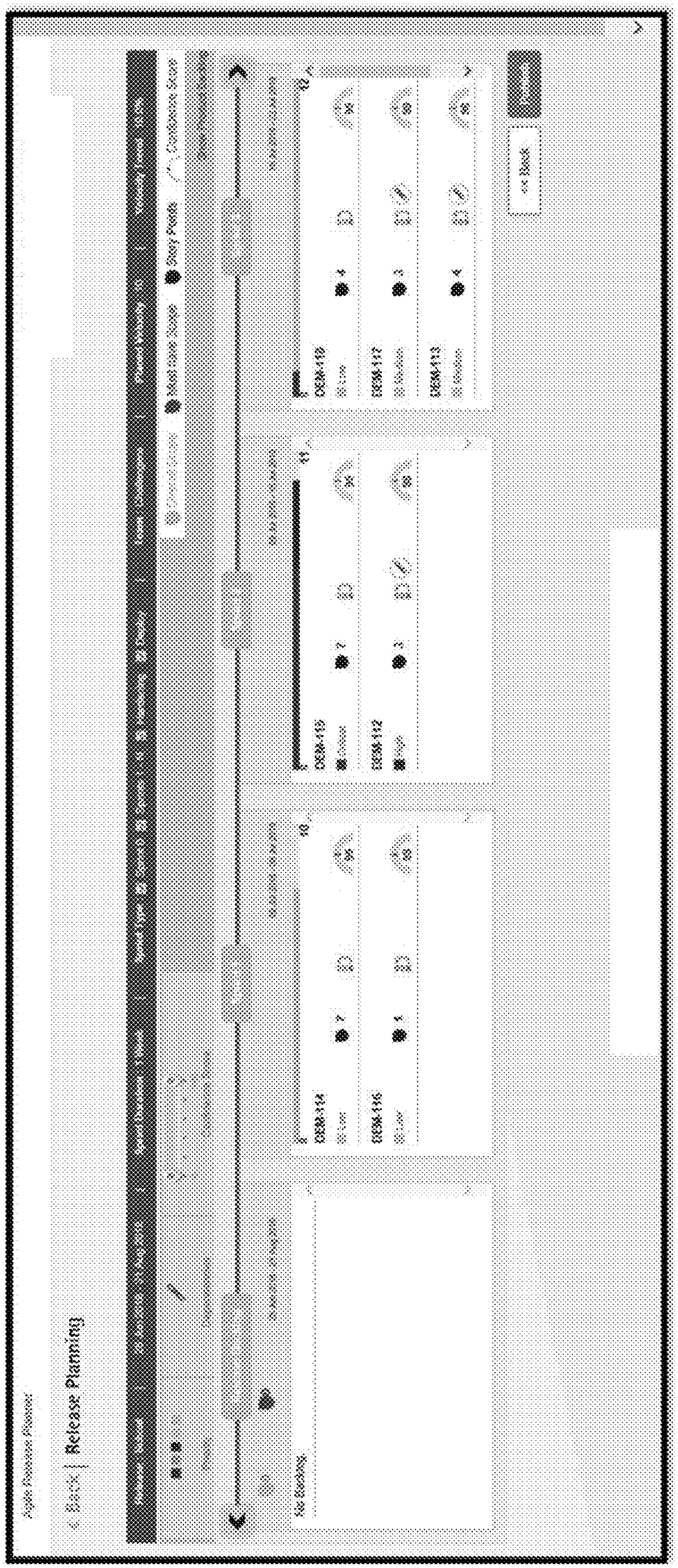
Figure 7F:
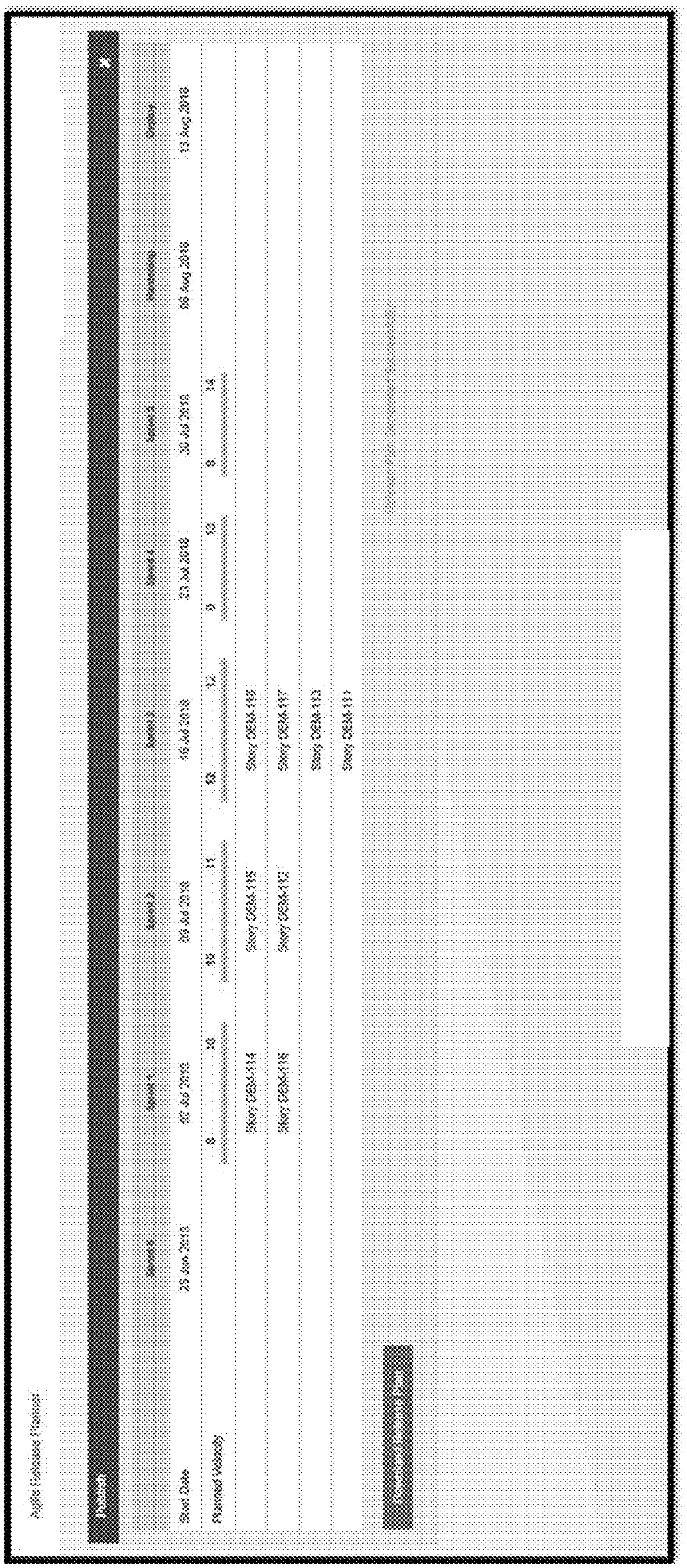

Examples of release plans are shown in FIGS. 7A-7F. FIG. 7A may represent a display of the product backlog. FIG. 7A may provide a dashboard for the user to select the stories from product backlog for the current release. FIG. 7B may represent a display of the draft release plan where the stories are mapped to the sprints. In this regard, the user 106 may modify the release plan by realigning the stories. FIG. 7C may represent a display of timelines generated by the release planning assistant 124, where the timelines may be based on a tema's velocity, sprint types and release dates. FIGS. 7D and 7E display similar information as FIGS. 7A and 7B. FIG. 7F provides the final release plan, where the user 106 may download the release plan with release timelines, sprint time lines, and draft sprint backlog.

The release planning assistant 124 may generate a release plan based on artificial intelligence, and with sprint timelines and sprint backlog. The release planning assistant 124 may include automated release plan generation, management of story dependencies using, for example, demand side management (DSM) logic, prediction of the schedule overrun of a story in an iteration, and prediction of deployment date based on selected backlog and team velocity.

With respect to the release planning assistant 124, the following sequence of steps may be implemented for analyzing the stories and scoping to a sprint.

- Sort list of stories selected for scoping by user based on story's 'Stack Rank' or 'WSFJ' value.
- Second round of sorting based on dependency between the stories. For example, if story 'A' is dependent on story 'B' then story 'B' is placed in higher order than story 'A'. Dependency between stories takes precedence over story's 'Stack Rank' and 'WSJF' value.
- Post sorting stories are assigned to sprint base on below rules.
  - Stories are selected from the sorted list from highest to lowest order.
  - Stories are assigned to 'Development' sprints only.
  - Assignment of stories to sprints starting from first 'Development' sprint and then to sprints in chronological order.
  - A story is assigned to a sprint if sprint has unoccupied or unused planned velocity which is equal to or greater than story point of the story.
  - A story is considered for scoping in to a sprint only if its' direct dependency or transitive dependency story is already scoped to a story.
- Any stories left unassigned to any sprint due to sprints' planned velocity being occupied, is assigned to release backlog.

With respect to the release planning assistant 124, the machine learning models used may be specified as follows. Specifically, for the release planning assistant 124, the story viability predictors DNN classifier service may be consumed for predicting the viability for the stories based on schedule overrun. The confidence level of schedule overrun may be shown in the release planning assistant 124.

For the release planning assistant 124, technology, domain, application, story point, story type, sprint duration, dependency and sprint jump may represent the input features for predicting whether there could be a schedule overrun based on historical data.

Figure 7G:
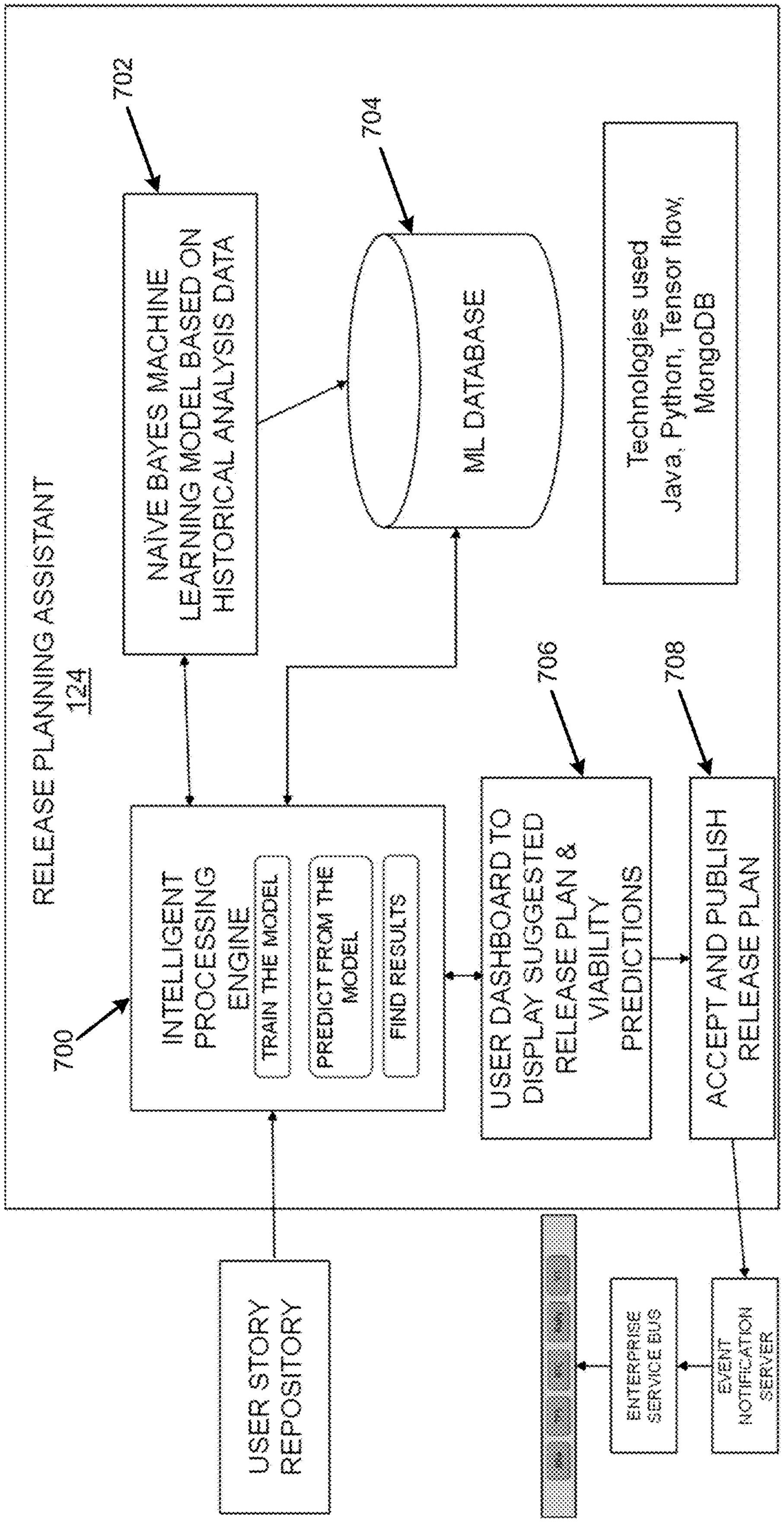
FIG. 7G illustrates a technical architecture associated with a release planning assistant, in accordance with an example of the present disclosure.

FIG. 7G illustrates a technical architecture associated with the release planning assistant 124, in accordance with an example of the present disclosure.

Referring to FIG. 7G, at 700, an intelligent processing engine may receive information from a user story repository, where the information may be used to train a model, predict from the model, and to determining results. For example, as shown at 702, the model may include a machine learning model based on historical analysis data ascertained from a machine learning database 704. At 706, a user dashboard may be used to display a suggested release plan and to provide viability predictions. At 708, the release planning assistant 124 may accept and publish a release plan.

Figure 7H:
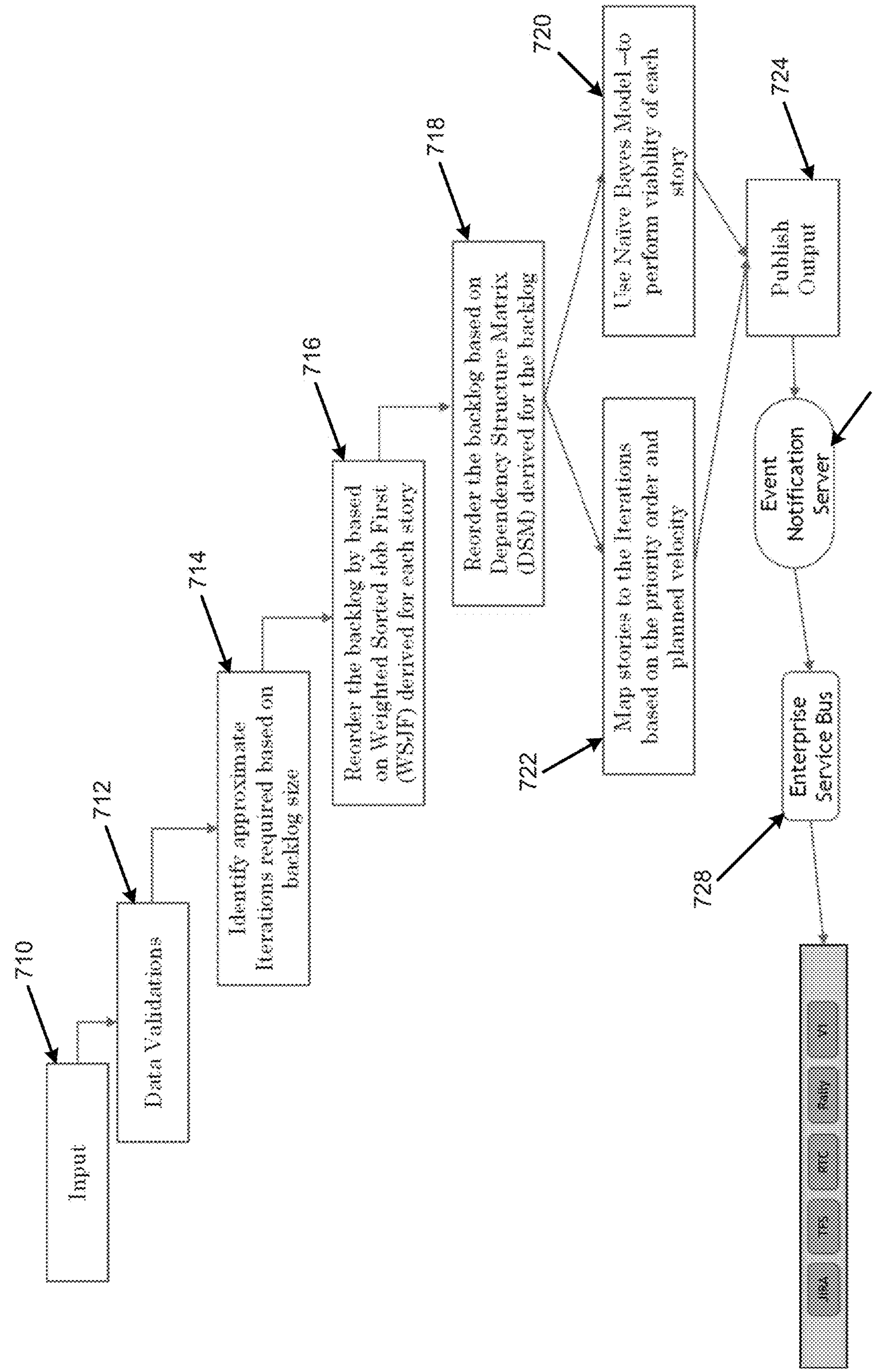
FIG. 7H illustrates a logical flowchart associated with the release planning assistant, in accordance with an example of the present disclosure.

FIG. 7H illustrates a logical flowchart associated with the release planning assistant 124, in accordance with an example of the present disclosure.

Referring to FIG. 7H, at block 712, the release planning assistant 124 may perform data validations for input data received at block 710. The input data received at block 710 may include, for example, user story backlog, historical story delivery, performance data, etc. Further, the input data received at block 710 may include release start date, prioritized stories, planned velocities, etc. Further examples of input data may include backlog having stories updated with identification, title, description, and status, etc., team velocity, iteration types such as hardening, deploy, development, sprint duration, etc.

The data validations at block 712 may include rule-based validations for relevant story data (e.g., a rule may specify that a story identification (ID) is required). In this regard, the data validations may enable release planning to be meaningful. Validations may be related to the user input details mentioned in block 710. Examples may include release start date should be current or future date, release name should be updated, team velocity should be >0, and stories should have identification.

At block 714, the release planning assistant 124 may identify approximate iterations needed based on backlog size, for example, by utilizing rules to generate iteration timelines based on release start, iteration type, and iteration duration. In this regard, backlog size/team velocity (rounded off to next whole digit) may provide the approximate iteration required.

At block 716, the release planning assistant 124 may reorder the backlog based on weighted sorted job first (WSJF) derived for each story, where the weighted sorted job first technique may be mapped with story attributes to determine results. In this regard, the story having highest WSJF value may be ranked first.

At block 718, the release planning assistant 124 may reordered the backlog based on the dependency structure matrix (DSM) derived from the backlog, where based on the dependency structure matrix logic, stories may be reordered utilizing a sort tree process. For example, if story 'A' is dependent on story 'B' then story 'B' may be placed in higher order than story 'A'. Dependency between stories may take precedence over story's 'Rank' and 'WSJF' value.

At block 720, the release planning assistant 124 may use a Naïve Bayes model to perform the validity of each story, where the Naïve Bayes machine learning model may be based on historical analysis data. In this regard, the story viability predictor 142 Naïve Bayes Model may be consumed for predicting the viability for the stories based on schedule overrun. The confidence level of schedule overrun may be shown in the release planning assistant 124. Technology, domain, application, story point, story type, sprint duration, dependency and sprint jump may represent the input features for predicting whether there could be a schedule overrun based on historical data.

At block 722, the release planning assistant 124 may map stories to the iterations based on the priority order and planned velocity, where rules may be utilized to assign stories in an iteration based on rank and planned velocity. In this regard, stories may be assigned to iterations bases on the following rules.

- Stories are selected from the sorted list from highest to lowest order.
- Stories are assigned to 'Development' iterations only (e.g., see block 710 for iteration types)
- Assignment of stories to iterations starting from first 'Development' iteration and then to iterations in chronological order.
- A story may be assigned to an iteration if the iteration has unoccupied or unused planned velocity which is equal to or greater than story point of the story.
- A story may be considered for scoping in to a sprint only if its direct dependency or transitive dependency story is already scoped to a story.
- Any stories left unassigned to any iteration due to planned velocity being occupied, may be assigned to release backlog.

At block 724, the release planning assistant 124 may publish an output that may include release and iteration timelines with iteration backlog for each iteration. In this regard, the block 714 and the block 722 results may be made available to the user.

At block 726, the release planning assistant 124 may forward the output to an event notification server. In this regard, the event notification server may notify an event is triggered to update in the ALM tool the result published in block 724.

At block 728, the release planning assistant 124 may forward the output to an enterprise service bus. In this regard, the enterprise service bus may manage the ALM tool update of the result published in block 724.

Referring to FIGS. 1-2C, the iteration review assistant 126 that is executed by at least one hardware processor (e.g., the hardware processor 1302 of FIG. 13, and/or the hardware processor 1504 of FIG. 15) may provide for execution of an iteration review meeting. The iteration review assistant 126 may provide for review, for example, by a product owner, of developed user stories as per an acceptance criteria. The iteration review assistant 126 may receive as input working software, and generate as output deferred defects and stories. The output of the iteration review assistant 126 may be received by the retrospective assistant 114 and the iteration planning assistant 116.

Referring to FIGS. 1-2C, the defect management assistant 128 that is executed by at least one hardware processor (e.g., the hardware processor 1302 of FIG. 13, and/or the hardware processor 1504 of FIG. 15) is to provide for prioritization of defects as per their severity and impact. The defect management assistant 128 may provide for reduction in efforts by performing repetitive tasks related to defect management. The defect management assistant 128 may receive as input a defect log, and generate as output prioritized defects. The output of the defect management assistant 128 may be received by the iteration planning assistant 116 and the daily meeting assistant 118.

Referring to FIGS. 1-2C, the impediment management assistant 130 that is executed by at least one hardware processor (e.g., the hardware processor 1302 of FIG. 13, and/or the hardware processor 1504 of FIG. 15) may provide for prioritization of impediments as per their impact on progress. The impediment management assistant 130 may provide for reduction of efforts by performing repetitive tasks related to impediment management. The impediment management assistant 130 may receive as input an impediment log, and generate as output prioritized impediments. The output of the impediment management assistant 130 may be received by the daily meeting assistant 118.

Referring to FIGS. 1-2C, the demo assistant 132 that is executed by at least one hardware processor (e.g., the hardware processor 1302 of FIG. 13, and/or the hardware processor 1504 of FIG. 15) is to provide a checklist to fulfill all standards and/or requirements of coding, testing, and compliance. The demo assistant 132 may limit the chances of rework by reducing the understanding gap between a product owner and a team. The demo assistant 132 may receive as input a project configuration, and generate as output a definition of done. The output of the demo assistant 132 may be received by the iteration planning assistant 116 and the daily meeting assistant 118.

The readiness assistant 134 that is executed by at least one hardware processor (e.g., the hardware processor 1302 of FIG. 13, and/or the hardware processor 1504 of FIG. 15) may define criteria for a user story to be called as ready for the next iteration. The readiness assistant 134 may provide for the avoidance of commencement of work on user stories that do not have clearly defined completion criteria, which may translate into inefficient back-and-forth discussion or rework. The readiness assistant 134 may receive as input a project configuration and agile maturity assessment, and generate as output a definition of ready. The output of the readiness assistant 134 may be received by the backlog grooming assistant 120.

Figure 8A:
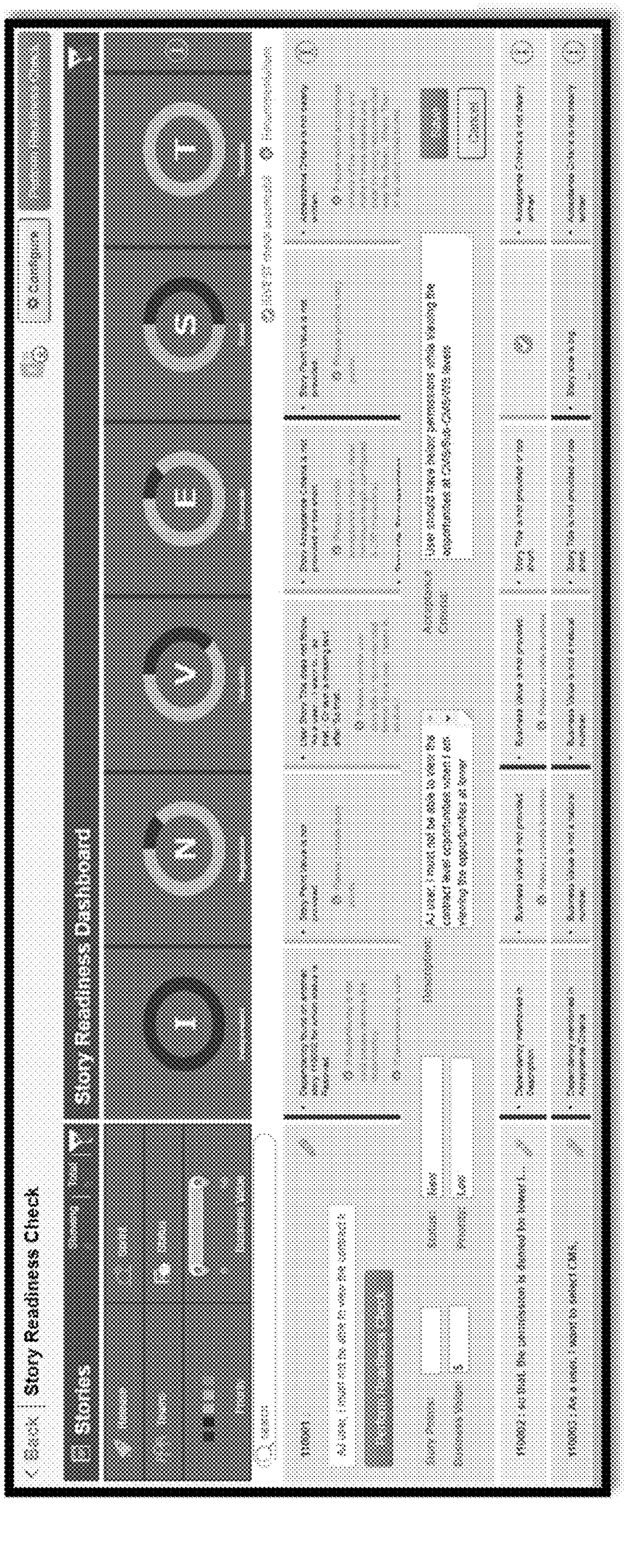
FIG. 8A illustrates INVEST checking on user stories in accordance with an example of the present disclosure.
Figure 8B:
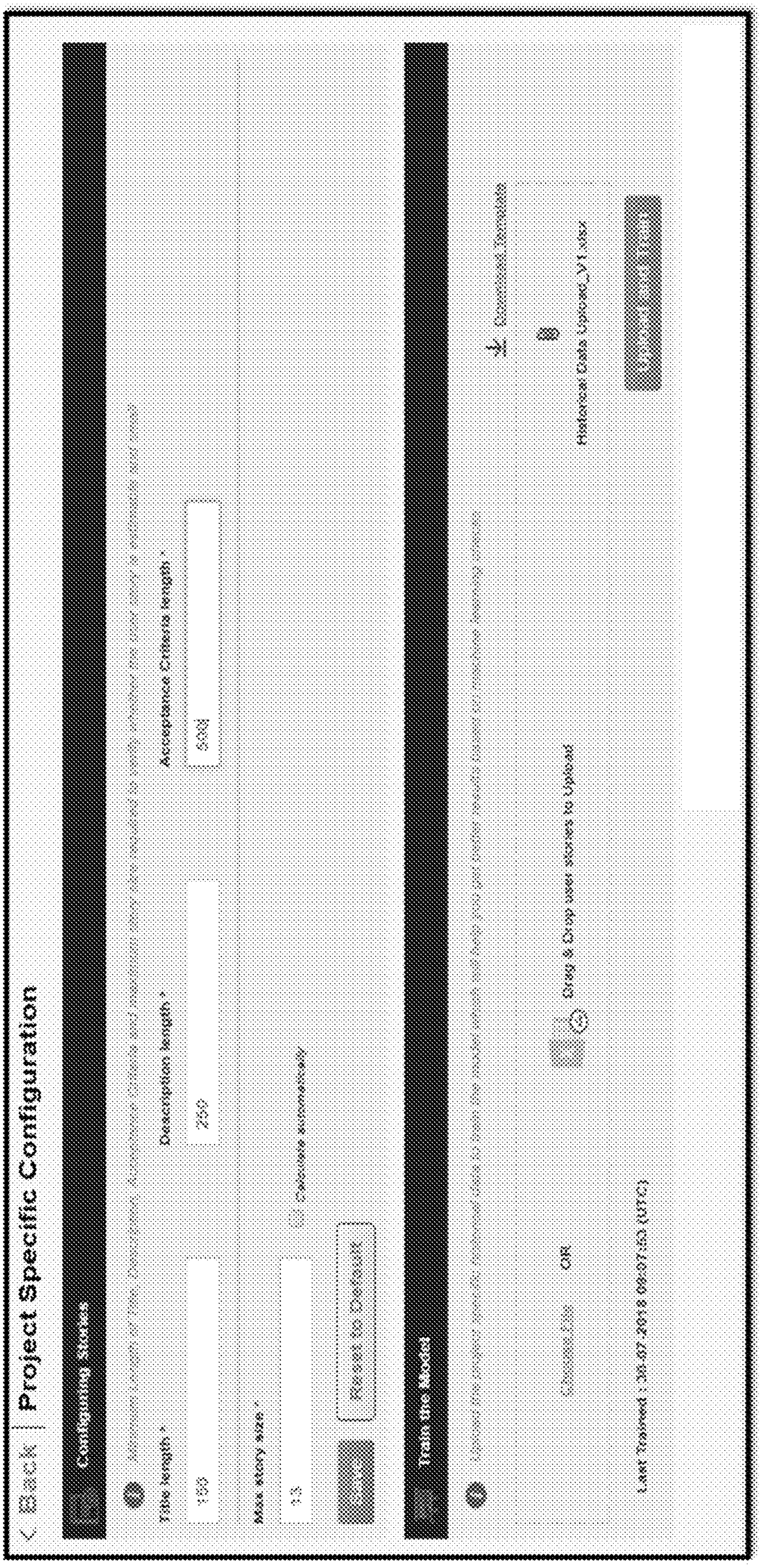
FIGS. 8B-8F illustrate examples of story readiness checking in accordance with an example of the present disclosure.
Figure 8C:
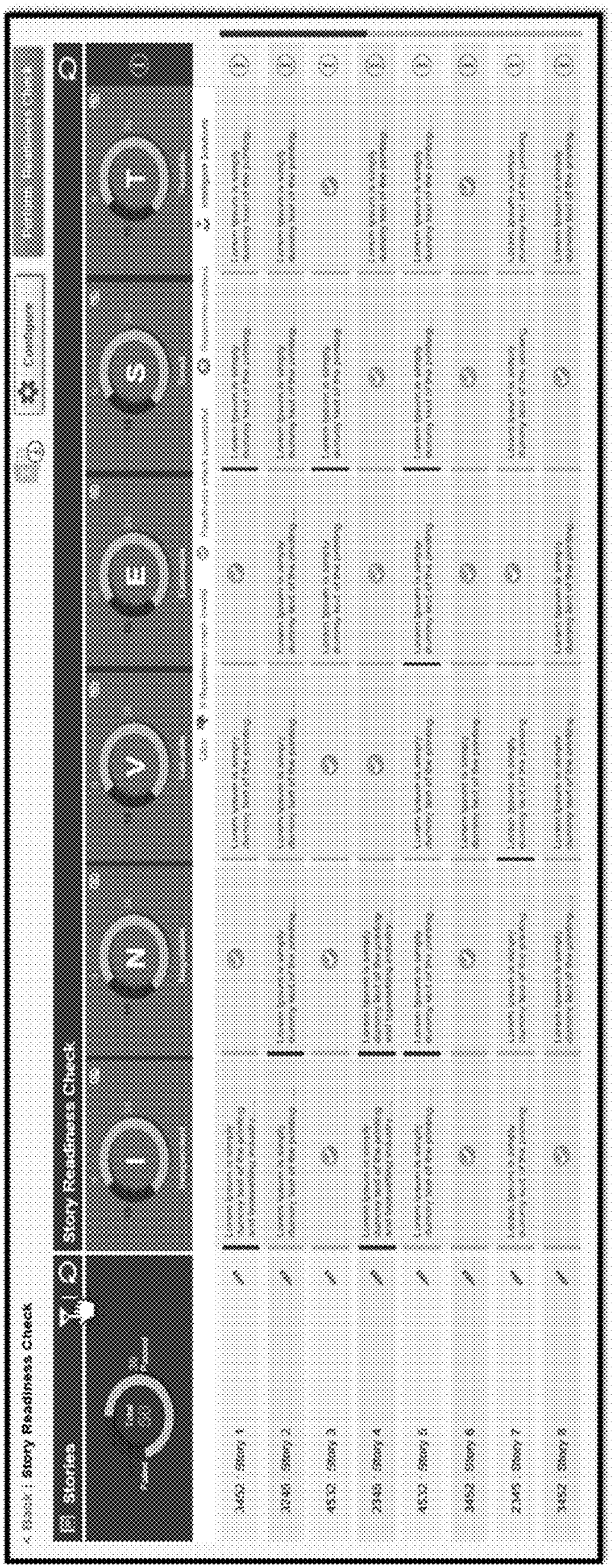
Figure 8D:
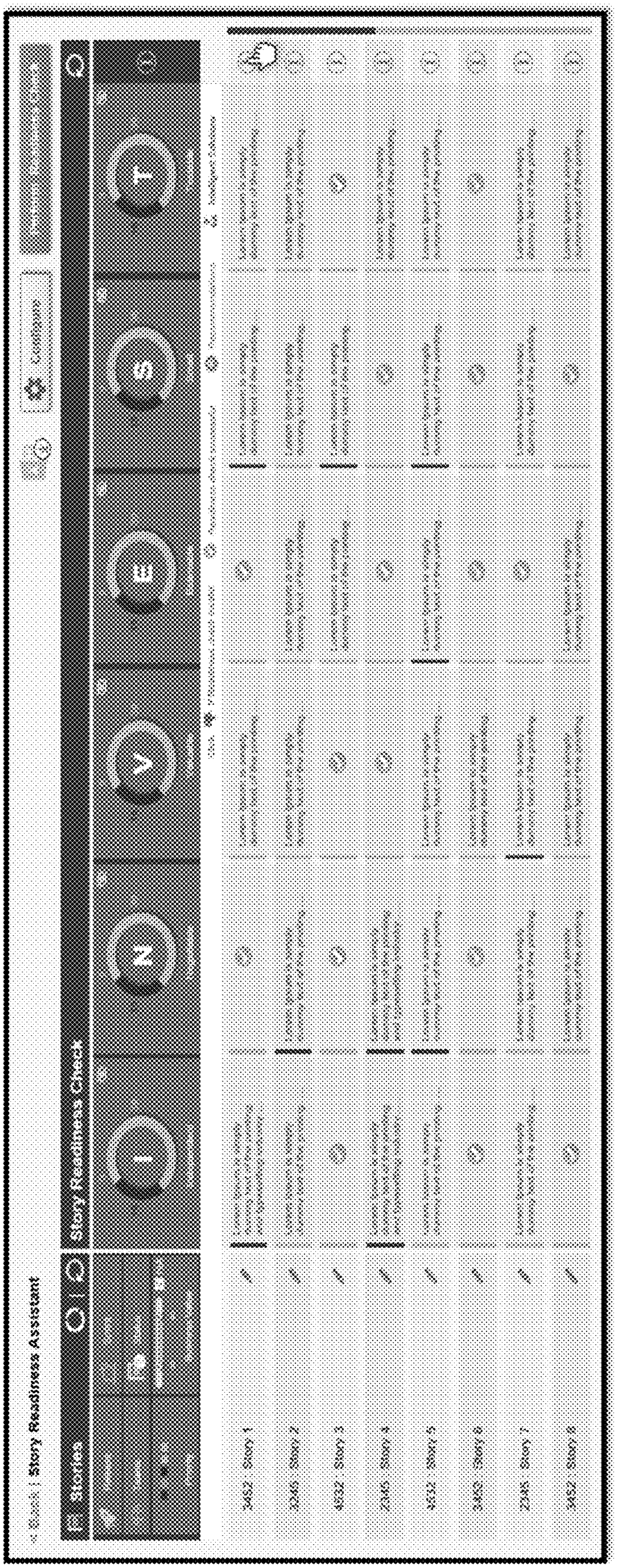
Figure 8E:
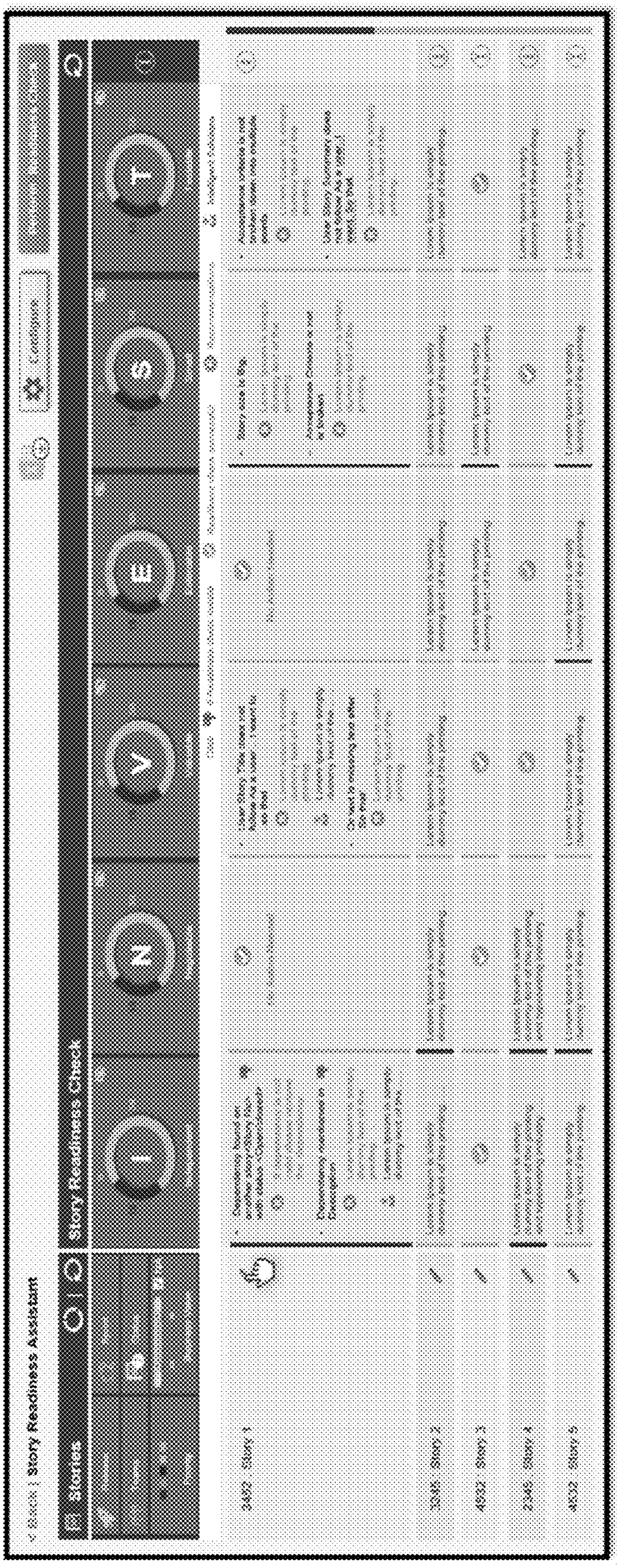
Figure 8F:
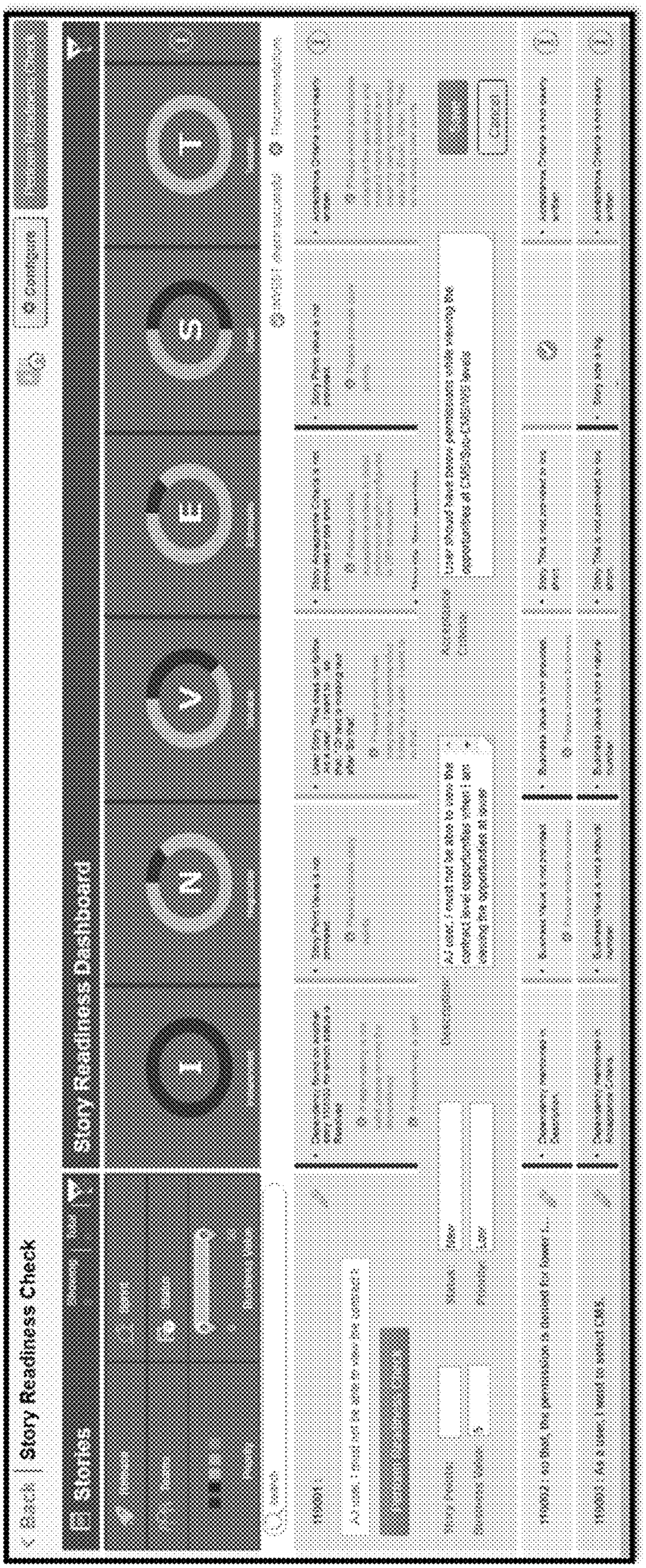

Referring to FIGS. 1-2C, the readiness assistant 134 may verify quality of the user story and ensure user story readiness by performing an INVEST check on user stories. For example, FIG. 8A illustrates INVEST checking on user stories in accordance with an example of the present disclosure. Further, FIGS. 8B-8F illustrate examples of story readiness checking in accordance with an example of the present disclosure. The readiness assistant 134 may perform INVEST checking on user stories by utilizing scrum recommendations, machine learning, and natural language processing, and provide an outcome in a RAG form. The readiness assistant 134 may provide recommendations against each observation to improve quality of a story. A user may edit a user story based on recommendations, and may perform INVEST checking as needed. The checks may be configurable to meet project specific requirements. Outputs of the readiness assistant 134 may include improvements in story quality, reduction in effort, and guided assistance on Agile processes.

Figure 8G:
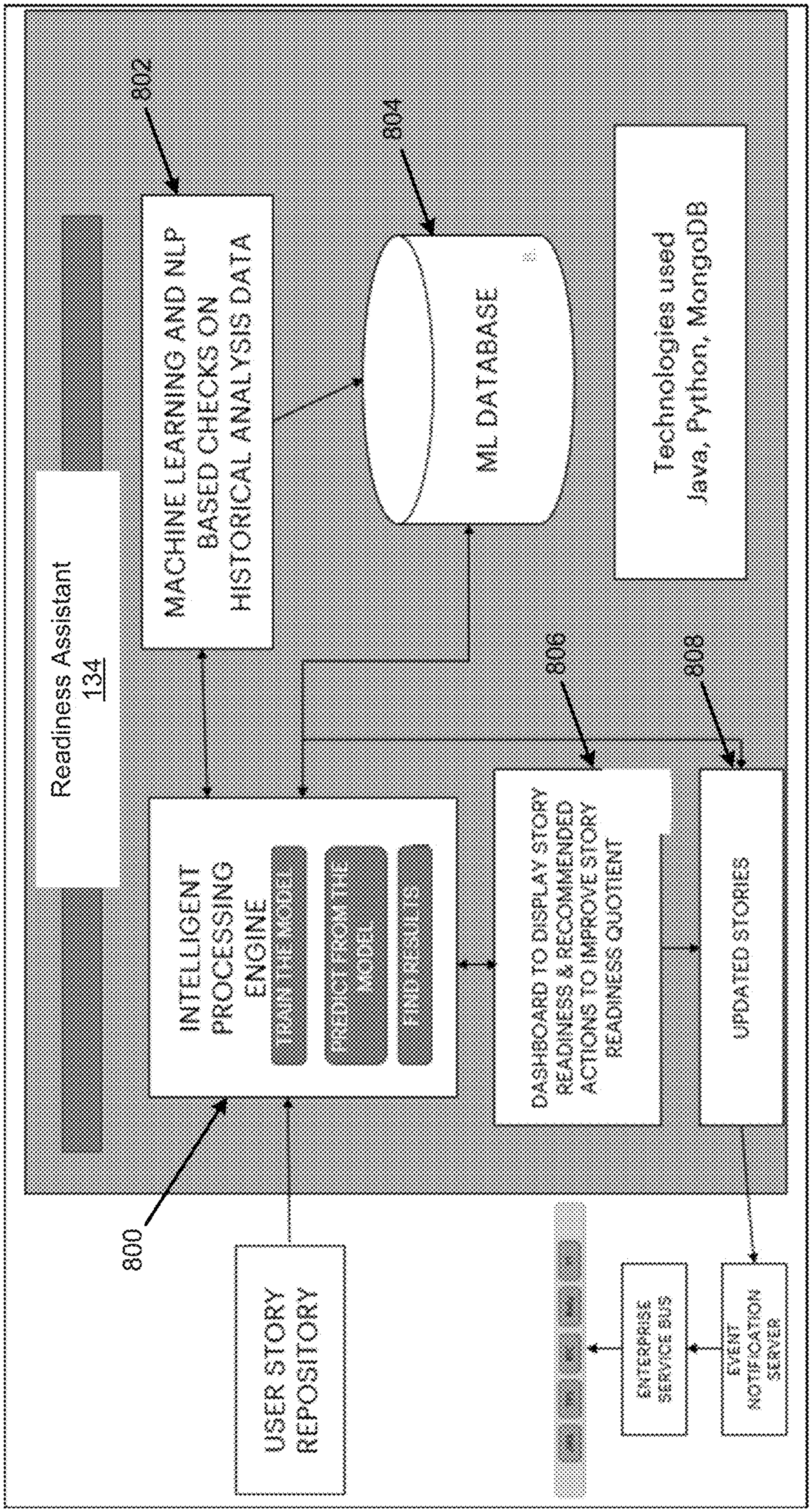
FIG. 8G illustrates a technical architecture associated with a readiness assistant, in accordance with an example of the present disclosure.

FIG. 8G illustrates a technical architecture associated with the readiness assistant 134, in accordance with an example of the present disclosure.

Referring to FIG. 8G, at 800, an intelligent processing engine may receive information from a user story repository, where the information may be used to train a model, predict from the model, and to determining results. For example, as shown at 802, the model may include a machine learning model based on historical analysis data ascertained from a machine learning database 804. At 806, a user dashboard may be used to display story readiness and to display recommended actions to improve story readiness quotient. At 808, the readiness assistant 134 may update stories.

Figure 8H:
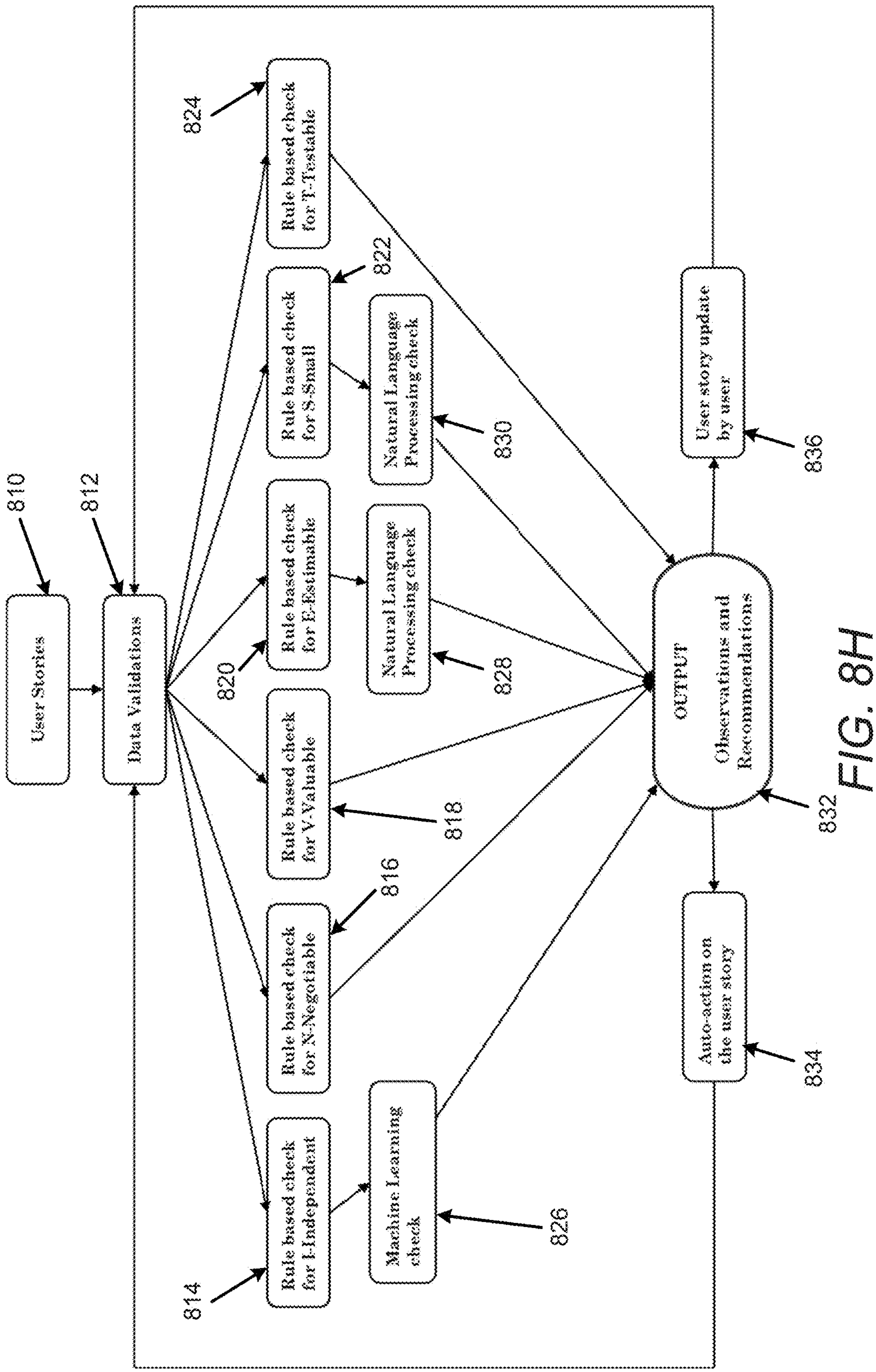
FIG. 8H illustrates a logical flowchart associated with the readiness assistant, in accordance with an example of the present disclosure.

FIG. 8H illustrates a logical flowchart associated with the readiness assistant 134, in accordance with an example of the present disclosure.

With respect to the readiness assistant 134, the inquiry response performer 138 may ascertain user stories associated with a product development plan associated with the product, perform, on each of the ascertained user stories, at least one rule-based check to determine a readiness of a respective user story, and generate, for the product development plan, a readiness assessment of each of the ascertained user stories. In this regard, the product development controller 144 may control, based on the generated readiness assessment, development of the product based on the invocation of the determined retrospective assistant 114, the iteration planning assistant 116, the daily meeting assistant 118, the backlog grooming assistant 120, the report performance assistant 122, the release planning assistant 124, the iteration review assistant 126, the defect management assistant 128, the impediment management assistant 130, the demo assistant 132, the readiness assistant 134, and/or the story viability predictor 142.

Thus, referring to FIG. 8H, at block 812, the readiness assistant 134 may perform data validations for user stories received at block 810.

At blocks 814-824, the readiness assistant 134 may perform a rule-based checks, respectively, for I-independent, N-negotiable, V-valuable, E-estimable, S-small, and T-testable.

At block 826, the readiness assistant 134 may perform a machine learning check.

At blocks 828 and 830, the readiness assistant 134 may perform natural language processing checks.

At block 832, an output of the readiness assistant 134 may include observations and recommendations.

In this regard, at block 834, the readiness assistant 134 may perform actions on the user story.

At block 836, the readiness assistant 134 may perform an update on the user story by the user.

FIGS. 8I-8N illustrate INVEST checking performed by the readiness assistant 134 as described above, in accordance with an example of the present disclosure.

With respect to the INVEST checking performed by the readiness assistant 134 as described above, the Invest check may be performed on all the stories uploaded by the end user. In this regard, INVEST may represent Independent, Negotiable, Valuable, Estimable, Small, and Testable.

The readiness assistant 134 may perform the independent check as follows. The readiness assistant 134 may check if dependency is mentioned in "Dependent On" story field. The readiness assistant 134 may check through Machine learning model (Bag of words) if there is any dependency between stories uploaded. The readiness assistant 134 may check if dependency related keyword is mentioned in Story Description field. Finally, the readiness assistant 134 may check if dependency related keyword is mentioned in Story Acceptance Criteria field.

The readiness assistant 134 may perform the negotiable check as follows. The readiness assistant 134 may check if story points is given or not. The readiness assistant 134 may check if business value is given or not. Finally, the readiness assistant 134 may check if story points is within + or −25% of average of story points.

The readiness assistant 134 may perform the valuable check as follows. The readiness assistant 134 may check if business value is given or not. Finally, the readiness assistant 134 may check if story title is in "As a user . . . I want . . . so that . . . " format.

The readiness assistant 134 may perform the estimable check as follows. The readiness assistant 134 may check if story title is of minimum configured length. The readiness assistant 134 may check if story description is of minimum configured length. The readiness assistant 134 may check if story acceptance criteria is of minimum configured length. Finally, the readiness assistant 134 may check through NLP for spelling and grammatical correctness of story title, description and acceptance criteria.

The readiness assistant 134 may perform the small check as follows. The readiness assistant 134 may check if story is less than 110% of max story delivered historically. Finally, the readiness assistant 134 may check through NLP for spelling and grammatical correctness of story title and description, and also if it can be broken in to smaller stories.

The readiness assistant 134 may perform the testable check as follows. The readiness assistant 134 may check if story acceptance criteria is given or not, and in a "Given . . . When . . . Then . . . " format or bullet format. Further, the readiness assistant 134 may check if story title is in "As a user . . . I want . . . so that . . . " format.

With respect to machine learning models used for the readiness assistant 134, the machine learning models may include a bag of words model with Linear SVC (Support Vector Classifier). An objective of the model may include finding whether there could be dependencies with respect to the list of uploaded stories. Story description, story title, and story identification may represent the input features for training the model. The machine learning model may use the keywords in story title and story description of the uploaded stories, and may check for a similar story in the historical data to find dependencies with respect to uploaded ones. Further, the machine learning model may predict a similar story from historical data for the list of uploaded stories, and determine dependencies.

With respect to natural language processing used for the readiness assistant 134, the natural language processing may include, for example, spacy and language check. An objective of the natural language processing may include checking the quality and completeness of the list of uploaded stories, and checking whether a story can be broken down into multiple stories and still be meaningful. The language check may be used for spelling checking, and the spacy check may be used to find the parts of speech and word dependencies which is used to check the grammatical correctness for uploaded stories (story title, story description, acceptance criteria).

With respect to stories for the readiness assistant 134, the stories (e.g., story title, story description, acceptance criteria) may be divided into multiple parts based on coordinating conjunction (AND) and (.), and the sub sentences may be checked for quality and completeness.

Figure 8I:
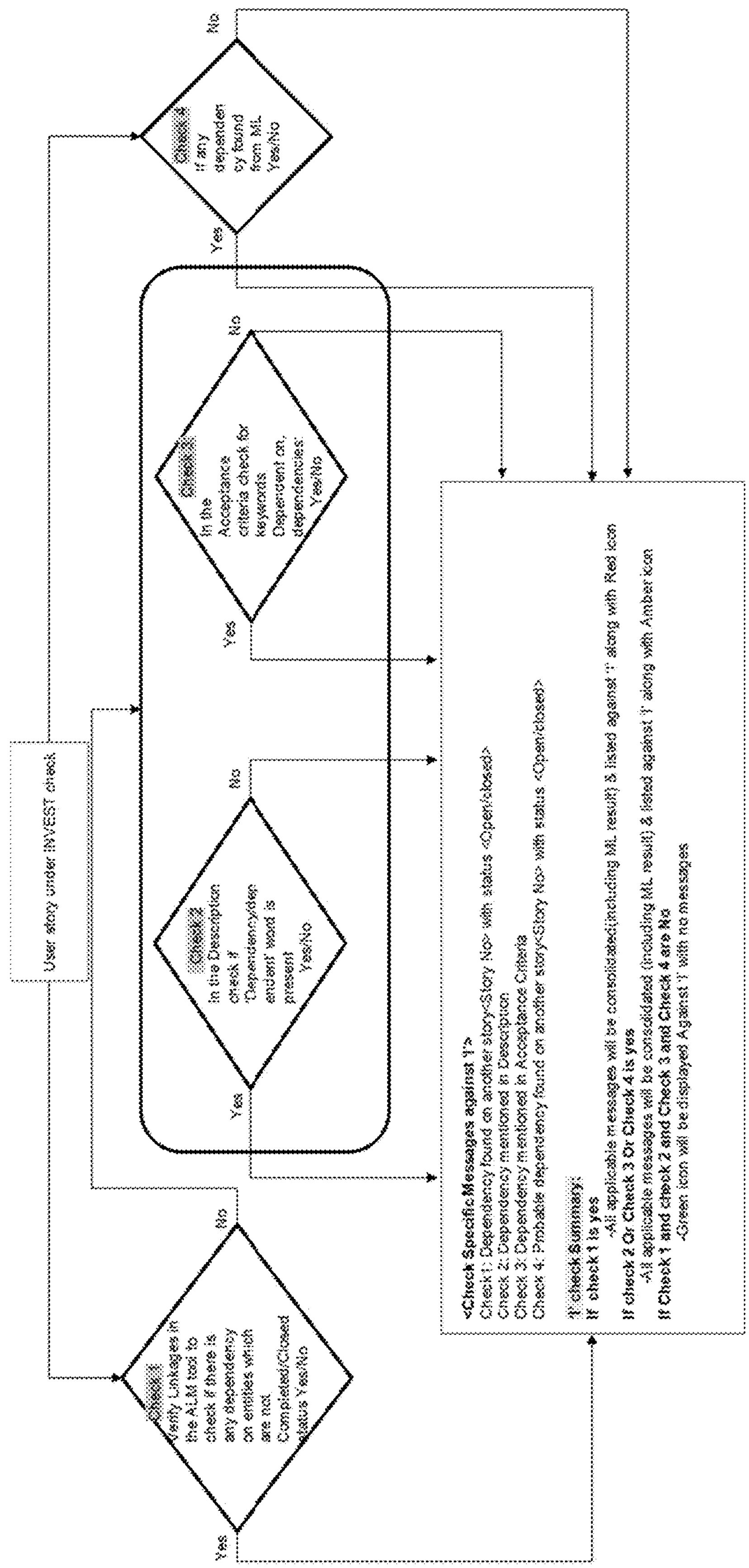
FIGS. 8I-8N illustrate INVEST checking performed by the readiness assistant, in accordance with an example of the present disclosure.
Figure 8J:
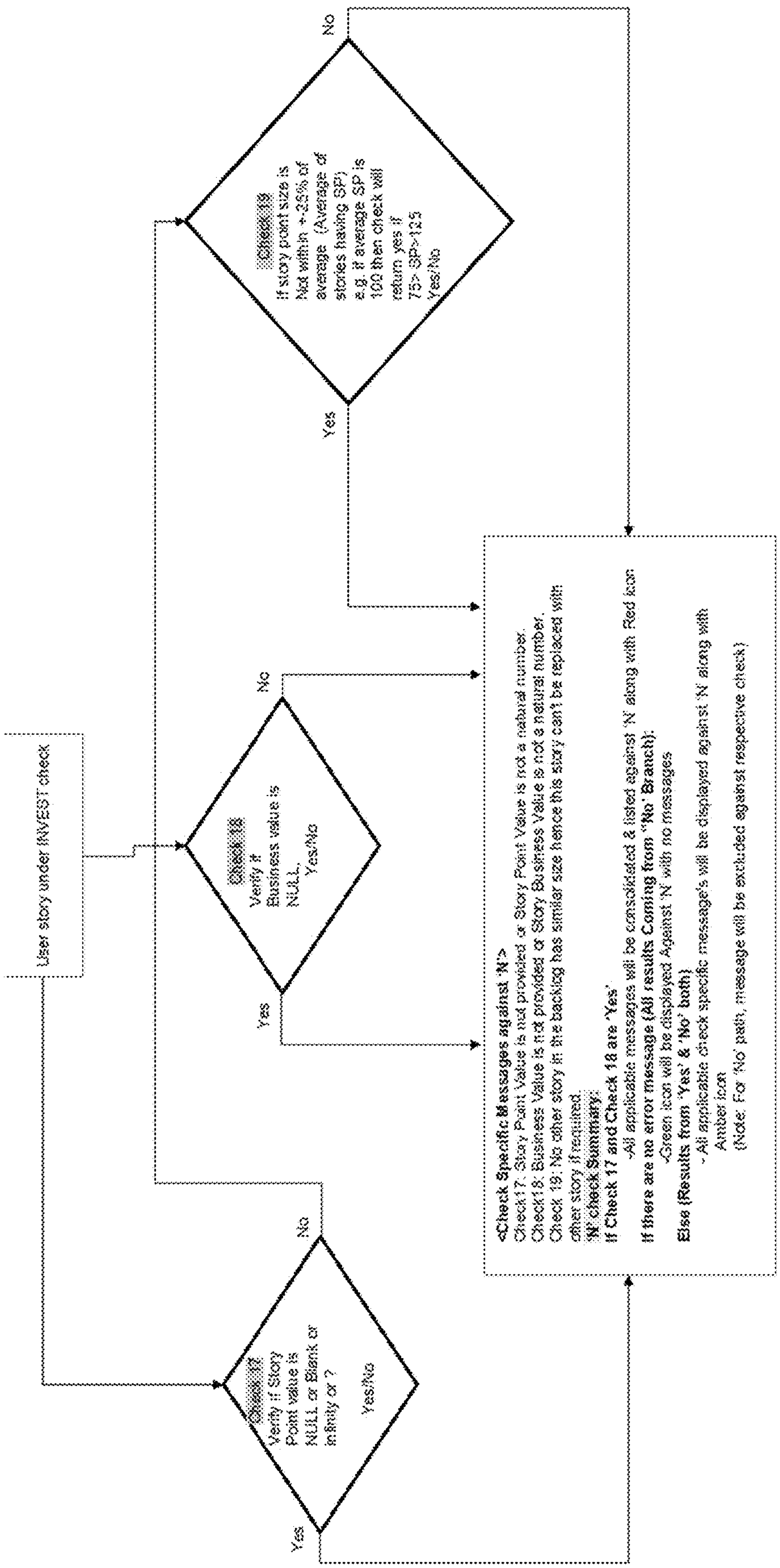
Figure 8K:
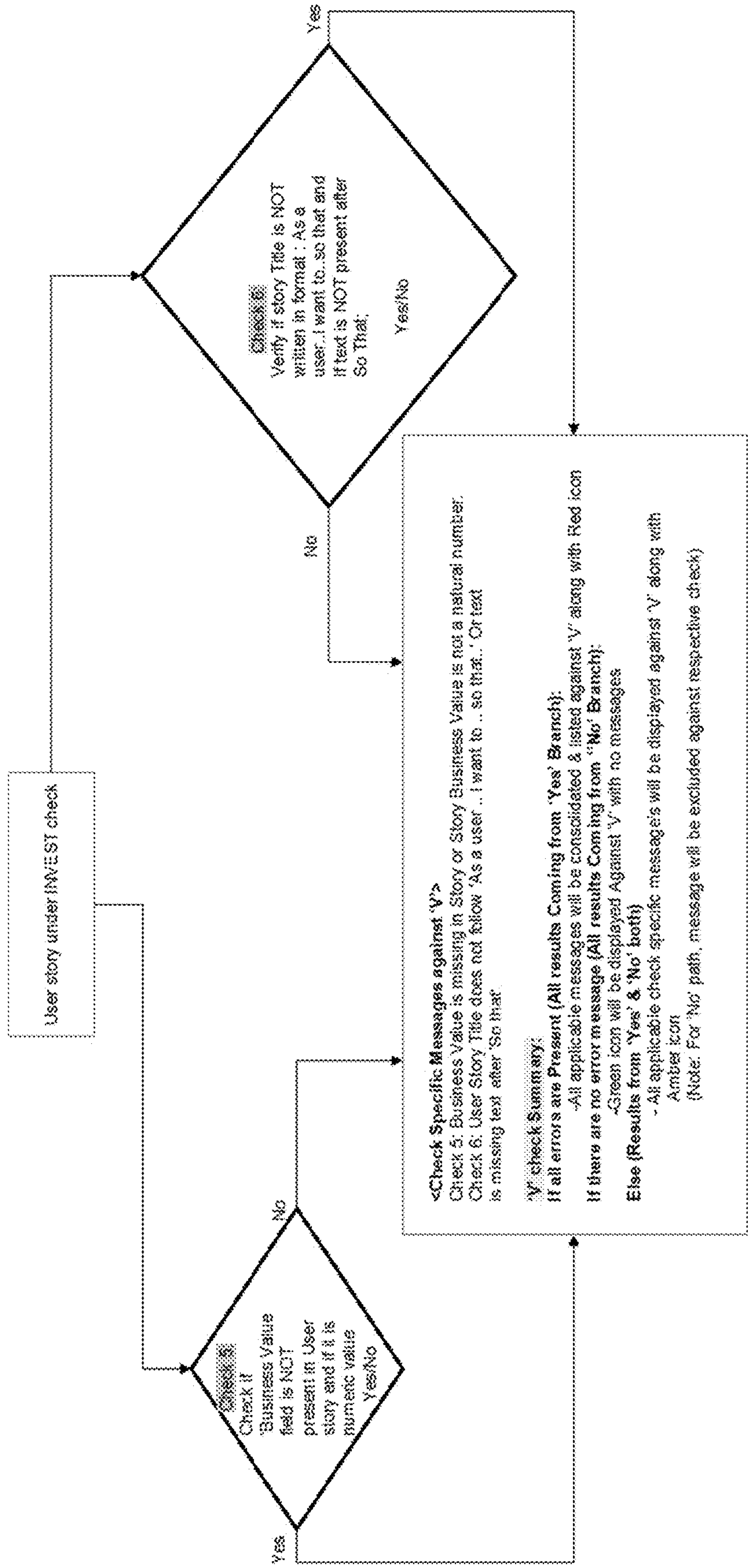
Figure 8L:
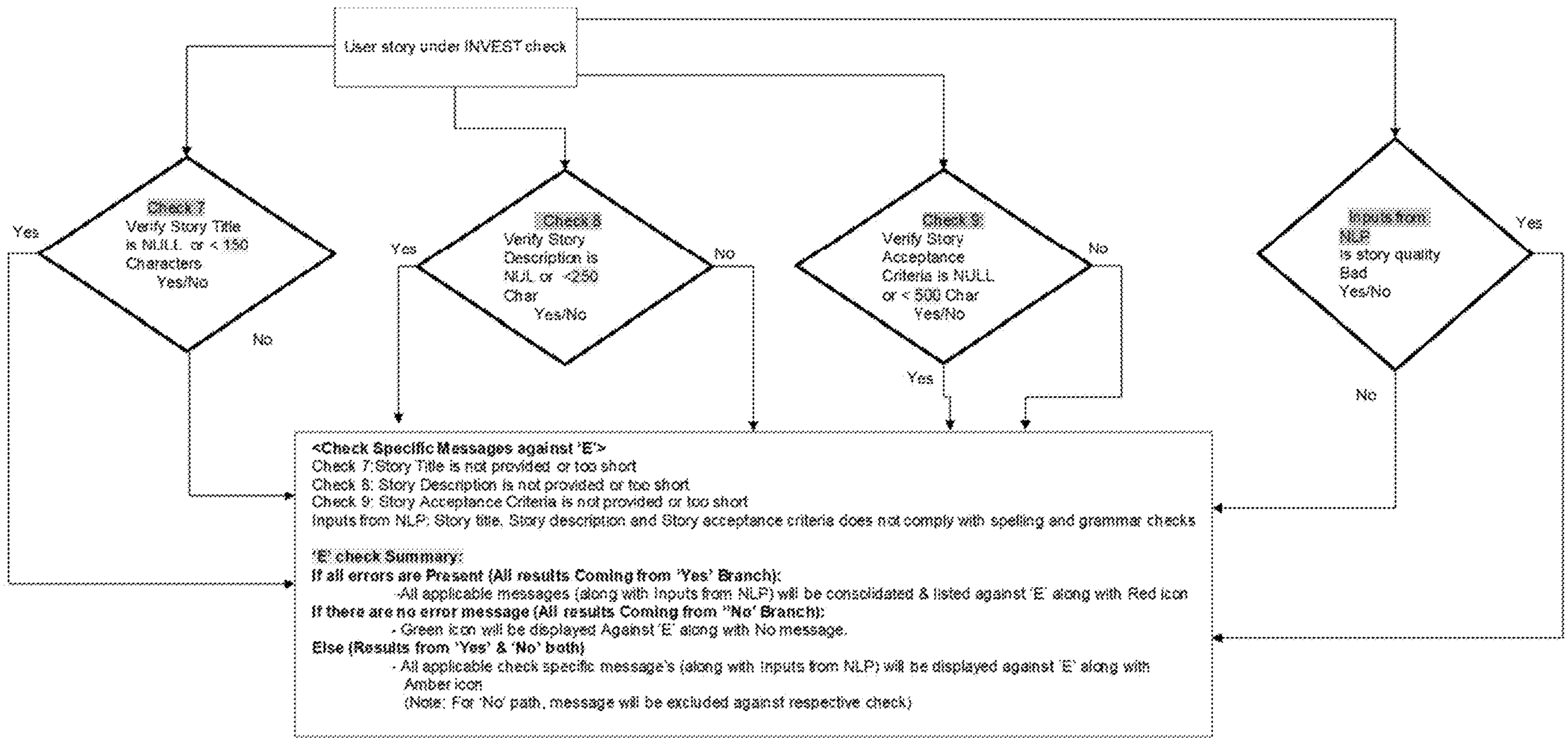
Figure 8M:
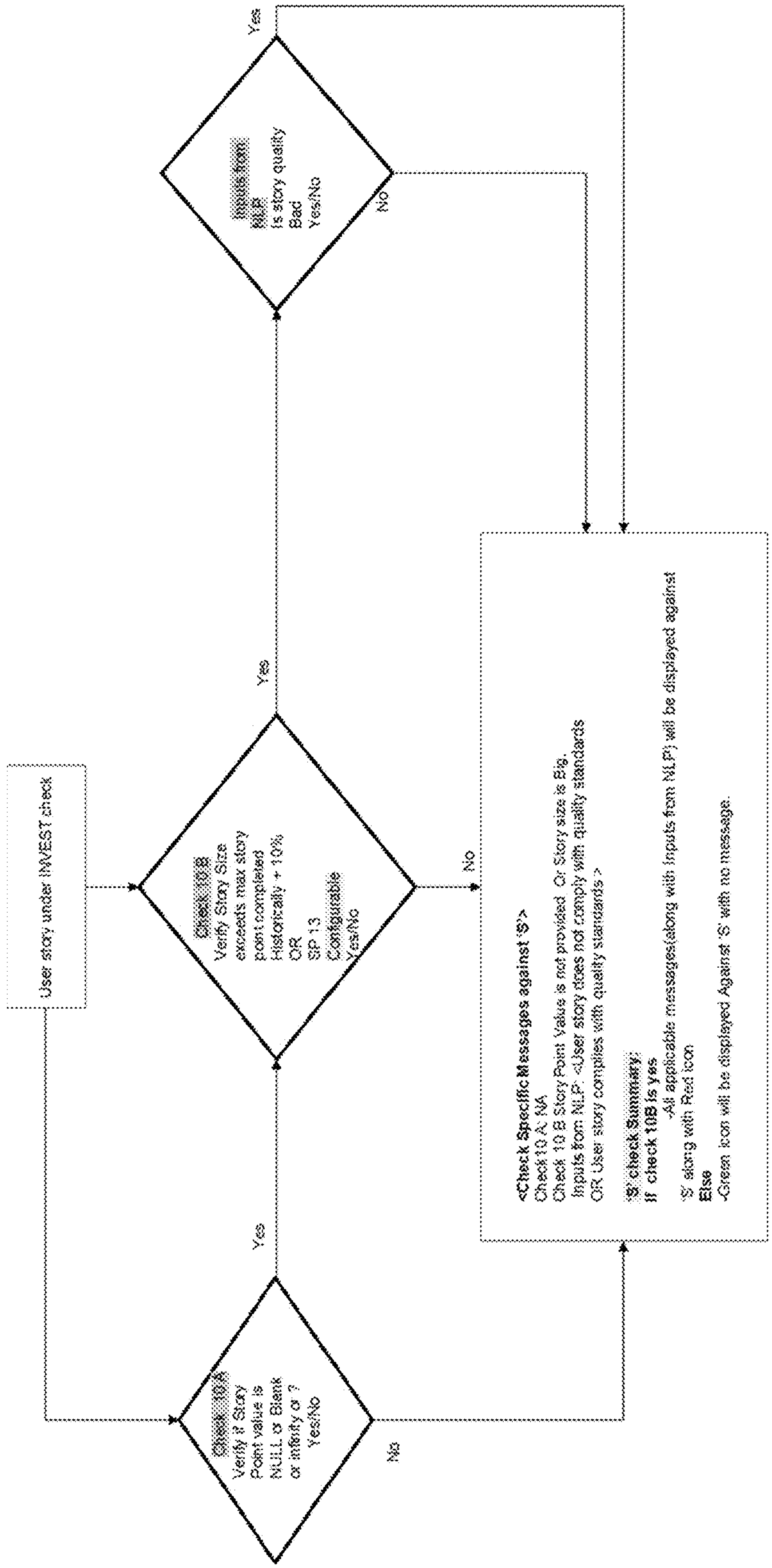
Figure 8N:
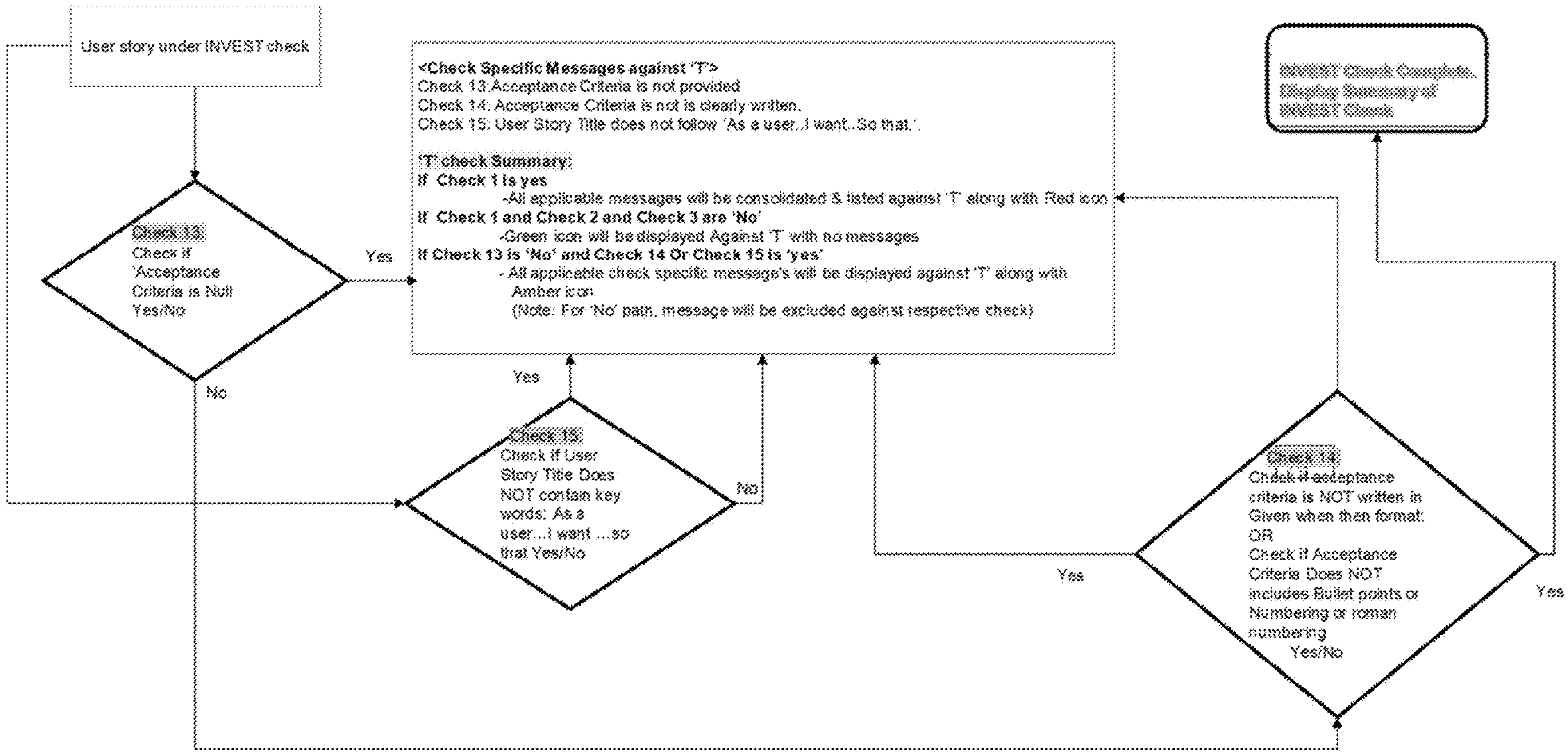

Referring to FIGS. 8I-8N, with respect to INVEST checking performed by the readiness assistant 134 as described above, FIGS. 8I-8N illustrate various INVEST checks performed by the readiness assistant 134. For example, FIG. 8I illustrates an INVEST check 1 to verify linkages in the ALM tool to check if there is any dependency on entities which are not Completed/Closed, with status Yes/No.

FIG. 8O illustrates checks, observations, and recommendations for INVEST checking by the readiness assistant, in accordance with an example of the present disclosure.

With respect the readiness assistant 134, the readiness assistant 134 may predict if a user story is dependent on another story. The readiness assistant 134 may use an artificial intelligence model that includes, for example, a bag of words model with linear support vector classifier (SVC). With respect to model processing and outcome, an objective of the model is to find whether there could be dependencies with respect to the list of uploaded stories. The model may use the keywords in story title and story description of the uploaded stories, and check for a similar story in the historical data to find dependencies with respect to uploaded ones. The model may predict a similar story from historical data for the list of uploaded stories, and determine dependencies. Attributes used by the readiness assistant 134 for training may include story description, story title, and story identification.

Referring again to FIG. 1, the story viability predictor 142 that is executed by at least one hardware processor (e.g., the hardware processor 1302 of FIG. 13, and/or the hardware processor 1504 of FIG. 15) may provide for determination of estimated hours (or another specified time duration) needed for completion of a given user story based, for example, on similar previous user stories. Further, the story viability predictor 142 may determine if a given story would be viable for an iteration based on a schedule overrun. In this regard, the story viability predictor 142 may utilize artificial intelligence and machine learning to plan sprints by providing effort estimates and schedule liability. The story viability predictor 142 may implement self learning based on past and current information continuously to help predict schedule related risks up front.

The story viability predictor 142 may expedite iteration planning and determine the viability of an iteration by correlating the iteration across multiple dimensions such as priority, estimates, velocity, social feeds, impacted users etc. In this regard, FIGS. 9A-9H illustrate examples of story viability determination in accordance with an example of the present disclosure.

Figure 9A:
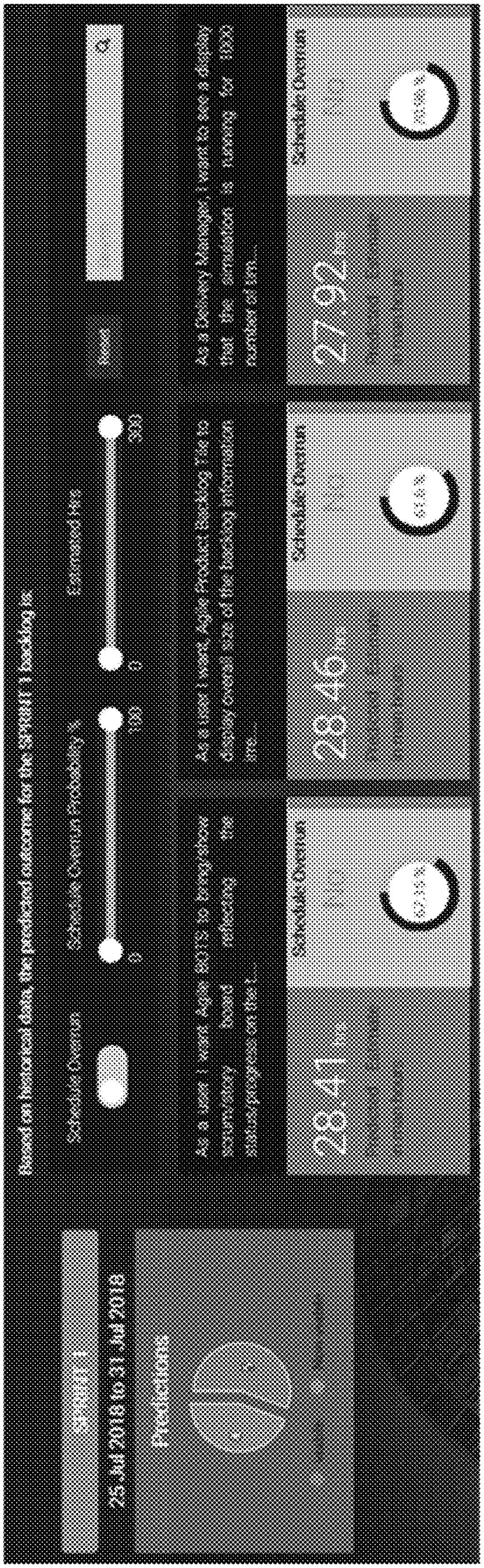
FIGS. 9A-9H illustrate examples of story viability determination in accordance with an example of the present disclosure.

FIG. 9A illustrates a dashboard which displays each story scoped in the sprint, the confidence score % of whether schedule overrun occurs, and predicted task hours for the story.

Figure 9B:
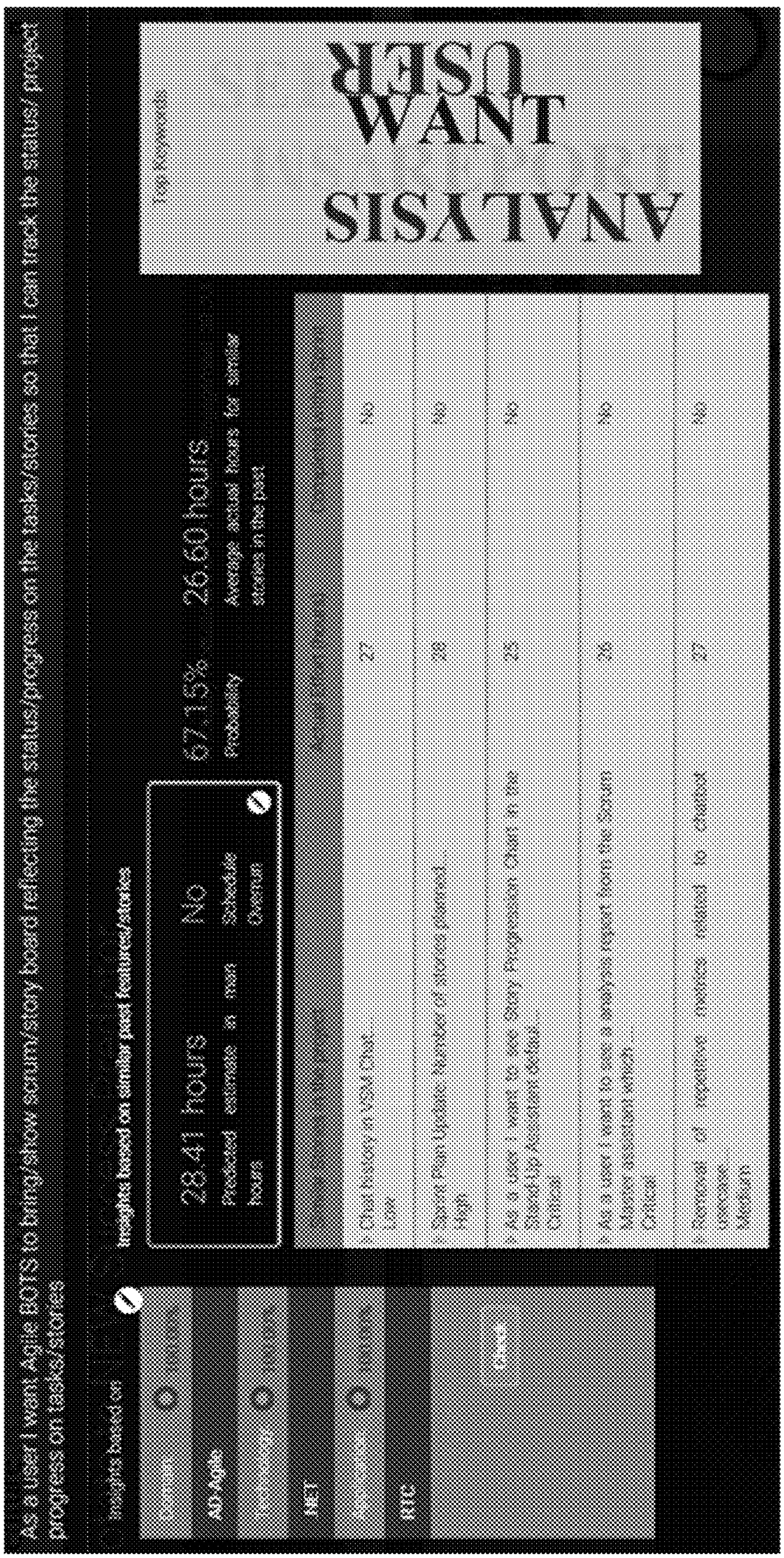

FIG. 9B illustrates a dashboard that displays the history data used to determine the schedule overrun and predicted task hours.

Figure 9C:
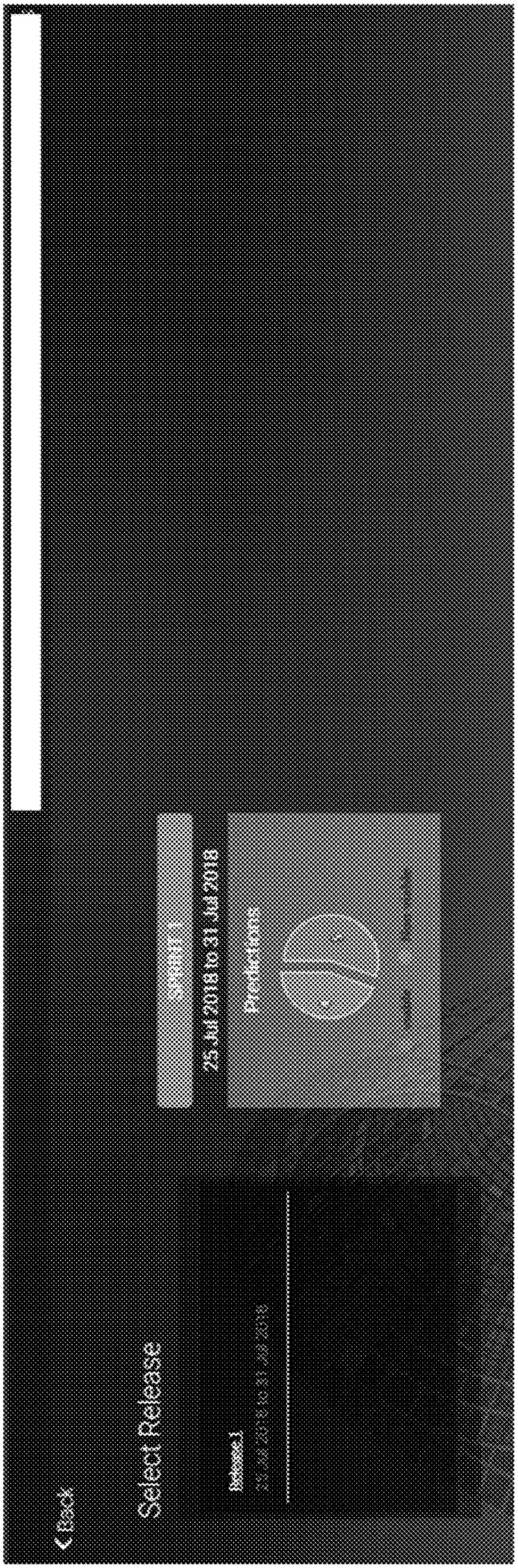

FIG. 9C illustrates a dashboard that displays the sprint and predictions for the viable and nonviable stories in the sprint.

Figure 9D:
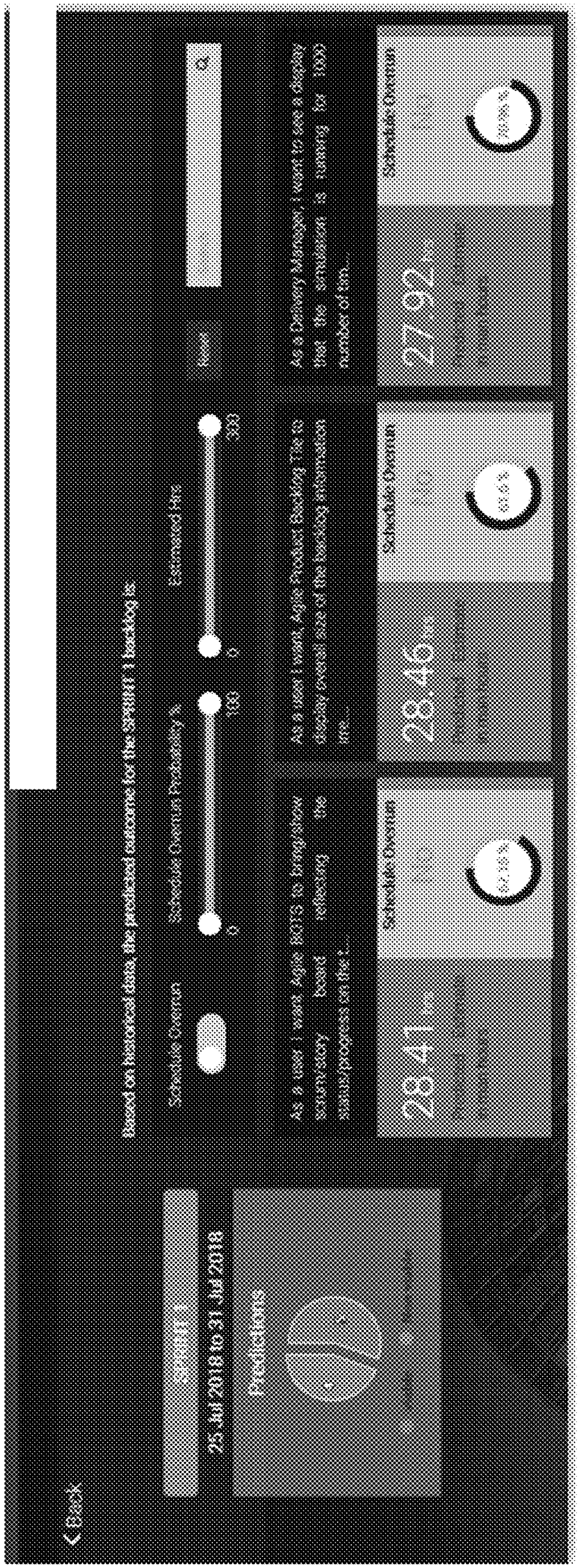
Figure 9E:
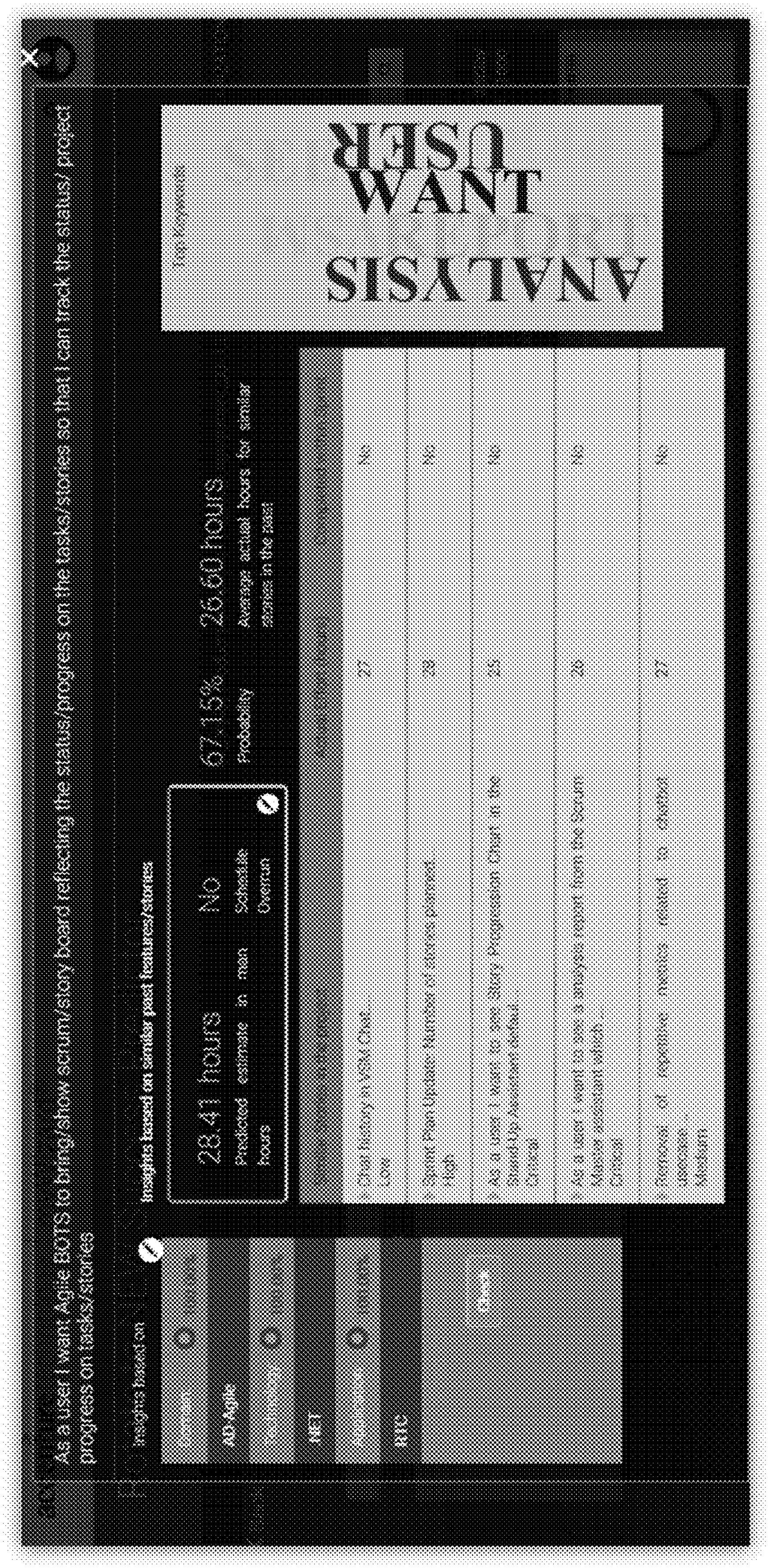

FIGS. 9D and 9B illustrate similar information as FIG. 9A.

Figure 9F:
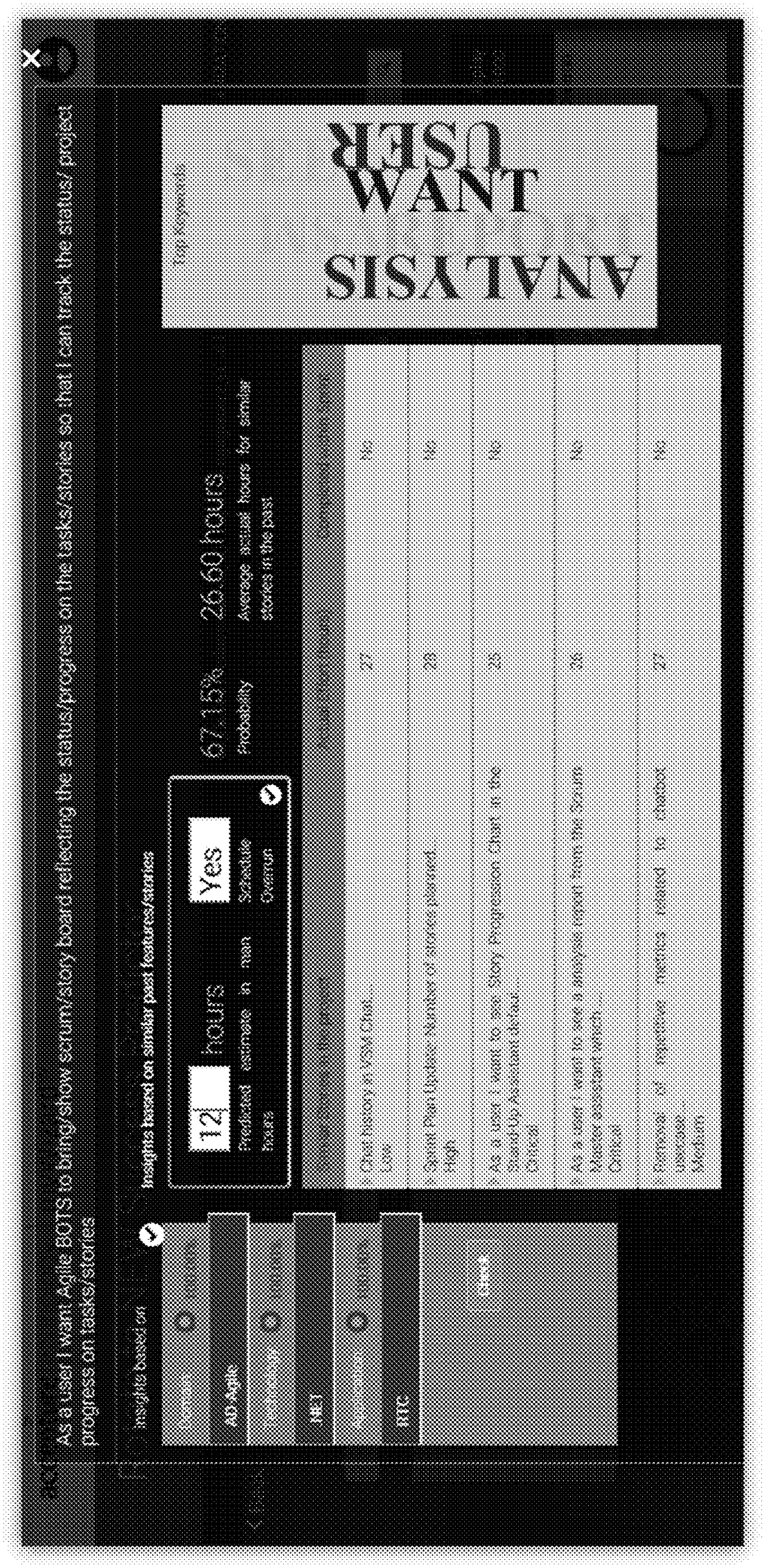

FIG. 9F illustrates editing of the predicted hours.

Figure 9G:
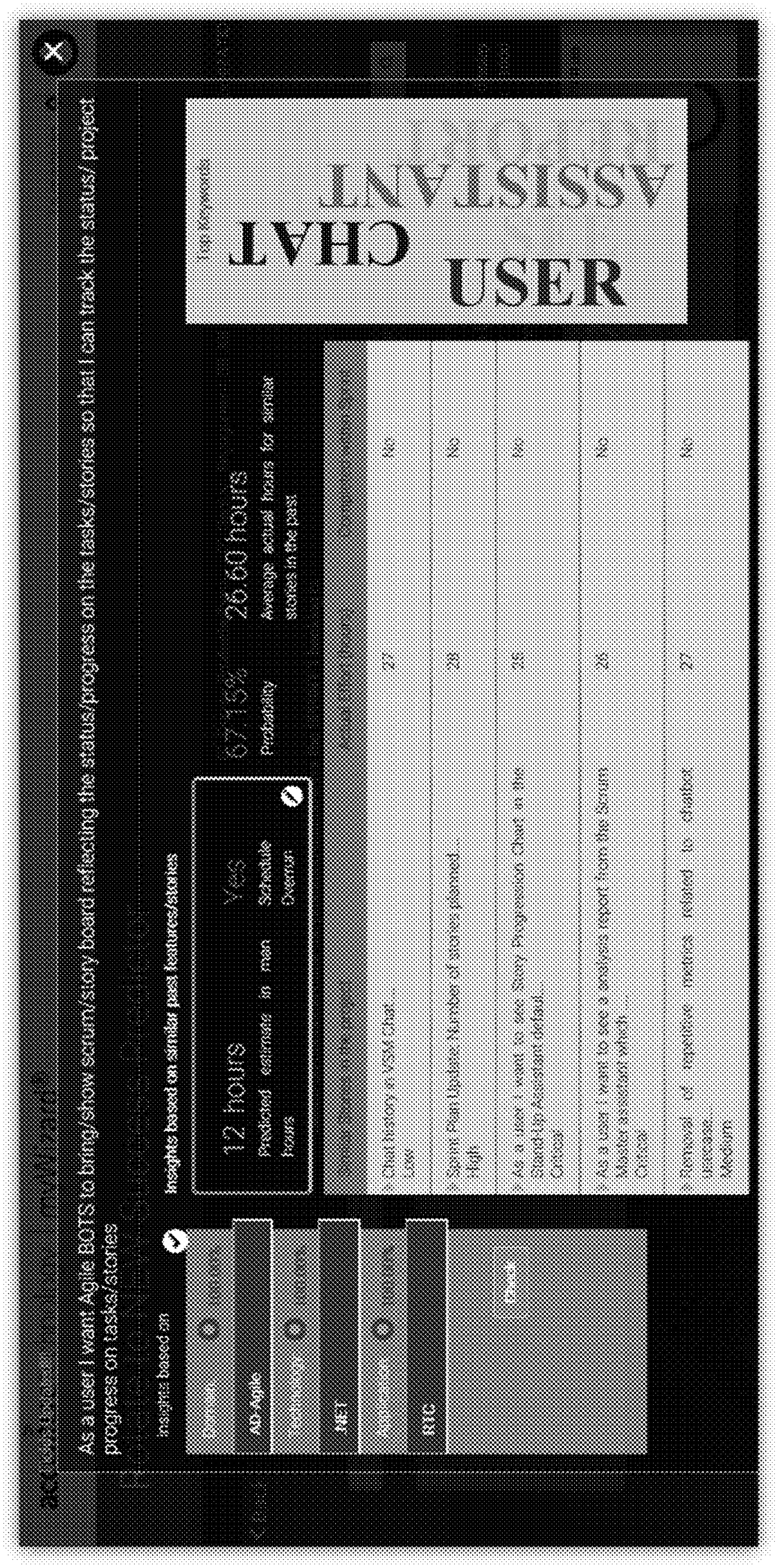

FIG. 9G illustrates checking of the schedule overrun real time.

Figure 9H:
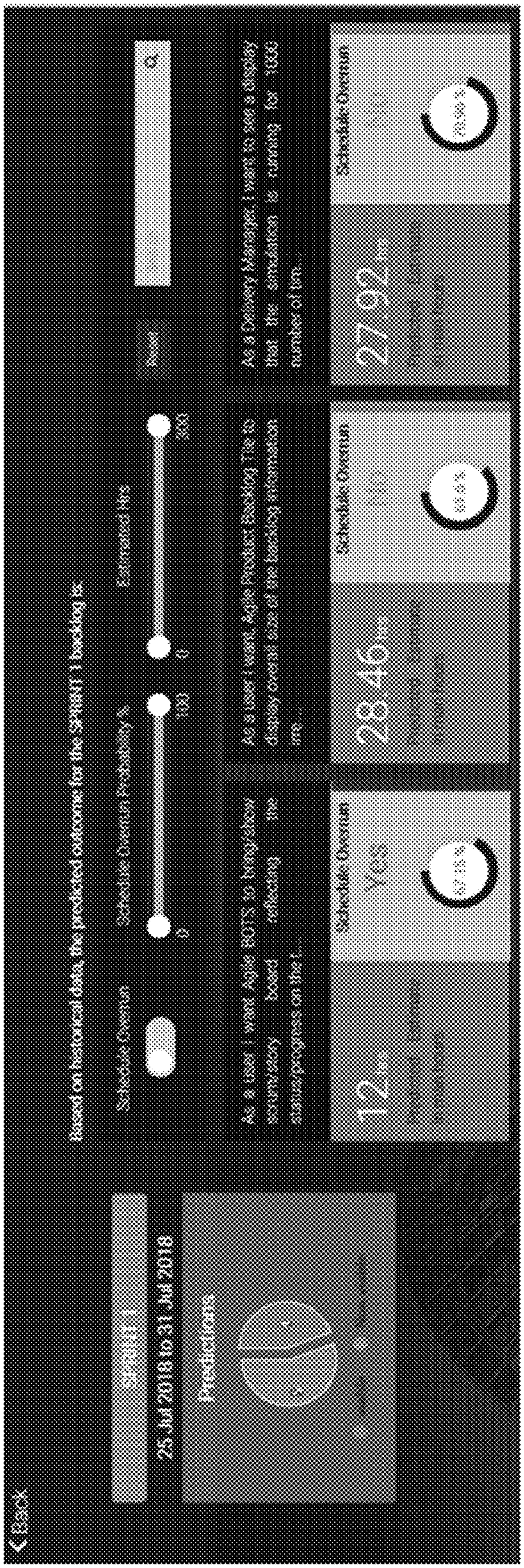

FIG. 9H illustrates predictions based on the edit that occurred in FIG. 9F.

The story viability predictor 142 may proactively determine the viability of a current set of stories within an iteration or release. The story viability predictor 142 may show related stories in the past, and associated interaction, for example, with a project manager to gain additional insights and lessons learnt. The story viability predictor 142 may direct a Scrum master to problem areas that require action to be taken to return the iteration/release to an operational condition.

Figure 9I:
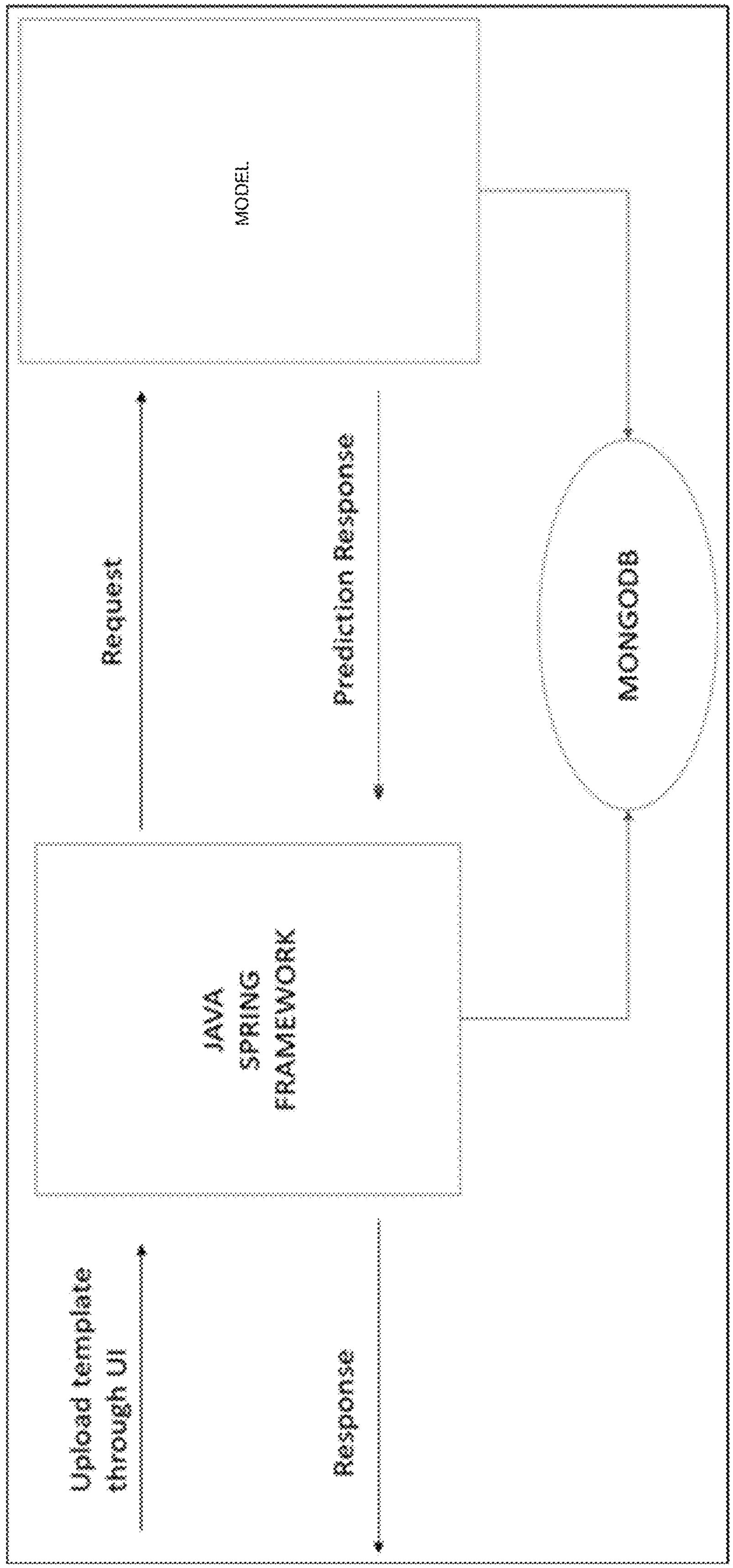
FIG. 9I illustrates a technical architecture of a story viability predictor in accordance with an example of the present disclosure.

FIG. 9I illustrates a technical architecture of the story viability predictor 142 in accordance with an example of the present disclosure.

Referring to FIG. 9I, the technical architecture of the story viability predictor 142 may utilize a Naive Bayes classifier for training the associated model with the mapping file that contains a story description tagged to a technology, domain, and application. Alternatively or additionally, the story viability predictor 142 may utilize a deep neural network (DNN) classifier for training the associated model with respect to the input features and output column as schedule overrun. Alternatively or additionally, the story viability predictor 142 may utilize a DNN regressor for training the associated model with respect to the input features and output column as estimated hours. The aforementioned models may be utilized for subsequent predictions as disclosed herein.

Figure 9J:
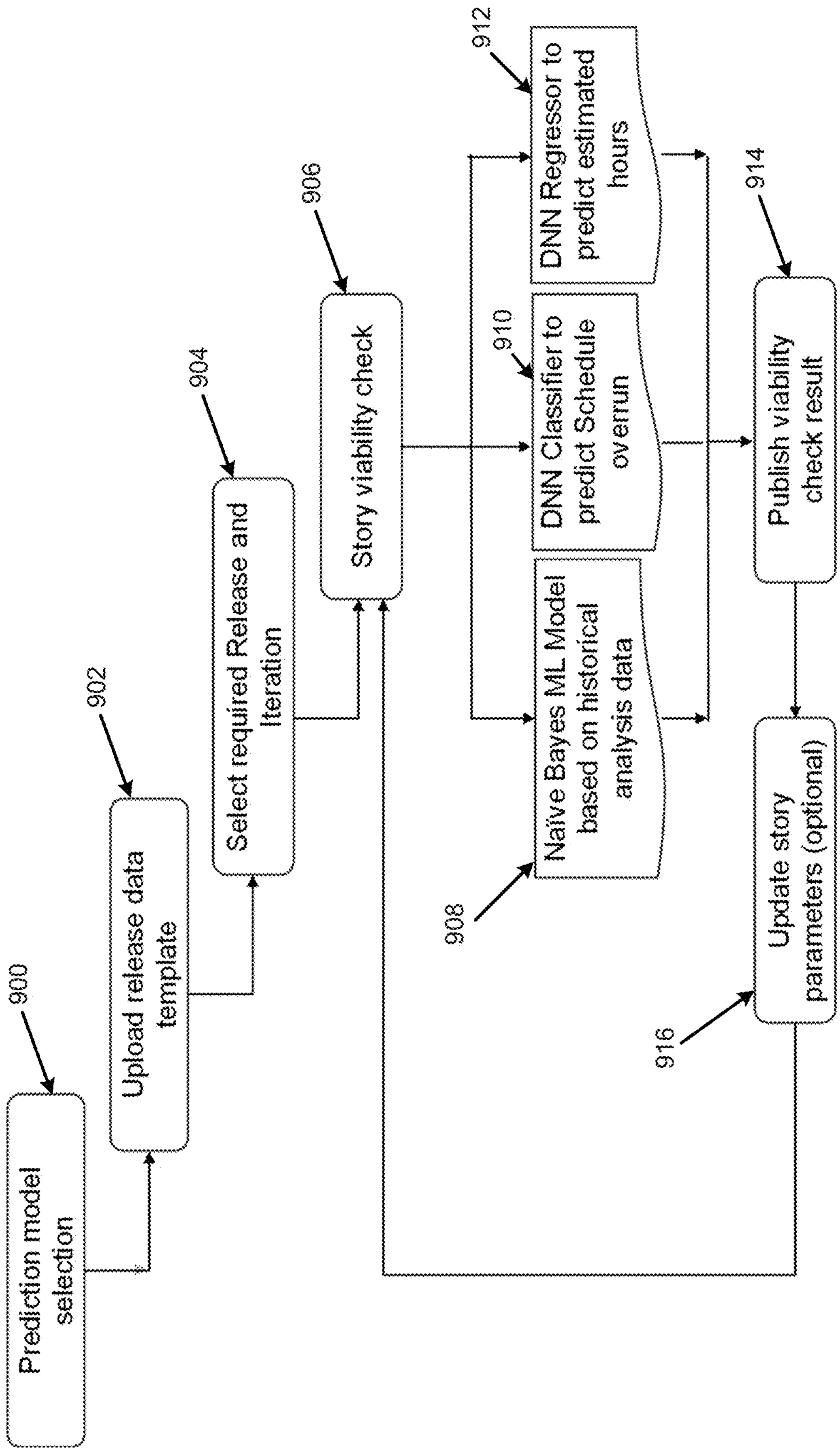
FIG. 9J illustrates a logical flowchart associated with the story viability predictor in accordance with an example of the present disclosure.

FIG. 9J illustrates a logical flowchart associated with the story viability predictor 142 in accordance with an example of the present disclosure.

With respect to the story viability predictor 142, the inquiry response performer 138 may ascertain user stories associated with a product development plan associated with the product, perform, on each of the ascertained user stories, a machine learning model-based analysis to determine a viability of a respective user story, and generate, for the product development plan, a viability assessment of each of the ascertained user stories. In this regard, the product development controller 144 may control, based on the generated viability assessment, development of the product based on the invocation of the determined retrospective assistant 114, the iteration planning assistant 116, the daily meeting assistant 118, the backlog grooming assistant 120, the report performance assistant 122, the release planning assistant 124, the iteration review assistant 126, the defect management assistant 128, the impediment management assistant 130, the demo assistant 132, the readiness assistant 134, and/or the story viability predictor 142.

Thus, referring to FIG. 9J, at block 900, the story viability predictor 142 may select a prediction model, where the prediction model may be based on a generic model, or a project model.

At block 902, the story viability predictor 142 may upload a release data template that may include, for example, release request details, iteration request details, user stories request details, etc. The story viability predictor 142 may require stories assigned to a sprint and story attributes such as title, description, size, priority, dependency and change in iteration.

At block 904, the story viability predictor 142 may select the required release and iteration, for example for the uploaded data, where the story viability predictor 142 may select release and iteration for which viability is required to be checked.

At block 906, the story viability predictor 142 may perform a story viability check.

At block 908, the story viability predictor 142 may utilize the Naïve Bayes machine learning model based on historical analysis data.

At block 910, the story viability predictor 142 may utilize the DNN classifier to predict schedule overrun.

At block 912, the story viability predictor 142 may utilize the DNN regressor to predict estimated hours.

At block 914, the story viability predictor 142 may published viability check results, where output values may include a determination of schedule overrun (e.g., yes/no), and/or estimated hours.

At block 916, the story viability predictor 142 may update story parameters such as domain, technology, application, hours, schedule overrun, etc.

With respect to the assistants disclosed herein, in addition to usage of the user inquiry analyzer 102, the user attribute analyzer 108, and/or the inquiry response performer 138 to locate the appropriate assistant, the apparatus 100 may also provide a user with the option to directly invoke an assistant of choice.

The story viability predictor 142 may thus determine the estimated hours required for completion of a given story (requirement) based on similar stories in the past. The story viability predictor 142 may determine if a given story would be viable for a sprint based on the schedule overrun. A JAVA user interface component of the story viability predictor 142 may call the machine learning algorithms with the story details and retrieve the estimated hours and schedule overrun values, and display the values for the user 106.

The machine learning models used for the story viability predictor 142 may include a naïve bayes classifier that may be used for training the model with the mapping file that contains story description tagged to a technology, domain, and application. A deep neural network classifier may be used for training the model with respect to the input features and output column as schedule overrun, and used for later prediction. A deep neural network regressor may be used for training the model with respect to the input features and output column as estimated hours, and used for later prediction.

The machine learning models may be trained using two files provided by the client, the mapping file and training file.

FIG. 9K illustrates a sample mappingfile.csv file for the story viability predictor 142, in accordance with an example of the present disclosure.

Referring to FIG. 9K, the mapping file may include a subset of stories from the training file mapped to its technology, domain, and application. The naïve bayes classifier may be used for training the mapping file. Once the naïve bayes model is trained, this model may classify a story to its respective technology, domain, and application based on the wordings in the story.

FIG. 9L illustrates a sample trainingfile.csv file for the story viability predictor 142, in accordance with an example of the present disclosure.

Referring to FIG. 9L, once the naïve bayes training is completed, the naïve bayes model may be executed on the stories present in the training file to classify them into respective technology, and domain. The other input features story point, story type, sprint duration, dependency and sprint jump may also be selected from the training file along with the output labels estimated hours and schedule overrun for training a deep neural network regressor and a deep neural network classifier.

The deep neural network regressor may be used for training the model for predicting the estimated hours. The input features for the deep neural network regressor used may include technology, domain, application, story point, story type, sprint duration, dependency and sprint jump.

The deep neural network classifier may be used for training the model for predicting the schedule overrun. The inputs for the deep neural network classifier may be the same as deep neural network regressor, domain, application, story point, story type, sprint duration, dependency and sprint jump.

Figure 2D:
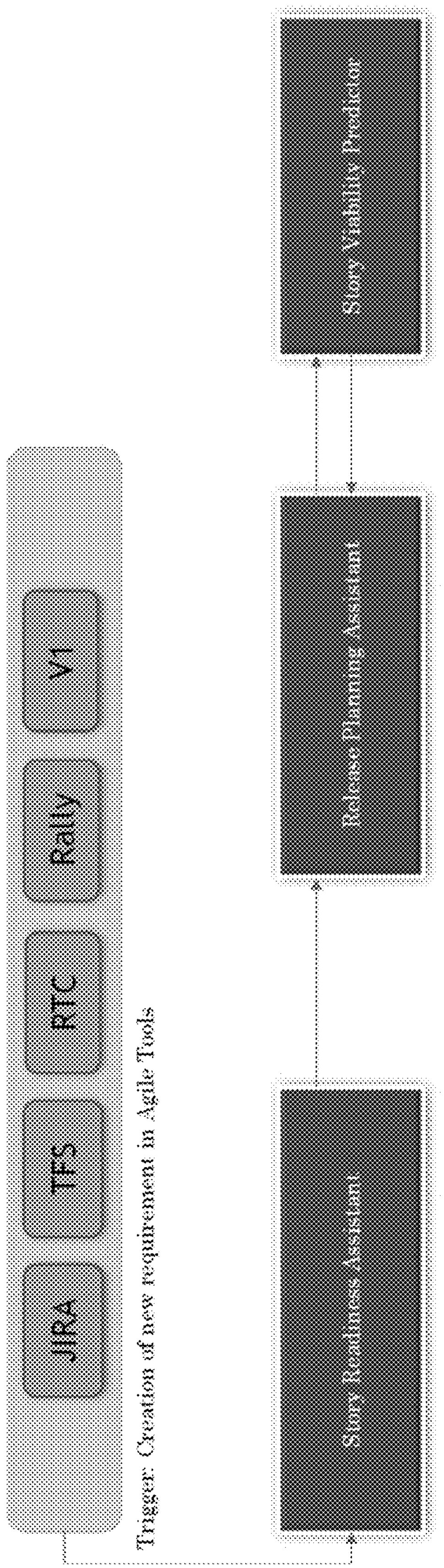
FIG. 2D illustrates details of the components of the apparatus of FIG. 1 for an automation use case in accordance with an example of the present disclosure.

FIG. 2D illustrates details of the components of the apparatus of FIG. 1 for an automation use case in accordance with an example of the present disclosure.

Referring to FIG. 2D, a trigger for the automation use case may include creation of new requirement in agile tools.

For the automation use case, tasks performed the readiness assistant 134 (e.g., the story readiness assistant) may include determining a requirement readiness quotient in the form of automated INVEST check, preparing a list of advises for user following which story readiness quotient can be increased, and alerting a team once the analysis is complete. Further, actions performed by user may include working on the recommendations provided by the readiness assistant 134 and performing recheck.

Interaction between the readiness assistant 134 to the release planning assistant 124 may include movement of requirements which have successfully passed through 'story readiness' checks.

For the automation use case, tasks performed by release planning assistant 124 may include identifying priority and urgency of every incoming requirement by determining its rank based on the weighted shorted job first (WSJF) technique.

Figure 2E:
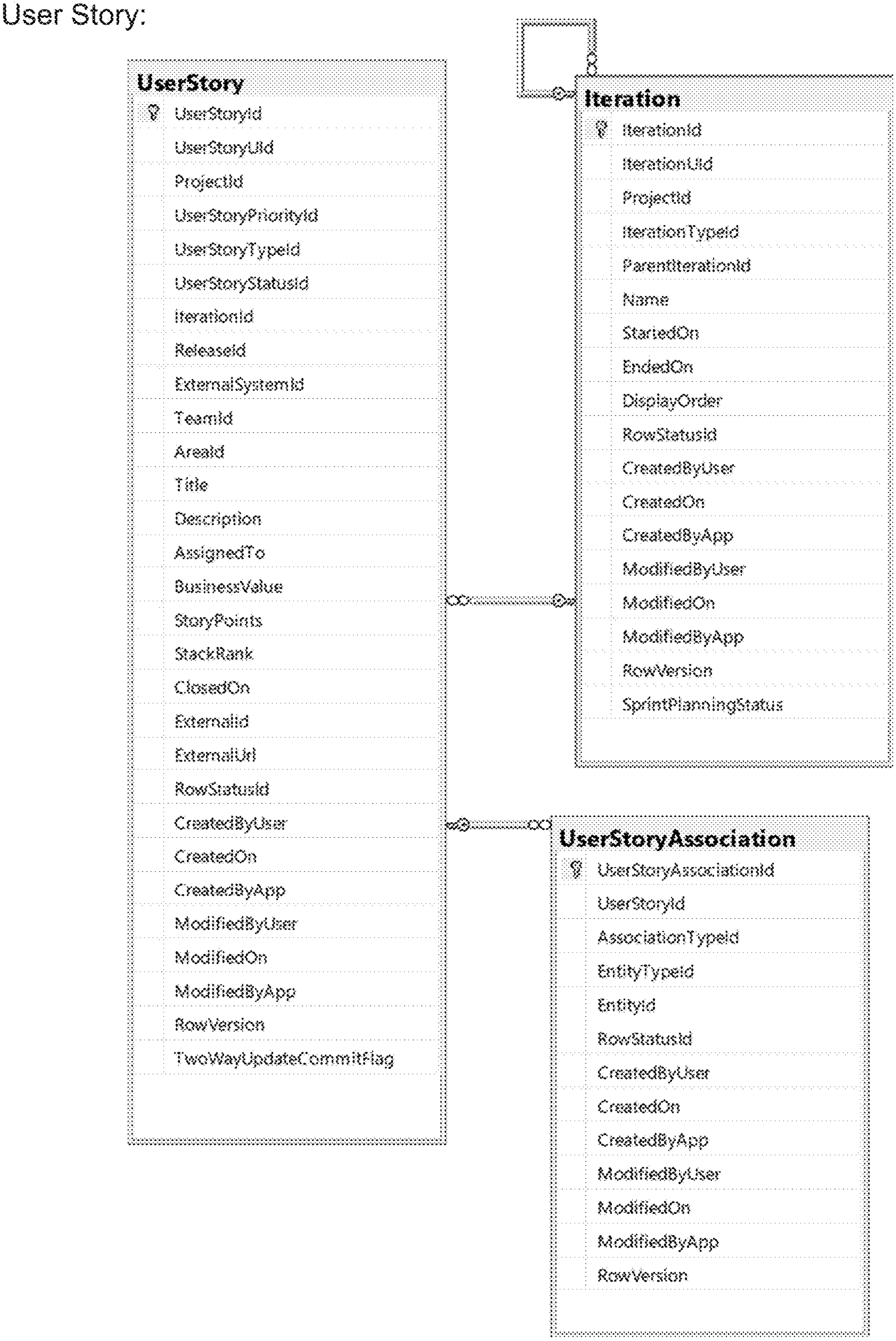
FIGS. 2E and 2F illustrate examples of entity details and relationships of the apparatus of FIG. 1 in accordance with an example of the present disclosure.
Figure 2F:
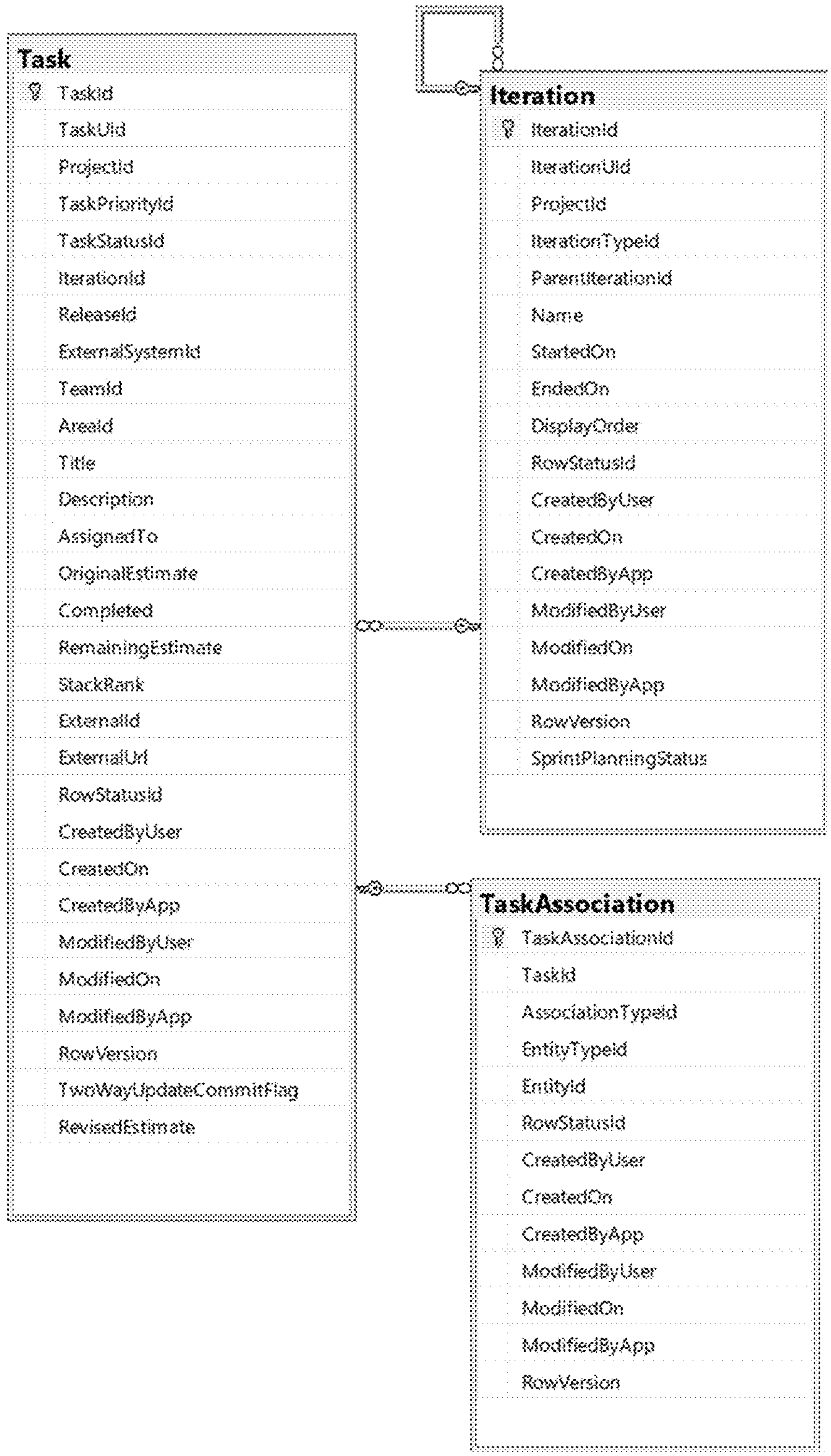
Figure 10:
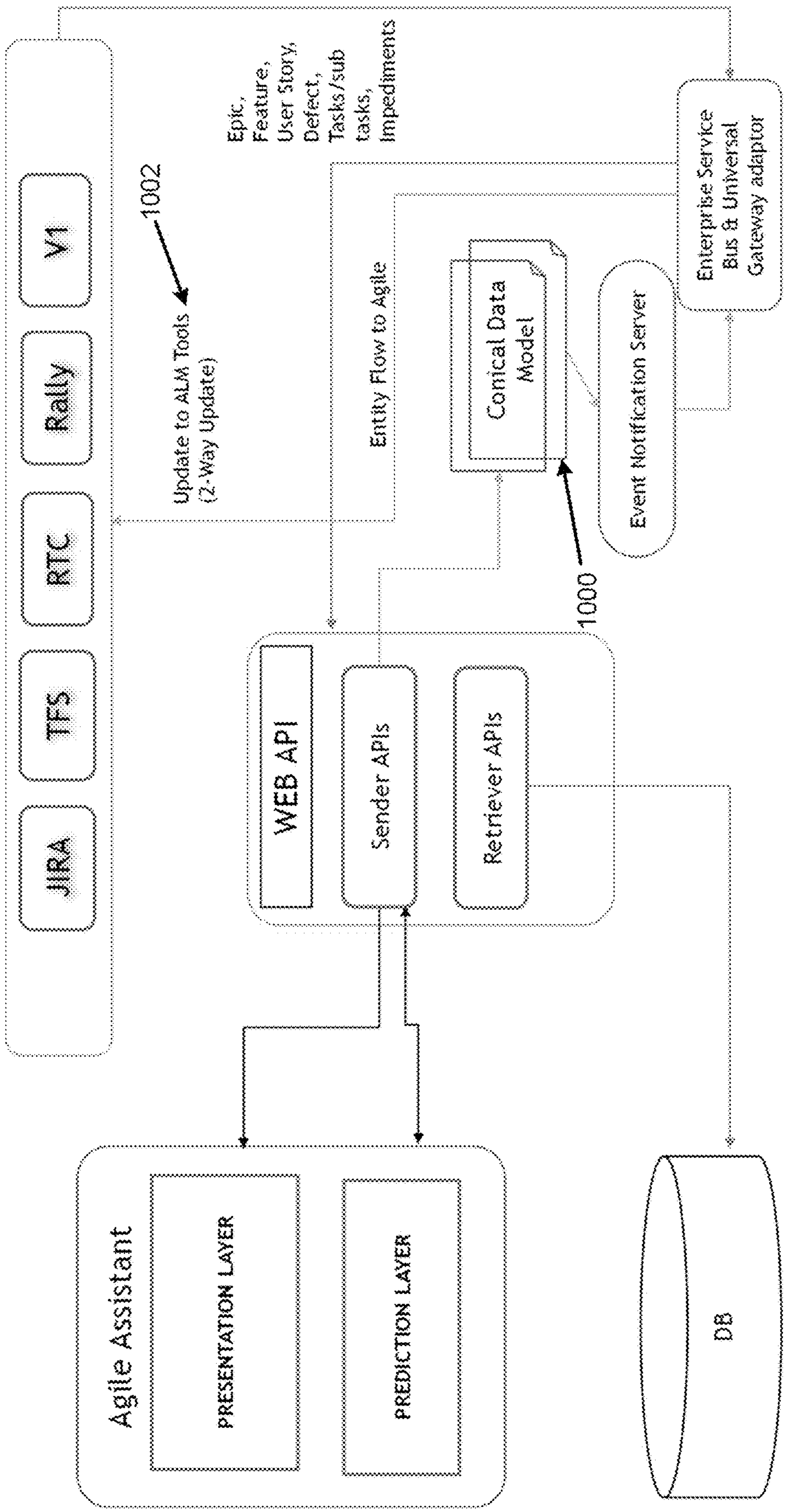
FIG. 10 illustrates a technical architecture of the artificial intelligence and machine learning based product development apparatus of FIG. 1 in accordance with an example of the present disclosure.

FIGS. 2E and 2F illustrate examples of entity details and relationships of the apparatus of FIG. 1 in accordance with an example of the present disclosure;

FIG. 10 illustrates a technical architecture of apparatus 100 in accordance with an example of the present disclosure.

Referring to FIG. 10, the conical data model 1000 may be implemented, based, for example, on JIRA™, Team Foundation Server (TFS), Rational Team Concert (RTC), etc. At 1002, any updated fields (e.g., story, defect, etc.) may be updated to the appropriated Application lifecycle management (ALM) tool. The presentation layer may be implemented by using, for example, ASP.NET™ 4.5, ANGULAR.JS™, a Structured Query Language (SQL) server, HIGHCHART™, Web API, C#, etc. The prediction layer may be implemented by using, for example, R.NET, etc. The WEB Application Programming Interface (API) may be implemented by using, for example, ASP.NET 4.5, C#, etc.

Figure 11:
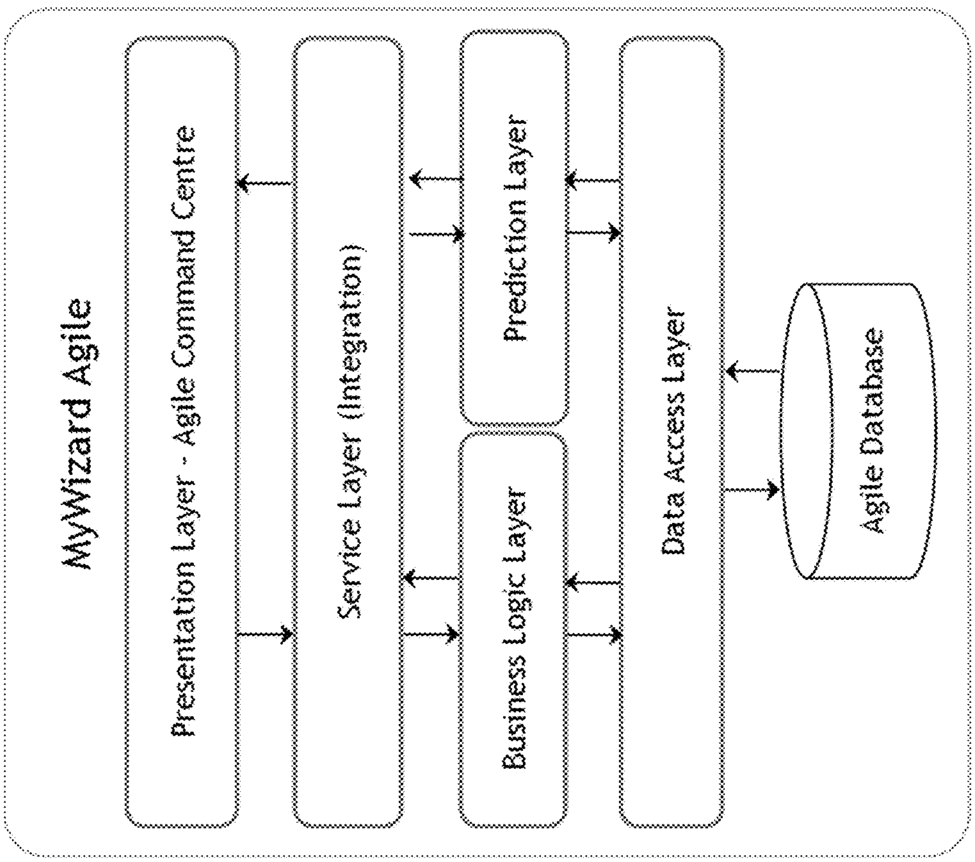
FIG. 11 illustrates an application architecture of the artificial intelligence and machine learning based product development apparatus of FIG. 1 in accordance with an example of the present disclosure.

FIG. 11 illustrates an application architecture of apparatus 100 in accordance with an example of the present disclosure.

Referring to FIG. 11, the application architecture may represent various layers that may be used to develop the apparatus 100. The presentation layer may represent the agile command center, and may be implemented by using, for example, Angular JS, .NET Framework, HyperText Markup Language (HTML), Cascading Style Sheets (CSS), etc. The service layer may provide for integration of the different functionalities of the apparatus 100, and may be implemented by using, for example, Web API, .NET Framework, C#, etc. The business logic layer may be implemented by using, for example, .NET Framework, C#, Enterprise Library, etc. The prediction layer may be implemented by using, for example, R.NET, etc. The data access layer may be implemented by using, for example, .NET Framework, C#, Language-Integrated Query (LINQ), Entity Framework, etc. The agile database may be implemented by using, for example, a SQL server.

Figure 12:
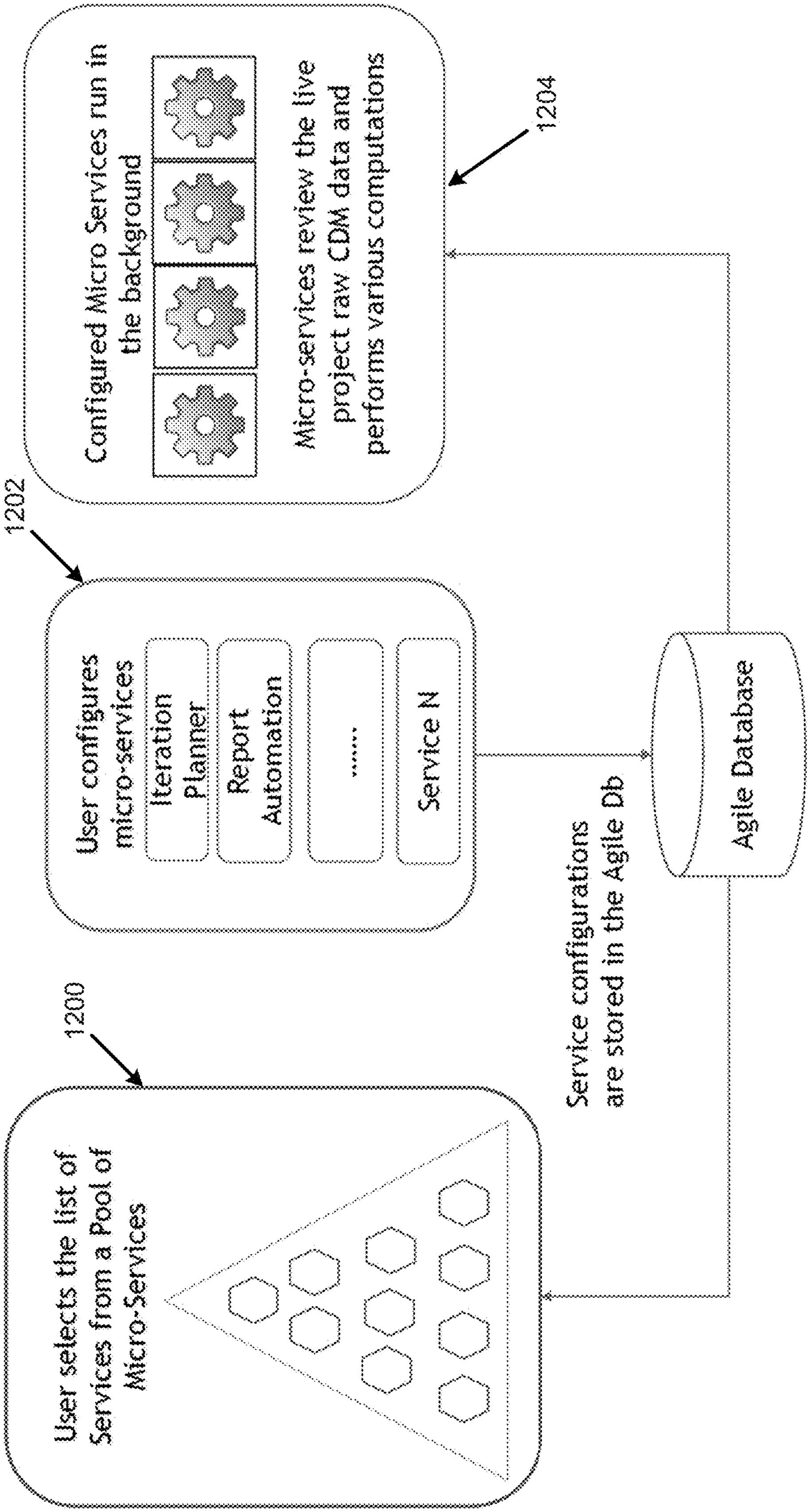
FIG. 12 illustrates a micro-services architecture of an Agile Scrum assistant in accordance with an example of the present disclosure.

FIG. 12 illustrates a micro-services architecture of an Agile Scrum assistant in accordance with an example of the present disclosure.

Referring to FIG. 12, at 1200, the user 106 may select a list of services from a pool of micro-services. For example, the list of services may include the micro-services provided by the inquiry response generator 112. At 1202, the user 106 may configure the selected micro-services. At 1204, the configured micro-services may be executed in the background.

Referring again to FIGS. 1-12, an example of a scenario with respect to application of the apparatus 100 is described with respect to a Scrum Master.

For a Scrum Master, the example scenario may demonstrate how the apparatus 100 increases productivity of a Scrum Master.

At the outset, a prompt may be generated, via the apparatus 100, to the Scrum Master as "Hello, How can I help you today?"

The Scrum Master may respond as "I would like to perform Sprint Planning session for Sprint 1 of Release 1."

The apparatus 100 may generate a response as "To conduct Sprint Planning we would need prioritized backlog which can be obtained by invoking Backlog, Definition of Ready (DoR) & Definition of Done (DoD) assistants. Shall I go ahead and invoke the same?"

The Scrum Master may respond as "Yes, please."

The apparatus 100 may generate a response as "Thanks for your patience. We do have prioritized backlog now to start sprint planning using Sprint Planning Assistant. Let's get started?"

The Scrum Master may respond as "Yes, please."

The apparatus 100 may generate a response as "I have opened up iteration planning assistant for you in the background. You can proceed with sprint planning activities. I recommend you to use sub task creation feature to arrive at sprint backlog."

The Scrum Master may respond as "Thanks."

Referring again to FIGS. 1-12, an example of a scenario with respect to application of the apparatus 100 is described with respect to a product owner.

For a product owner, the example scenario may demonstrate how the apparatus 100 facilitates creation, management, monitoring, and auditing of backlog. That is, the apparatus 100 provides assistance to a product owner with respect to daily backlog management.

At the outset, a prompt may be generated, via the apparatus 100, to the product owner as "Hello, How can I help you today?"

The product owner may respond as "I would like some assistance to arrive at initial version of product backlog."

The apparatus 100 may generate a response as "Sure. Product backlog currently have epics. Shall I invoke backlog grooming assistant to create break down the epics into features and stories?"

The product owner may respond as "Yes, please."

The apparatus 100 may generate a response as "Thanks for your patience. Epics are broken down into features and stories now. I would suggest you to review the same."

The product owner may respond as "Ok."

The apparatus 100 may generate a response as "Dependency mapping for newly created stories can be completed using Backlog Grooming Assistant. Shall I invoke the same?"

The product owner may respond as "Yes."

The apparatus 100 may generate a response as "I have opened up dependency mapping feature along with Prioritized backlog in the background. Recommend you to utilize this feature to confirm story dependencies."

The product owner may respond as "Ok."

The apparatus 100 may generate a response as "I see that dependency mapping has been completed. We are now in good position to start release planning using Release Planning Assistant."

Referring again to FIGS. 1-12, an example of a scenario with respect to application of the apparatus 100 is described with respect to a delivery lead.

For a delivery lead, the example scenario may demonstrate how the apparatus 100 facilitates with the understanding of the current snapshot of project, release, and/or sprint, as well as with report generation.

At the outset, a prompt may be generated, via the apparatus 100, to the delivery lead as "Hello, How can I help you today?"

The delivery lead may respond as "How are my releases performing?"

The apparatus 100 may generate a response as "2 releases are on track, 1 release is behind schedule. Do you want me to fetch more details?"

The delivery lead may respond as "No."

The apparatus 100 may generate a response as "Ok, I have few more details. There are 2 sprints ending this week. There can be changes in our release performance metrics in this week's report."

The delivery lead may respond as "Ok. How are my current sprints performing?"

The apparatus 100 may generate a response as "2 sprints are on track. 1 sprint is behind schedule."

The delivery lead may respond as "Ok. Can I have a report?"

The apparatus 100 may generate a response as "Yes. I found Story Progression Report, Sprint Progression Report and Weekly status Report within Report Performance Assistant. In which report you are interested in?"

The delivery lead may respond as "Weekly Status Report."

The apparatus 100 may generate a response as "Thanks. I have delivered it to your mailbox. Alternately you can download copy of it from "here"."

Figure 13:
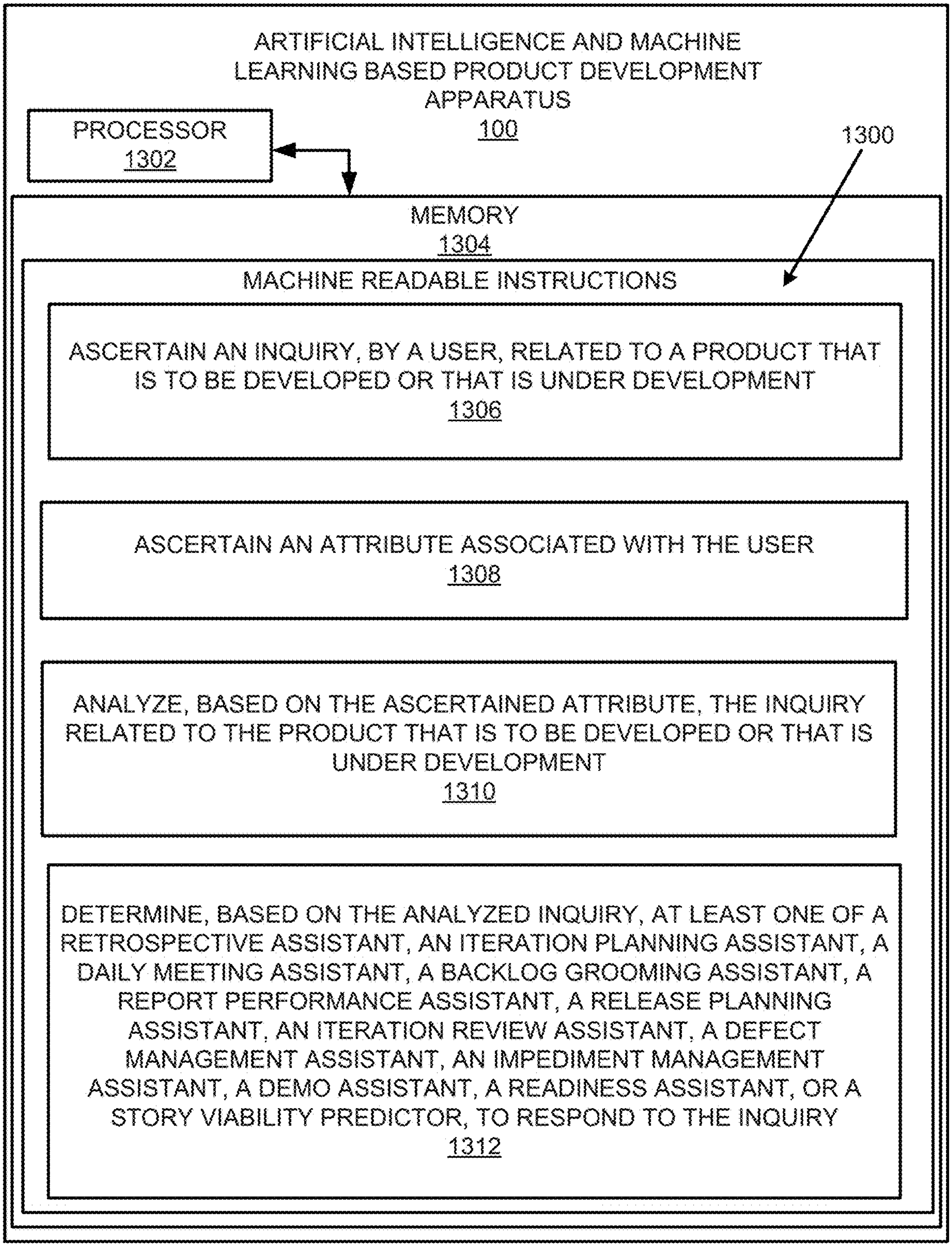
FIG. 13 illustrates an example block diagram for artificial intelligence and machine learning based product development in accordance with an example of the present disclosure.
Figure 13:
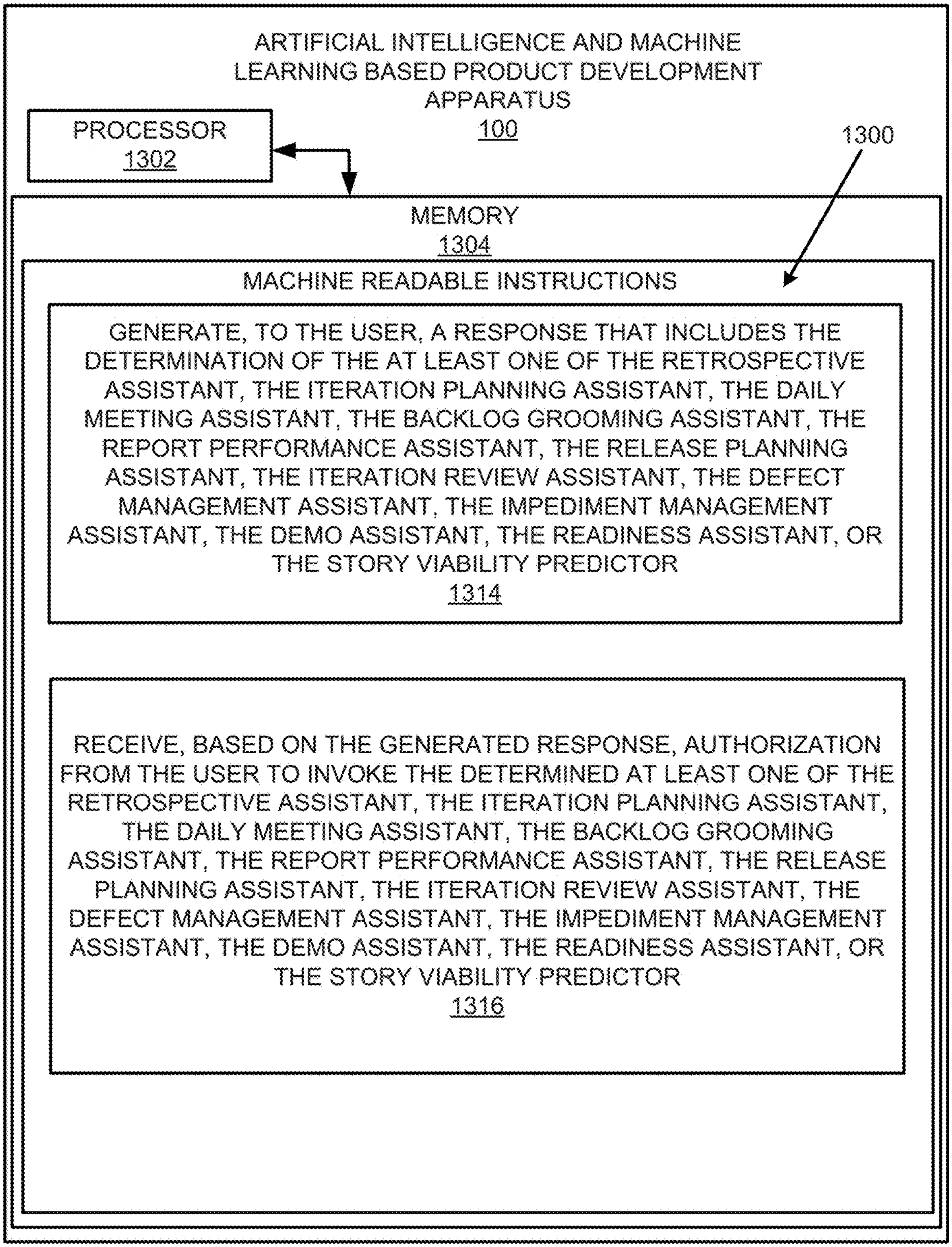
Figure 13:
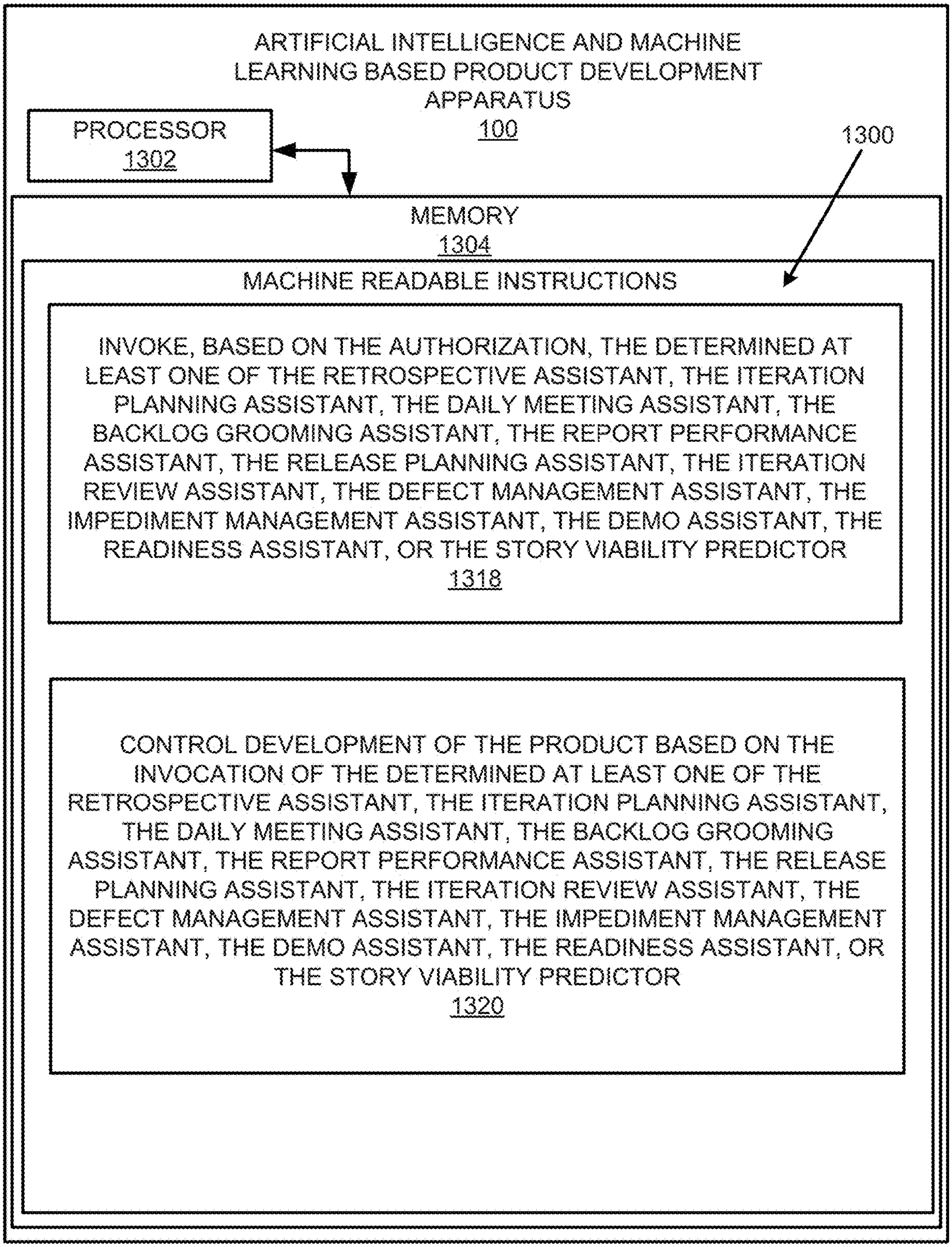
Figure 14:
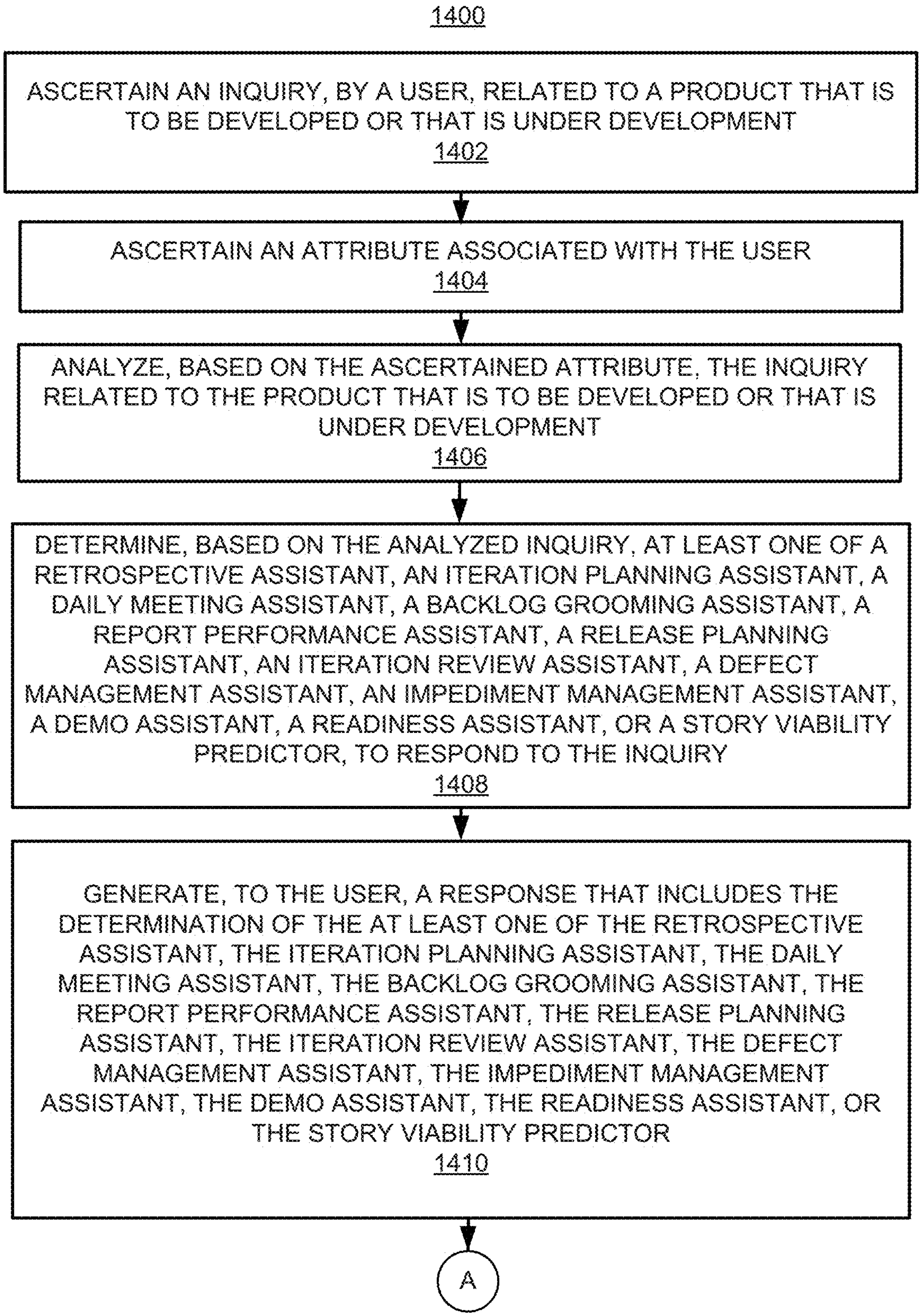
FIG. 14 illustrates a flowchart of an example method for artificial intelligence and machine learning based product development in accordance with an example of the present disclosure.
Figure 14:
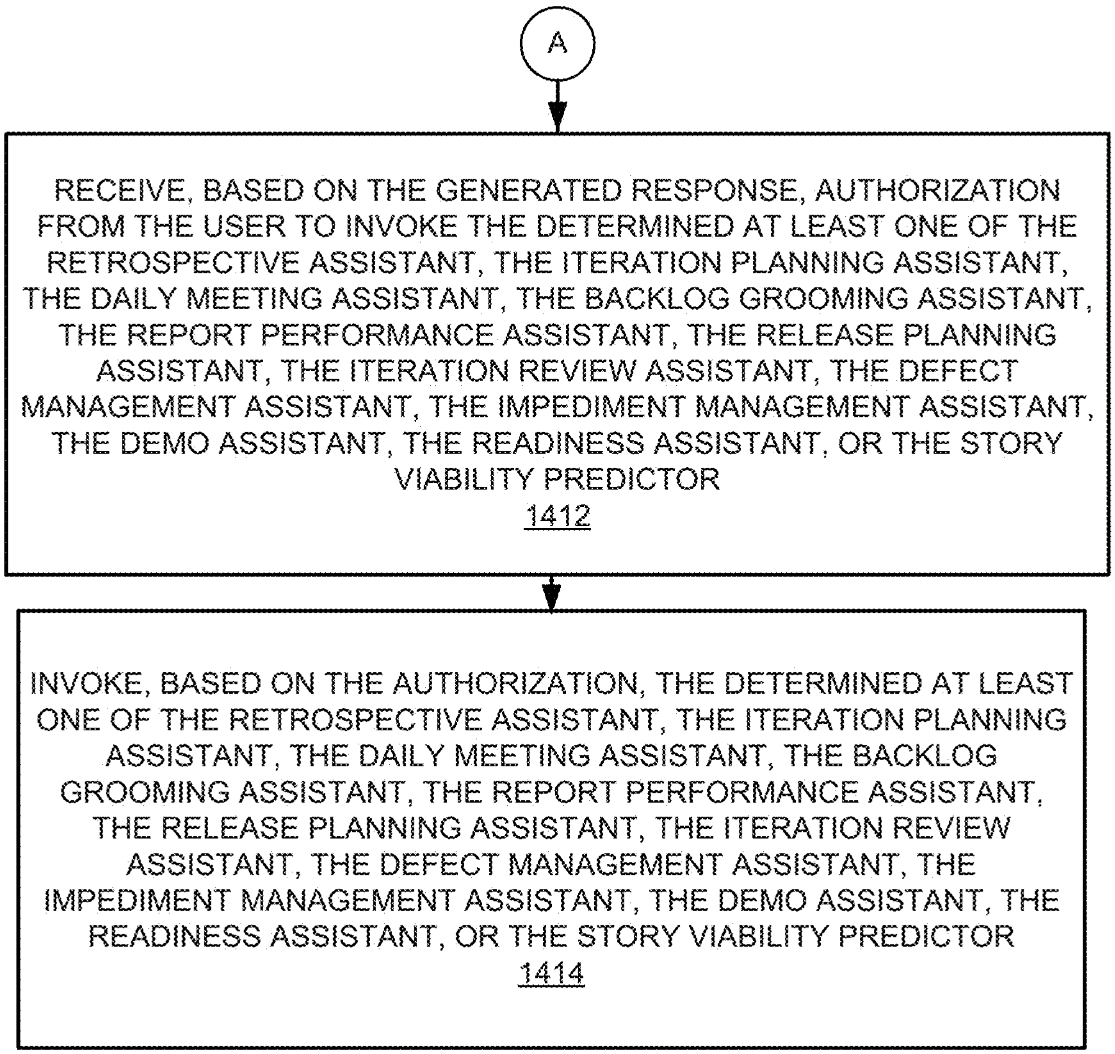
Figure 15:
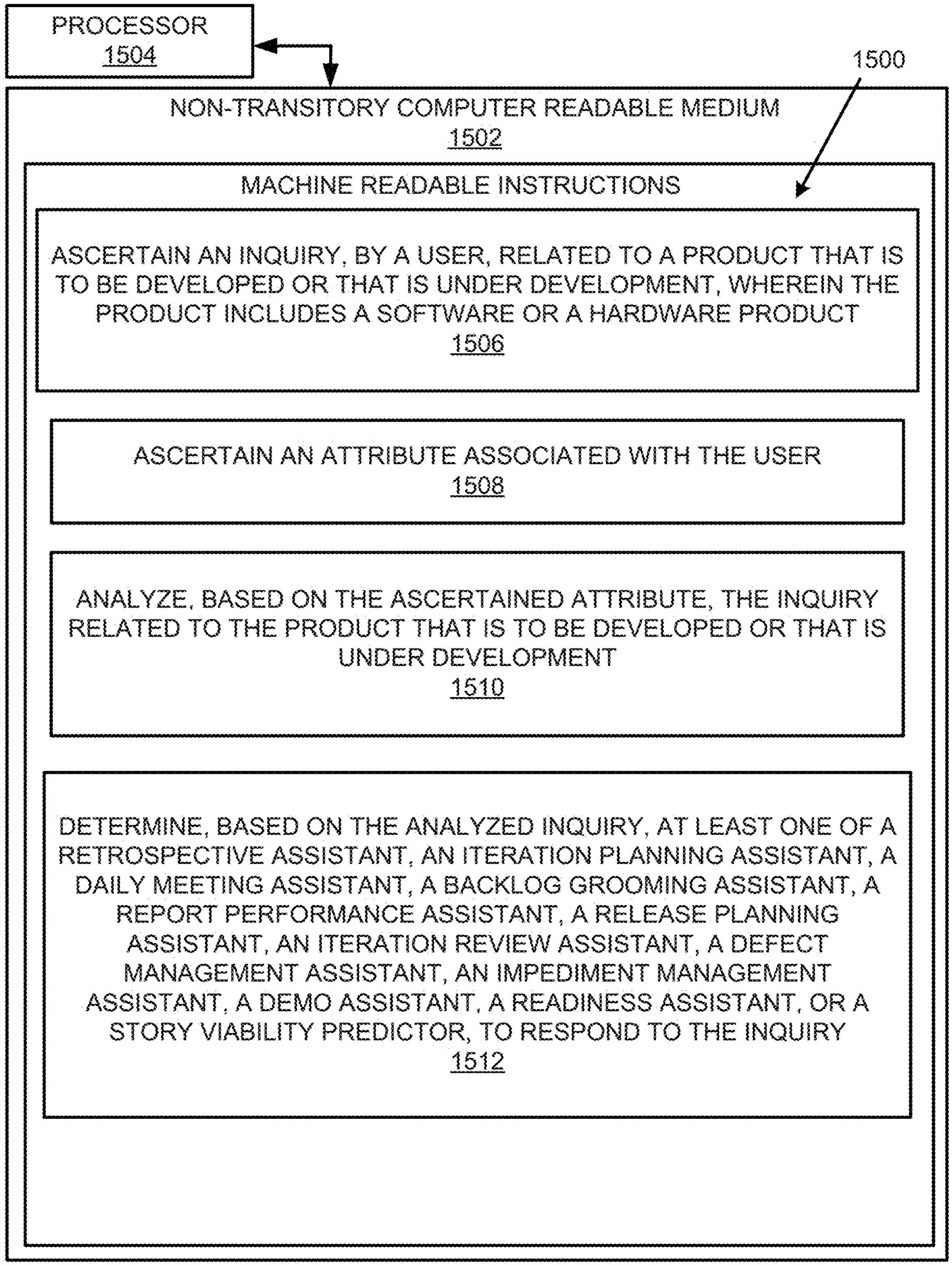
FIG. 15 illustrates a further example block diagram for artificial intelligence and machine learning based product development in accordance with another example of the present disclosure.
Figure 15:
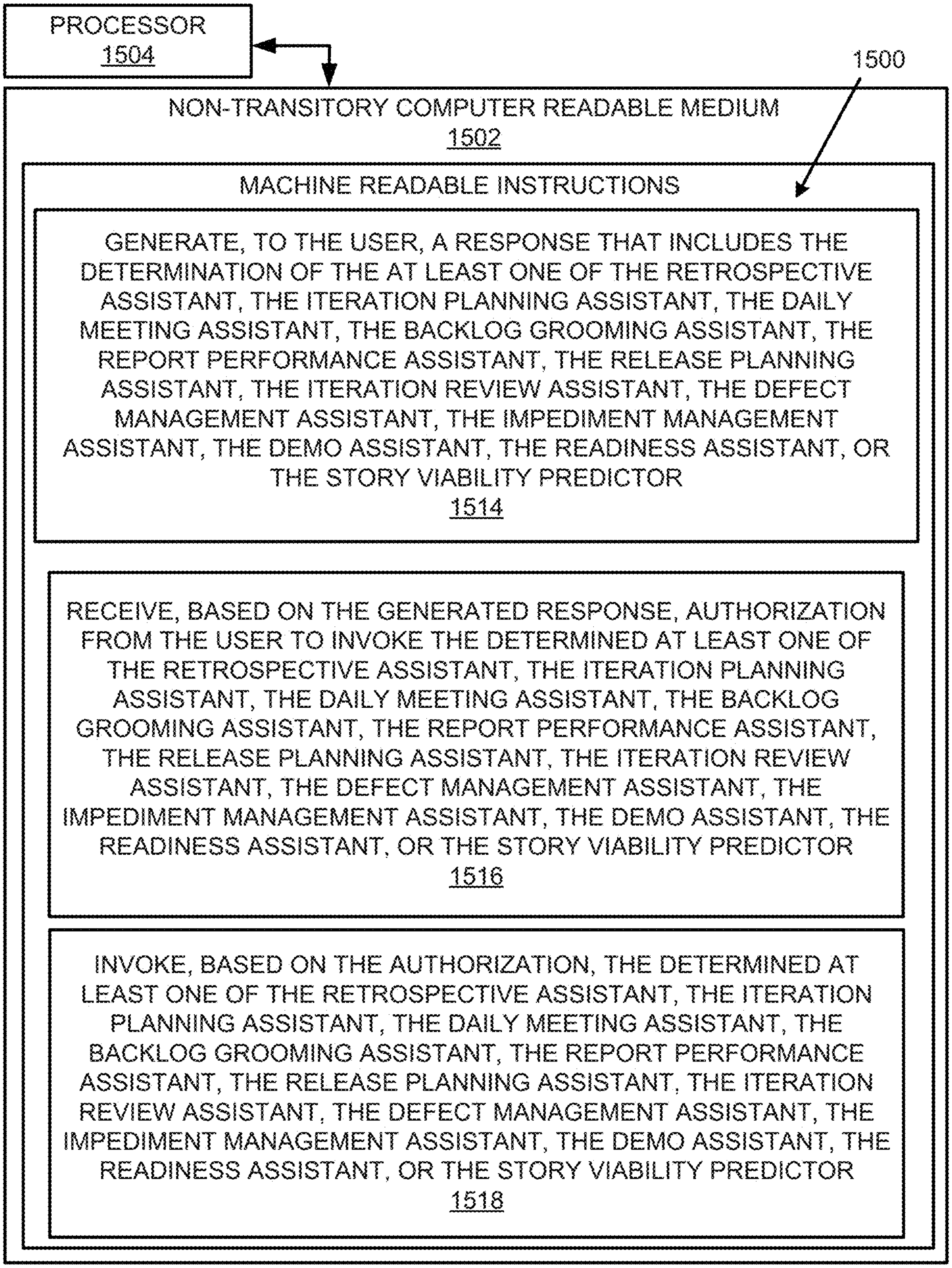
Figure 15:
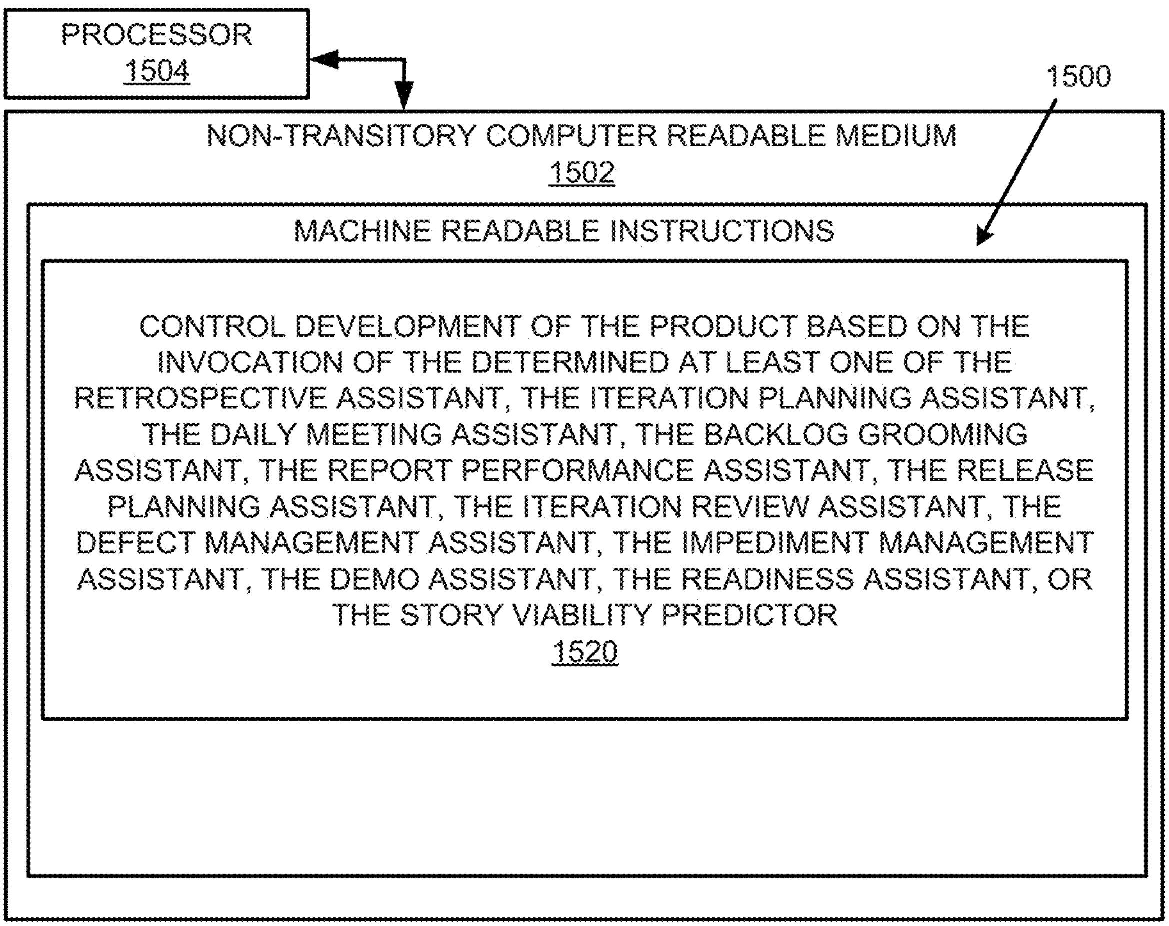

FIGS. 13-15 respectively illustrate an example block diagram 1300, a flowchart of an example method 1400, and a further example block diagram 1500 for artificial intelligence and machine learning based product development, according to examples. The block diagram 1300, the method 1400, and the block diagram 1500 may be implemented on the apparatus 100 described above with reference to FIG. 1 by way of example and not of limitation. The block diagram 1300, the method 1400, and the block diagram 1500 may be practiced in other apparatus. In addition to showing the block diagram 1300, FIG. 13 shows hardware of the apparatus 100 that may execute the instructions of the block diagram 1300. The hardware may include a processor 1302, and a memory 1304 storing machine readable instructions that when executed by the processor cause the processor to perform the instructions of the block diagram 1300. The memory 1304 may represent a non-transitory computer readable medium. FIG. 14 may represent an example method for artificial intelligence and machine learning based product development, and the steps of the method. FIG. 15 may represent a non-transitory computer readable medium 1502 having stored thereon machine readable instructions to provide artificial intelligence and machine learning based product development according to an example. The machine readable instructions, when executed, cause a processor 1504 to perform the instructions of the block diagram 1500 also shown in FIG. 15.

The processor 1302 of FIG. 13 and/or the processor 1504 of FIG. 15 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1502 of FIG. 15), such as hardware storage devices (e.g., RAM (random access memory), ROM (read only memory), EPROM (erasable, programmable ROM), EEPROM (electrically erasable, programmable ROM), hard drives, and flash memory). The memory 1304 may include a RAM, where the machine readable instructions and data for a processor may reside during runtime.

Referring to FIGS. 1-13, and particularly to the block diagram 1300 shown in FIG. 13, the memory 1304 may include instructions 1306 to ascertain an inquiry, by a user, related to a product that is to be developed or that is under development.

The processor 1302 may fetch, decode, and execute the instructions 1308 to ascertain an attribute associated with the user.

The processor 1302 may fetch, decode, and execute the instructions 1310 to analyze, based on the ascertained attribute, the inquiry related to the product that is to be developed or that is under development.

The processor 1302 may fetch, decode, and execute the instructions 1312 to determine, based on the analyzed inquiry, at least one of a retrospective assistant, an iteration planning assistant, a daily meeting assistant, a backlog grooming assistant, a report performance assistant, a release planning assistant, an iteration review assistant, a defect management assistant, an impediment management assistant, a demo assistant, a readiness assistant, or a story viability predictor, to respond to the inquiry.

The processor 1302 may fetch, decode, and execute the instructions 1314 to generate, to the user, a response that includes the determination of the at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor.

The processor 1302 may fetch, decode, and execute the instructions 1316 to receive, based on the generated response, authorization from the user to invoke the determined at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor.

The processor 1302 may fetch, decode, and execute the instructions 1318 to invoke, based on the authorization, the determined at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor.

The processor 1302 may fetch, decode, and execute the instructions 1320 to control development of the product based on the invocation of the determined at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor.

Referring to FIGS. 1-12 and 14, and particularly FIG. 14, for the method 1400, at block 1402, the method may include ascertaining, by a user inquiry analyzer that is executed by at least one hardware processor, an inquiry, by a user, related to a product that is to be developed or that is under development.

At block 1404, the method may include ascertaining, by a user attribute analyzer that is executed by the at least one hardware processor, an attribute associated with the user.

At block 1406, the method may include analyzing, by an inquiry response generator that is executed by the at least one hardware processor, based on the ascertained attribute, the inquiry related to the product that is to be developed or that is under development.

At block 1408, the method may include determining, by the inquiry response generator that is executed by the at least one hardware processor, based on the analyzed inquiry, at least one of a retrospective assistant, an iteration planning assistant, a daily meeting assistant, a backlog grooming assistant, a report performance assistant, a release planning assistant, an iteration review assistant, a defect management assistant, an impediment management assistant, a demo assistant, a readiness assistant, or a story viability predictor, to respond to the inquiry.

At block 1410, the method may include generating, by the inquiry response generator that is executed by the at least one hardware processor, to the user, a response that includes the determination of the at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor.

At block 1412, the method may include receiving, by an inquiry response performer that is executed by the at least one hardware processor, based on the generated response, authorization from the user to invoke the determined at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor.

At block 1414, the method may include invoking, by the inquiry response performer that is executed by the at least one hardware processor, based on the authorization, the determined at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor.

Referring to FIGS. 1-12 and 15, and particularly FIG. 15, for the block diagram 1500, the non-transitory computer readable medium 1502 may include instructions 1506 to ascertain an inquiry, by a user, related to a product that is to be developed or that is under development, wherein the product includes a software or a hardware product.

The processor 1504 may fetch, decode, and execute the instructions 1508 to ascertain an attribute associated with the user.

The processor 1504 may fetch, decode, and execute the instructions 1510 to analyze, based on the ascertained attribute, the inquiry related to the product that is to be developed or that is under development.

The processor 1504 may fetch, decode, and execute the instructions 1512 to determine, based on the analyzed inquiry, at least one of a retrospective assistant, an iteration planning assistant, a daily meeting assistant, a backlog grooming assistant, a report performance assistant, a release planning assistant, an iteration review assistant, a defect management assistant, an impediment management assistant, a demo assistant, a readiness assistant, or a story viability predictor, to respond to the inquiry.

The processor 1504 may fetch, decode, and execute the instructions 1514 to generate, to the user, a response that includes the determination of the at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor.

The processor 1504 may fetch, decode, and execute the instructions 1516 to receive, based on the generated response, authorization from the user to invoke the determined at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor.

The processor 1504 may fetch, decode, and execute the instructions 1518 to invoke, based on the authorization, the determined at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor.

The processor 1504 may fetch, decode, and execute the instructions 1520 to control development of the product based on the invocation of the determined at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An artificial intelligence and machine learning based product development apparatus comprising:

at least one hardware processor;

a user inquiry analyzer, executed by the at least one hardware processor, to ascertain an inquiry, by a user, related to a product that is to be developed or that is under development;

a user attribute analyzer, executed by the at least one hardware processor, to ascertain an attribute associated with the user;

an inquiry response generator, executed by the at least one hardware processor, to analyze, based on the ascertained attribute, the inquiry related to the product that is to be developed or that is under development, determine, based on the analyzed inquiry, at least one of a retrospective assistant, an iteration planning assistant, a daily meeting assistant, a backlog grooming assistant, a report performance assistant, a release planning assistant, an iteration review assistant, a defect management assistant, an impediment management assistant, a demo assistant, a readiness assistant, or a story viability predictor, to respond to the inquiry, and generate, to the user, a response that includes the determination of the at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor;

an inquiry response performer, executed by the at least one hardware processor, to receive, based on the generated response, authorization from the user to invoke the determined at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor, and invoke, based on the authorization, the determined at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor, wherein for the retrospective assistant, the inquiry response performer is executed by the at least one hardware processor to invoke the retrospective assistant to:

ascertain iteration data associated with a product development plan associated with the product;

identify, based on an analysis of the iteration data, action items associated with the product development plan;

compare each of the action items to a threshold, and determine, based on the comparison of each of the action items to the threshold, whether each of the action items meets or does not meet a predetermined criterion, and wherein for the story viability predictor, the inquiry response performer is executed by the at least one hardware processor to invoke the story viability predictor to:

utilize a deep neural network regressor to train a model to predict estimated hours based on input features that include technology, domain, application, story point, story type, sprint duration, dependency and sprint jump; and utilize a deep neural network classifier to train the model to predict schedule overrun based on input features that include the technology, the domain, the application, the story point, the story type, the sprint duration, the dependency and the sprint jump, and wherein for the iteration planning assistant, the inquiry response performer is executed by the at least one hardware processor to invoke the iteration planning assistant to:

pre-process task data extracted from a user story associated with the product development plan associated with the product;

generate, for the pre-processed task data, a K-nearest neighbors model; and determine based on the generated K-nearest neighbors model, task types and task estimates to complete each of a plurality of tasks of the user story associated with the product development plan; and a product development controller, executed by the at least one hardware processor, to control, based on the determined task types and task estimates, development of the product based on the invocation of the determined at least one of the retrospective assistant, the iteration planning assistant, the daily meeting assistant, the backlog grooming assistant, the report performance assistant; the release planning assistant, the iteration review assistant, the defect management assistant, the impediment management assistant, the demo assistant, the readiness assistant, or the story viability predictor.

2. The artificial intelligence and machine learning based product development apparatus according to claim 1, wherein the product includes a software product.

3. The artificial intelligence and machine learning based product development apparatus according to claim 1, wherein the product includes a hardware product.

4. The artificial intelligence and machine learning based product development apparatus according to claim 1, wherein the product development controller is to:

modify, for an action item of the action items that does not meet the predetermined criterion, the product development plan; and control, based on the modified product development plan, development of the product based on a further invocation of the at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor.

5. The artificial intelligence and machine learning based product development apparatus according to claim 1, wherein for the daily meeting assistant, the inquiry response performer is executed by the at least one hardware processor to invoke the daily meeting assistant to:

ascertain a sprint associated with the product development plan associated with the product;

determine, for the ascertained sprint, a status of the sprint as a function of a projection time duration on a specified day subtracted from a total planned time duration for the sprint; and based on a determination that the status of the sprint is a positive number, designate the sprint as lagging, wherein the product development controller is to:

control, based on the determined status of the sprint, development of the product based on the invocation of the determined at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor.

6. The artificial intelligence and machine learning based product development apparatus according to claim 1, wherein for the report performance assistant, the inquiry response performer is executed by the at least one hardware processor to invoke the report performance assistant to:

generate a report related to the product development plan associated with the product;

ascertain, for the report, a schedule for forwarding the report to a further user at a specified time; and forward, at the specified time and based on the schedule, the report to the further user.

7. The artificial intelligence and machine learning based product development apparatus according to claim 1, wherein for the release planning assistant, the inquiry response performer is executed by the at least one hardware processor to invoke the release planning assistant to:

generate, for the product development plan associated with the product, a release plan by implementing a weighted shortest job first process to rank each user story of the product development plan as a function of a cost of a delay versus a size of the user story, wherein the product development controller is to:

control, based on the generated release plan, development of the product based on the invocation of the determined at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor.

8. The artificial intelligence and machine learning based product development apparatus according to claim 1, wherein for the readiness assistant, the inquiry response performer is executed by the at least one hardware processor to invoke the readiness assistant to:

ascertain user stories associated with the product development plan associated with the product;

perform, on each of the ascertained user stories, at least one rule-based check to determine a readiness of a respective user story;

generate, for the product development plan, a readiness assessment of each of the ascertained user stories, wherein the product development controller is to:

control, based on the generated readiness assessment, development of the product based on the invocation of the determined at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor.

9. The artificial intelligence and machine learning based product development apparatus according to claim 1, wherein for the story viability predictor, the inquiry response performer is executed by the at least one hardware processor to invoke the story viability predictor to:

ascertain user stories associated with the product development plan associated with the product;

perform, on each of the ascertained user stories, a machine learning model-based analysis to determine a viability of a respective user story;

generate, for the product development plan, a viability assessment of each of the ascertained user stories, wherein the product development controller is to:

control, based on the generated viability assessment, development of the product based on the invocation of the determined at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor.

10. A method for artificial intelligence and machine learning based product development comprising:

ascertaining, by a user inquiry analyzer that is executed by at least one hardware processor, an inquiry, by a user, related to a product that is to be developed or that is under development;

ascertaining, by a user attribute analyzer that is executed by the at least one hardware processor, an attribute associated with the user;

analyzing, by an inquiry response generator that is executed by the at least one hardware processor, based on the ascertained attribute, the inquiry related to the product that is to be developed or that is under development;

determining, by the inquiry response generator that is executed by the at least one hardware processor, based on the analyzed inquiry, a retrospective assistant to respond to the inquiry;

generating, by the inquiry response generator that is executed by the at least one hardware processor, to the user, a response that includes the determination of the retrospective assistant;

receiving, by an inquiry response performer that is executed by the at least one hardware processor, based on the generated response, authorization from the user to invoke the determined retrospective assistant;

invoking, by the inquiry response performer that is executed by the at least one hardware processor, based on the authorization, the determined retrospective assistant to:

ascertain iteration data associated with a product development plan associated with the product;

identify, based on an analysis of the iteration data, action items associated with the product development plan;

compare each of the action items to a threshold; and determine, based on the comparison of each of the action items to the threshold, whether each of the action items meets or does not meet a predetermined criterion;

invoking, by the inquiry response performer that is executed by the at least one hardware processor, based on the authorization, the determined story viability predictor to:

utilize a deep neural network regressor to train a model to predict estimated hours based on input features that include technology, domain, application, story point, story type, sprint duration, dependency and sprint jump; and utilize a deep neural network classifier to train the model to predict schedule overrun based on input features that include the technology, the domain, the application, the story point, the story type, the sprint duration, the dependency and the sprint jump;

invoking, by the inquiry response performer that is executed by the at least one hardware processor, based on the authorization, the iteration planning assistant to:

pre-process task data extracted from a user story associated with the product development plan associated with the product;

generate, for the pre-processed task data, a K-nearest neighbors model; and determine, based on the generated K-nearest neighbors model, task types and task estimates to complete each of a plurality of tasks of the user story associated with the product development plan; and controlling, based on the determined task types and task estimates, by a product development controller that is executed by the at least one hardware processor, development of the product based on the invocation of the determined retrospective assistant.

11. The method according to claim 10, wherein the product includes a software product.

12. The method according to claim 10, wherein the product includes a hardware product.

13. A non-transitory computer readable medium having stored thereon machine readable instructions, the machine readable instructions, when executed by at least one hardware processor, cause the at least one hardware processor to:

ascertain an inquiry, by a user, related to a product that is to be developed or that is under development, wherein the product includes a software or a hardware product;

ascertain an attribute associated with the user;

analyze, based on the ascertained attribute, the inquiry related to the product that is to be developed or that is under development;

determine, based on the analyzed inquiry, at least one of a retrospective assistant, an iteration planning assistant, a daily meeting assistant, a backlog grooming assistant, a report performance assistant, a release planning assistant, an iteration review assistant, a defect management assistant, an impediment management assistant, a demo assistant, a readiness assistant, or a story viability predictor, to respond to the inquiry;

generate, to the user, a response that includes the determination of the at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor;

receive, based on the generated response, authorization from the user to invoke the determined at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor;

invoke, based on the authorization, the determined at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor, wherein for the retrospective assistant, the machine readable instructions, when executed by the at least one hardware processor, cause the at least one hardware processor to invoke the retrospective assistant to:

ascertain iteration data associated with a product development plan associated with the product;

identify, based on an analysis of the iteration data, action items associated with the product development plan;

compare each of the action items to a threshold; and determine, based on the comparison of each of the action items to the threshold, whether each of the action items meets or does not meet a predetermined criterion;

wherein for the story viability predictor, the machine readable instructions, when executed by the at least one hardware processor, cause the at least one hardware processor to invoke the story viability predictor to:

utilize a deep neural network regressor to train a model to predict estimated hours based on input features that include technology, domain, application, story point, story type, sprint duration, dependency and sprint jump; and utilize a deep neural network classifier to train the model to predict schedule overrun based on input features that include the technology, the domain, the application, the story point, the story type, the sprint duration, the dependency and the sprint jump, and wherein for the iteration planning assistant, the machine readable instructions, when executed by the at least one hardware processor, cause the at least one hardware processor to invoke the iteration planning assistant to:

pre-process task data extracted from a user story associated with the product development plan associated with the product;

generate, for the pre-processed task data, a K-nearest neighbors model; and determine, based on the generated K-nearest neighbors model, task types and task estimates to complete each of a plurality of tasks of the user story associated with the product development plan, and control, based on the determined task types and task estimates, development of the product based on the invocation of the determined at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor.

14. The non-transitory computer readable medium according to claim 13, wherein for the retrospective assistant, the machine readable instructions, when executed by the at least one hardware processor, further cause the at least one hardware processor to invoke the retrospective assistant to:

modify, for an action item of the action items that does not meet the predetermined criterion, the product development plan; and control, based on the modified product development plan, development of the product based on a further invocation of the at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor.

15. The non-transitory computer readable medium according to claim 13, wherein for the daily meeting assistant, the machine readable instructions, when executed by the at least one hardware processor, further cause the at least one hardware processor to invoke the daily meeting assistant to:

ascertain a sprint associated with the product development plan associated with the product;

determine, for the ascertained sprint, a status of the sprint as a function of a projection time duration on a specified day subtracted from a total planned time duration for the sprint;

based on a determination that the status of the sprint is a positive number, designate the sprint as lagging; and control, based on the determined status of the sprint, development of the product based on the invocation of the determined at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor.

16. The non-transitory computer readable medium according to claim 13, wherein for the report performance assistant, the machine readable instructions, when executed by the at least one hardware processor, further cause the at least one hardware processor to invoke the report performance assistant to:

generate a report related to the product development plan associated with the product;

ascertain, for the report, a schedule for forwarding the report to a further user at a specified time; and forward, at the specified time and based on the schedule, the report to the further user.

17. The non-transitory computer readable medium according to claim 13, wherein for the release planning assistant, the machine readable instructions, when executed by the at least one hardware processor, further cause the at least one hardware processor to invoke the release planning assistant to:

generate, for the product development plan associated with the product, a release plan by implementing a weighted shortest job first process to rank each user story of the product development plan as a function of a cost of a delay versus a size of the user story; and control, based on the generated release plan, development of the product based on the invocation of the determined at least one of the retrospective assistant, the iteration planning assistant, the daily meeting assistant, the backlog grooming assistant, the report performance assistant, the release planning assistant, the iteration review assistant, the defect management assistant, the impediment management assistant, the demo assistant, the readiness assistant, or the story viability predictor.

* * * * *